(12) United States Patent
Nashiki

(10) Patent No.: US 11,863,018 B2
(45) Date of Patent: Jan. 2, 2024

(54) RELUCTANCE MOTOR

(71) Applicant: Masayuki Nashiki, Aichi-ken (JP)

(72) Inventor: Masayuki Nashiki, Aichi-ken (JP)

( * ) Notice: Subject to any disclaimer, the term of this patent is extended or adjusted under 35 U.S.C. 154(b) by 743 days.

(21) Appl. No.: 16/763,711

(22) PCT Filed: Nov. 15, 2018

(86) PCT No.: PCT/JP2018/042300
§ 371 (c)(1),
(2) Date: Feb. 23, 2021

(87) PCT Pub. No.: WO2019/098278
PCT Pub. Date: May 23, 2019

(65) Prior Publication Data
US 2021/0167645 A1  Jun. 3, 2021

(30) Foreign Application Priority Data

Nov. 20, 2017 (JP) .................................. 2017-222372
Nov. 13, 2018 (JP) .................................. 2018-212937

(51) Int. Cl.
| | |
|---|---|
| *H02K 1/2753* | (2022.01) |
| *H02K 1/14* | (2006.01) |
| *H02K 11/33* | (2016.01) |
| *H02K 11/215* | (2016.01) |
| *H02K 3/12* | (2006.01) |
| *H02K 1/02* | (2006.01) |

(52) U.S. Cl.
CPC ........... *H02K 1/2753* (2013.01); *H02K 1/146* (2013.01); *H02K 3/12* (2013.01); *H02K 11/215* (2016.01); *H02K 11/33* (2016.01); *H02K 1/02* (2013.01); *H02K 2213/03* (2013.01)

(58) Field of Classification Search
CPC .... H02K 2213/03; H02K 3/12; H02K 3/1402; H02K 3/04; H02K 1/2753; H02K 1/02; H02K 1/276; H02K 1/274; H02K 1/27; H02K 1/146; H02K 11/215; H02K 11/21; H02K 11/33; H02K 11/30
See application file for complete search history.

(56) References Cited

U.S. PATENT DOCUMENTS

| | | |
|---|---|---|
| 5,545,938 A | 8/1996 | Mecrow |
| 2011/0241599 A1 | 10/2011 | Nashiki et al. |
| 2012/0169267 A1 | 7/2012 | Nashiki et al. |

(Continued)

FOREIGN PATENT DOCUMENTS

| | | |
|---|---|---|
| JP | 2011-177021 | 9/2011 |
| JP | 2013-150492 | 8/2013 |

(Continued)

*Primary Examiner* — Nguyen Tran
(74) *Attorney, Agent, or Firm* — Clark & Brody LP

(57) ABSTRACT

Prioritizing one-way rotation and one-way torque in particular, a change is induced in the partial shape of a magnetic poles on the rotor of a reluctance motor in the direction of forward movement, or magnetic resistance is increased, the torque generation range of each phase is expanded, and the increase/decrease time of an electric current is ensured to reduce the noise. With the relative increase in copper losses due to this drive method, and harmful effects from the problem of an overvoltage generated in the full-pitch windings are reduced by a drive method in which the overvoltage is cancelled out.

16 Claims, 23 Drawing Sheets

(56) References Cited

U.S. PATENT DOCUMENTS

| | | | | |
|---|---|---|---|---|
| 2012/0235615 A1* | 9/2012 | Nashiki | ............... | H02K 21/125 |
| | | | | 310/156.01 |
| 2014/0035422 A1* | 2/2014 | Mikami | ................ | H02K 15/03 |
| | | | | 310/156.71 |
| 2019/0036399 A1* | 1/2019 | Yamada | ................... | H02K 3/28 |

FOREIGN PATENT DOCUMENTS

| | | |
|---|---|---|
| JP | 2015-053756 | 3/2015 |
| JP | 2016-163440 | 9/2016 |

* cited by examiner

RELUCTANCE MOTOR

CROSS-REFERENCE TO RELATED APPLICATIONS

This application is based on and claims the benefit of priority from earlier PCT international application number PCT/JP2018/042300 filed on Nov. 15, 2018, which is also based on Japanese Patent Application Nos. 2017-222372 filed on Nov. 20, 2017 and 2018-212937 filed on Nov. 13, 2018, the descriptions of which are incorporated herein by reference.

TECHNICAL FELD

The present disclosure relates to motors for main machines mounted on electric vehicles EV, home electrical appliances, or industrial apparatuses and a technique for driving such motors, and in particular, to reducing noise of reluctance motors. Further, the present disclosure also relates to reluctance motors and techniques for improving efficiency, reducing the size, and reducing production cost of a control apparatus therefor.

BACKGROUND ART

An example of a cross-sectional view of a conventional reluctance motor is shown in FIG. 46. This reluctance motor is provided with 6 magnetic poles on the stator and 4 magnetic poles on the rotor and is called a switched reluctance motor. 469 is a stator and 46B is a rotor shaft. 46A and 46F are salient magnetic poles of the rotor, in which the width of each of the salient magnetic poles is 30 degrees in the circumferential direction, and the salient magnetic poles are arranged at four places on the entire circumference at equal intervals. A reference sign 461 shows an A phase stator magnetic pole, in which the centralized windings 467 and 468 are wound therearound as shown by broken lines. The current of each winding of this motor is subjected to supply of a one-way current, and each winding is indicated by current symbols. The winding 467 carries a current flowing from the front side to the back side of the drawing sheet, while the winding 468 carries a current flowing from the back side to the front side of the drawing sheet. Therefore, when the currents are applied to the windings, the A phase stator magnetic pole 461 becomes the S pole. A reference sign 462 is an A/ phase stator magnetic pole having the opposite magnetism to that of the A phase, around which the concentrated windings 46C and 46D are wound, as shown by broken lines. When the A/ phase current is applied to the windings, the A/ phase stator magnetic pole 462 becomes an N pole. The magnetic poles 461 and 462 are excited at the same time to cause magnetic fluxes shown by an arrow 46E in the rotor, so that the magnetic fluxes pass, from the lower side to the upper side in the drawing sheet, through the stator magnetic pole 462, the rotor magnetic pole 46F, the rotor magnetic pole 46A, and the stator magnetic pole 461. In the state shown in FIG. 46, torque acting along the counterclockwise direction CCW is generated in the rotor.

Reference signs 463 and 464 are B-phase and B/ phase stator magnetic poles, which are configured in the same way as the A phase and A/ phase stator magnetic poles. Excitation windings are wound around each of the B phase and B/phase stator magnetic poles. 465 and 466 are, in the similar manner, C phase and C/ phase stator magnetic poles. Excitation windings are also wound around each of the C phase and C/ phase stator magnetic poles. The circumferential width of each of the stator magnetic poles is 30°, and the stator magnetic poles are arranged at six locations on the entire circumference at equal intervals.

Next, the operation of the reluctance motor of FIG. 46 will now be described. Regarding the rotation angle position of the rotor, the rotation angle position of a clockwise end of the A phase stator magnetic pole 461 is defined as the start point of the rotor. As shown in the figure, a rotor rotation angle position θr is defined as a rotation angle from this start point to the end of the rotor magnetic pole 46A in the CCW direction. A phase windings 467 and 468 and A/ phase windings 46C and 46D are connected in series, and a constant current Io with a value close to a continuous rating is applied as an A-phase current Ia, so that the rotor rotates in the CCW direction at a constant speed Vso. The winding voltage in this rotation is a voltage Va shown in FIG. 47. The horizontal axis of this voltage Va shows the time t, and the value of the rotor rotation angle position θr at that rotation is shown at the bottom of FIG. 47. The CCW direction in FIG. 46 corresponds to the right direction of the paper surface of FIG. 47. Here, the unit of the speed Vso is [radian/sec]. In this case, a simple model is assumed in which the magnetic flux passes through a portion where the stator magnetic poles 461 and 462 and the rotor magnetic poles 46A and 46F face each other through an air gap portion.

Similarly, the B phase windings of the B phase and B/ phase stator magnetic poles 463 and 464 are connected in series, and the rotor is rotated in the CCW direction at a constant speed Vso with a constant current Io energized as a B-phase current Ib. The winding voltage in this rotation provides a voltage Vb shown in FIG. 47. Similarly, the C phase windings of the C phase and C/ phase stator magnetic poles 465 and 466 are connected in series, and the rotor is rotated in the CCW direction at a constant speed Vso with a constant current Io energized as a C phase current Ic. The winding voltage in this rotion is a voltage Vc shown in FIG. 47.

Since each of the voltages Va, Vb, and Vc in FIG. 47 is shown in a state where a constant current Io is supplied, the product of each of these voltages and the current is power amounts of Pa=Va×Io, Pb=Vb×Io, Pc=Vc×Io. Since the constant speed Vso is provided, the torque for each phase is Ta=Pa/Vso=Va×Io/Vso, Tb=Pb/Vso=Vb×Io/Vso, and Tc=Pc/Vso=Vc×Io/Vso. Here, since Io/Vso is a constant value, the torque values Ta, Tb, and Tc of the respective phases have characteristics of a shape proportional to each of the voltages Va, Vb, and Vc shown in FIG. 47, which are indicated in parentheses.

Next, the operation of rotating the reluctance motor of FIG. 46 by generating a constant torque in the CCW direction will now be described. From the characteristics of the voltage Va in FIG. 47, the A phase can generate torque in the CCW diretion when the angle θr is between 0° and 30° and between 90° and 120°, resulting in that the A-phase current is energized as shown by Ia of FIG. 47. Similarly, from the voltage Vb of FIG. 47, the B phase can generate torque in the CCW direction in the agnlurl range of 30° and 60° and in the angular range of 120° and 150°, during each of the angulare ranges a B-phase current Ib whose phase is delayed by 30° from the A phase current Ia in FIG. 47 is energized. From the voltage Vc in FIG. 47, the C phase can generate torque in the CCW direction in an angular range of 60° and 90° and an an angular range of 150° and 180°, during each of the angular ranges a C-phase current whose phase is delayed by 60° from the A phase current Ia in FIG. 47 is energized. The torque cycle of the reluctance motor is 180°, and by energizing the currents Ia, Ib, and Ic according to the rotor rotation angle position θr, a constant amount torque in the CCW direction can be obtained as shown in FIG. 47, as shown by a line 471, which torque corresponds to the total voltage Vt in FIG. 47.

Further, the operation of rotating the reluctance motor of FIG. 46 by generating a constant torque value in the CW will now be described. This is the same as the generation of the CCW torque described above. The A-phase current Ia can obtain a negative torque by energizing a current whose phase is delayed by 30° from Ia in FIG. 47. A negative torque is obtained for the B-phase current Ib by energizing a current whose phase is delayed by 60° from Ia in FIG. 47. The C-phase current Ic is 90° out of phase with Ia in FIG. 47, that is, a negative torque is obtained by energizing the same current as Ia in FIG. 47. Then, by energizing the currents Ia, Ib, and Ic according to the rotor rotation angle position θr, the constant torque of CW shown in 472 of the total voltage Vt in FIG. 46 can be obtained.

An advantage of the conventional reluctance motor of FIG. 46 is that the rotor has a simple structure and is robust, so that high-speed rotation is easy. Moreover, it can be driven without using a permanent magnet. Torque is generated by the suction force, which is a reluctance force, and the drive algorithm is relatively simple. The stator winding is also a centralized winding configuration on the salient pole, which is simple and easy to manufacture. Above all, there is a possibility of realizing a low-cost motor system.

Next, the problems of the conventional reluctance motor of FIG. 46 will be described. This is a problem related to the motor so configuration and the operation description. The first problem is the noise of the reluctance motor. In particular, the driving noise is very large when a large torque is output at high-speed rotation. It is well known that the noise of a permanent magnet type synchronous motor used as a main motor of a hybrid vehicle is much louder than that of a permanent magnet type synchronous motor.

The second problem of the conventional reluctance motor of FIG. 46 is that the continuous rated torque is inferior to that of the permanent magnet type synchronous motor having the same motor size. Further, a torque as large as 3 times or more of the continuous rated torque is also desired. Generally, in a large torque region, the torque constant tends to decrease due to a decrease in power factor or the like, resulting in an Increase in size and weight. The third problem is that the torque ripple is large. The fourth problem is that high-speed rotation is possible, but stable and uniform torque output at high-speed rotation is difficult. The fifth problem is that the power factor is low, and the size of the inverter becomes large. In particular, the motor for the main engine of an electric vehicle requires a large torque that is three times or more the continuous rated torque, which increases the problems of power factor and torque ripples.

As described above, the conventional reluctance motor shown in FIG. 46 has some advantages but has many problems. By solving most of these problems, the reluctance motor can be put into practical use as the main motor of an electric vehicle, and it can be a competitive and attractive motor compared to the conventional permanent magnet type synchronous motor. The causes of the above problems, the configuration of the present invention and its effects will be described in detail later.

CITATION LIST

Patent Literature

[PTL 1] JP A 2013-150492 (FIGS. 2 to 4)
[PTL 2] JP P 3157162 (FIGS. 2 to 4)
[PTL 3] JP A 2012-114975

SUMMARY OF THE INVENTION

Problems to be Solved

The first subject of the present invention is to solve the first problem, and to reduce the noise of the reluctance motor. A second object of the present invention is to solve the second problem described above, and to improve the continuous rated torque of the reluctance motor. Further, a torque as large as 3 times or more of the continuous rated torque is also desired. A third object of the present Invention is to solve the third problem, and to reduce the torque ripple of the reluctance motor. It is necessary to improve not only the low torque region, which is frequently used, but also the torque ripple when a large torque is generated. A fourth subject of the present invention is to solve the fourth problem, and a stable and uniform torque output at high-speed rotation of the reluctance motor is required. A fifth object of the present invention is to solve the fifth problem, to improve the power factor of the reluctance motor at the time of large torque output, and to reduce the size of the inverter. In many cases, the countermeasures for these issues conflict with other issues.

Solution

The present invention alms at a motor for a main engine of an electric vehicle as an application and is a motor that gives priority to one-way rotation. The above problems are solved as a motor that gives priority to forward rotation and torque in the forward rotation direction. By giving priority to the torque in the forward rotation direction, the degree of freedom in the shape and characteristics of the motor can be obtained, and excellent characteristics can be obtained. The performance of torque in the reverse rotation direction is comparable to that of a conventional reluctance motor. It should be noted that each improved technology often has both advantages and disadvantages, and the competitiveness of the reluctance motor cannot be improved without comprehensively improvement from the first problem to the fifth problem of the conventional reluctance motor.

As an outline of the present invention, in particular, giving priority to one-way rotation and one-way torque, the shape of a part of the rotor magnetic pole of the reluctance motor in the traveling direction is deformed or the magnetic resistance is increased to increase the torque generation range of each phase. And also secure the time to increase/decrease the current to reduce the noise. The increase in copper loss due to this driving method reduces copper loss as a full-node winding. An excessive voltage is generated in the all-node winding, but the adverse effect is reduced by the winding configuration that cancels the excessive voltage and the drive circuit thereof, and the drive circuit is downsized.

The invention according to claim 1 provides a reluctance motor characterized in that the reluctance motor comprises: "SN×MN"-piece or more stator magnetic poles SP arranged in a circumferential direction of a stator, wherein the number SN is a positive integer of 6 or more and the number MN is a positive integer of 1 or more;

stator windings SW wound to excite the stator magnetic poles, respectively;

a first rotor magnetic pole portion RPB1 located at one end in a circumferential direction of a rotor, the first rotor magnetic pole portion being a part of "RN×MN"-piece or more rotor magnetic poles RP arranged magnetically separately in the circumferential direction of the rotor, wherein the number RN is a positive integer of 4 or more;

a second rotor magnetic pole portion RPB2 arranged adjacently to the rotor magnetic pole portion RPB1 in the circumferential direction, wherein the first rotor magnetic pole portion RPB1 has a magnetic resistance value MRPB1 and the second rotor magnetic pole portion RPB2 has a magnetic resistance value MRPB2, the magnetic resistance value MRPB1 being larger than the magnetic resistance value MRPB2 by 20% or more, when the magnetic resistance value MRPB1 is given per a unit angular width in a radial direction along an all range of the first rotor magnetic pole portion RPB1 in a rotor axial direction thereof, and the magnetic resistance value MRPB2 is given per a unit angular width in the radial direction along an all range of the second rotor magnetic pole portion RPB2 in the rotor axial direction thereof.

According to this configuration, it is possible to reduce the increase/decrease in the radial attractive force acting on each stator magnetic pole, reduce the fluctuation of the torque acting on each stator magnetic pole, and reduce the noise of the reluctance motor. It also has the effects of improving average torque, reducing torque ripple, improving maximum torque and improving power factor.

The invention according to claim 2 provides the reluctance motor of claim 1, characterized in that the reluctance motor comprises a third rotor magnetic pole portion RPB3 arranged adjacently to the second rotor magnetic pole portion RPB2 in the circumferential direction, the second magnetic pole portion RPB2 has a magnetic resistance value which is larger than a magnetic resistance value MRPB3 by 20%, when the magnetic resistance value MRPB3 is given per a unit angular width in the radial direction along an all range of the third rotor magnetic pole portion RPB3 in the rotor axial direction thereof.

According to this configuration, the effect of claim 1 can be made into a more detailed characteristic.

The invention according to claim 3 provides the reluctance motor of claim 1, characterized in that the reluctance motor comprises a rotor made of magnetic steel sheets laminated in the rotor axial direction so as to have a desired ratio of the respective magnetic resistance values, wherein the radial magnetic resistance value MRPB1 of the first rotor magnetic portion RPB1, the radial magnetic resistance value MRPB2 of the second rotor magnetic portion RPB2, the radial magnetic resistance value MRPB3 of the third rotor magnetic portion RPB3, and a radial gap between the respective rotor magnetic pole RP are applied to the magnetic steel sheets such that the sheet have a plurality of thin and long holes, various shapes of holes, such as regular and/or round holes, recesses, and/or thinner-made portion of the sheets.

According to this configuration, various magnetic characteristics can be obtained by devising the internal shape of the electromagnetic steel sheet, and the rotor core can be manufactured by laminating, so that the rotor manufacturing can be facilitated.

The invention according to claim 4 provides the reluctance motor of claim 1, characterized in that the rotor comprises a plurality of rotor magnetic poles RPX arranged at circumferential positions whose phase differences are 180 degrees or 360 degrees in an electrical angle and whose magnetic characteristics are mutually different from other, and the plurality of rotor magnetic poles RPX have, at each the phases, radial magnetic resistance values have an average value at positions which are integer multiples of an electrical angle 180 degrees, the average value being equal to the magnetic resistance value MRPB1, MRPB2, or MRPB3.

According to this configuration, the production of the magnetic steel sheet of the rotor can be further simplified.

The invention according to claim 5 provides the reluctance motor of claim 1, characterized in that the motor comprises a slot SSTY1;

a stator magnetic pole PRY1 located adjacently to the slot SSTY1 in the circumferential direction;

a stator magnetic pole PRY2 located adjacently to the slot SSTY1 in the circumferential direction and oppositely to the stator magnetic pole PRY1; and a winding WPRY3 wound at the slot SSTY1 so as to aggregate a concentrated winding WPRY1 and a concentrated winding WPRY2 which are assumed, the concentrated winding WPRY1 passing therethrough an excitation current IPRY1 for the stator magnetic pole PRY1, the concentrated winding WPRY2 passing therethrough an excitation current IPRY2 for the stator magnetic pole PRY2, wherein the winding WPRY3 is wound at both the slot SSTY1 and other slots SSTY2 in the circumferential direction, and a current IPRY3 is supplied to the winding WPRY3, the current IPRY3 being equal to a sum of the excitation currents IPRY1 and IPRY2.

According to this configuration, the resistance value of the winding can be reduced to a minimum of ½, copper loss can be reduced, and motor efficiency can be Improved.

The invention according to claim 6 provides the reluctance motor of claim 1, characterized in that the motor comprises a slot SSTY1;

a stator magnetic pole PRY1 located adjacently to the slot SSTY1 in the circumferential direction;

a stator magnetic pole PRY2 located adjacently to the slot SSTY1 in the circumferential direction and oppositely to the stator magnetic pole PRY1; and a winding WPRY4 wound at the slot SSTY1 so as to aggregate a concentrated winding WPRY1 and a concentrated winding WPRY2 which are assumed, the concentrated winding WPRY1 passing therethrough an excitation current IPRY1 for the stator magnetic pole PRY1, the concentrated winding WPRY2 passing therethrough an excitation current IPRY2 for the stator magnetic pole PRY2, wherein the winding WPRY4 is wound at the slot SSTY1 and outside a back yoke thereof, and a current IPRY3 is supplied to the winding WPRY4, the current IPRY3 being equal to a sum of the excitation currents IPRY1 and IPRY2.

According to this configuration, the resistance value of the winding can be reduced to a minimum of ½, copper loss can be reduced, and motor efficiency can be improved. In addition, there is a possibility that the axial length of the stator can be shortened, and the cooling performance of the motor can be improved.

The invention according to claim 7 provides the reluctance motor of claim 1, characterized in that the motor comprises
an N-pole stator magnetic pole and an S-pole stator magnetic pole which are arranged parallel with in the circumferential direction; and
a permanent magnet PM1 arranged between a portion close to a distal portion of a tooth the N-pole stator magnetic pole and a portion close to a distal portion of a tooth of the S-pole stator magnetic pole,
wherein a relationship of Lts is equal to or less than "0.9×Ltf", wherein Ltf is a maximum value of a circumferential width between the portions close to the teeth of the N-pole and S-pole stator magnetic poles and Lts is a circumferential width of a tooth of a middle portion located between a tooth end of the stator and a back yoke thereof.

According to this configuration, the equivalent relative permeability of the tooth can be improved, the cross-sectional area of the slot in which the winding is placed can be increased, and the loss of the reluctance motor can be reduced by reducing the winding resistance, and efficiency can be improved.

The invention according to claim 8 provides the reluctance motor of claim 1, characterized in that the motor comprises
a soft magnetic member MM1 through which magnetic fluxes pass in the motor, and
a soft magnetic member MM2 whose saturation magnetic flux density is larger than a saturation magnetic flux density of the soft magnetic member MM1,
wherein the soft magnetic member MM2 composes a ½ or less portion of the stator tooth provided as the stator magnetic pole, and
the soft magnetic member MM2 composes a ½ or less portion of the rotor tooth provided as the rotor magnetic pole.

According to this configuration, the magnetic characteristics can be improved, and the torque can be increased at the operating point where the teeth of the stator and the teeth of the rotor are likely to be magnetically saturated.

The invention according to claim 9 provides the reluctance motor of claim 1, characterized in that the motor comprises
two or more N-pole stator magnetic poles arranged adjacently in the circumferential direction of the stator;
two or more S-pole stator magnetic poles arranged adjacently in the circumferential direction of the stator;
permanent magnets PM2 arranged in a back yoke located between the N-pole stator magnetic pole and the S-pole stator magnetic pole in accordance with magnetisms of the stator magnetic poles; and
by-path magnetic paths made of soft-magnetic materials which allow magnetic fluxes to pass therethrough between the N-pole and S-pole stator magnetic poles, the soft-magnetic members being arranged magnetically in parallel with the permanent magnets PM2.

According to this configuration, the exciting current of the reluctance motor can be reduced, the torque can be improved, and the power factor can be improved.

The invention according to claim 10 provides the reluctance motor of claim 1, characterized in that the motor comprises
N-pole stator magnetic poles and S-pole stator magnetic poles are arranged alternately in and on a periphery of the stator;
a back yoke BY1 magnetically connected to the N-pole stator magnetic poles;
a back yoke BY2 magnetically connected to the S-pole stator magnetic poles; and
a permanent magnet PM3 arranged between the back yoke BY1 and the back yoke BY2 in accordance with magnetisms of the stator magnetic poles.

According to this configuration, the exciting current of the reluctance motor can be reduced, the torque can be improved, and the power factor can be improved. At the same time, it can be compatible with the above-mentioned winding resistance reduction technique.

The invention according to claim 11 provides the reluctance motor of claim 1, characterized in that
each of the rotor magnetic poles RP has the magnetic resistance value MRPB1 which is two or more times larger than the magnetic resistance value MRPB2, and
the motor is configured to be controlled in a higher speed rotation range higher than a base rotation speed of the motor, such that the respective stator magnetic poles SP are excited, by the control, to generate torque when a first rotor magnetic pole portion RPB1 of each of the rotor magnetic poles approaches to each of the stator rotor magnetic poles.

According to this configuration, the motor voltage can be suppressed at high-speed rotation, torque can be increased at high-speed rotation, constant output characteristics can be realized, and torque pulsations can be reduced.

The invention according to claim 12 provides the reluctance motor of claim 1, characterized in that control is performed such that, in regenerative control in a range where two sets of stator magnetic poles are allowed to generate regenerative toque when the rotor rotates, wherein one stator magnetic pole which generates the regenerative torque in advance of the other stator magnetic pole is subjected to a gradual reduction in an excitation current thereto, and, concurrently, the other magnetic pole which generates the regenerative toque after the preceding stator magnetic pole is subjected to a gradual increase in an excitation current thereto, whereby the motor generate, as a whole, lesser ripples in the generative torque.

According to this configuration, torque pulsations during the regeneration can be reduced.

The invention according to claim 13 provides the reluctance motor of claim 1, characterized in that
the stator magnetic poles have shapes each facing an air gap and the rotor magnetic poles have shapes each facing the air gap, the shapes of both the stator and rotor magnetic poles being reversed therebetween, or,
the stator has teeth and the rotor has teeth, the teeth of both the stator and rotor being changed,
such that magnetic statistics which are relatively equivalent to each other are provided.

According to this configuration, a wider variety of magnetic characteristics can be realized by deforming the shape of the stator magnetic poles.

The invention according to claim 14 provides the reluctance motor of claim 1, characterized in that
the stator magnetic poles SP1, the stator magnetic poles SP2, and the stator magnetic poles SP3 are arranged parallelly in the circumferential direction, a winding SW1 and a winding SW2 wound in slots located adjacently to each of the stator magnetic pole SP1 on both sides in the circumferential direction, the winding SW2 and a winding SW3 wound in slots located adjacently to each of the stator magnetic pole SP2 on both sides in the circumferential direction, the winding SW3 and a winding SW4 wound in slots located adjacently to each of the stator magnetic pole SP3 on both sides in the circumferential direction, a power element PE1 electrically connected in series to the winding SW1, a power element PE2 electrically connected in series to the winding SW2, a power element PE3 electrically connected in series to the winding SW3, a power element PE4 electrically connected in series to the winding SW4, and a DC power supply having a positive terminal and a negative terminal and outputting DC power, wherein the power element PE1, the winding SW1, the winding SW2 and the power element PE2 are electrically connected in series to each other, the power element PE2, the winding SW2, the winding SW3 and the power element PE3 are electrically connected in series to each other, and the power element PE3, the winding SW3, the winding SW4 and the power element PE4 are electrically connected in series to each other, the excitation current being supplied to the respective windings to magnetically excite the respective stator magnetic poles.

According to this configuration, an unnecessary voltage component acting on the winding can be removed, an overvoltage can be removed, and the current of the reluctance motor can be efficiently applied. At the same time, the current capacity of the inverter can be reduced by half, and the inverter can be significantly downsized.

The invention according to claim 15 provides the reluctance motor of claim 1, characterized in that the motor comprises:

a stator magnetic pole SP11, a stator magnetic pole SP12, a stator magnetic pole SP13, a stator magnetic pole SP14, a stator magnetic pole SP15, and a stator magnetic pole SP16;

a winding SW11 arranged between the stator magnetic pole SP11 and the stator magnetic pole SP12;

a winding SW12 arranged between the stator magnetic pole SP12 and the stator magnetic pole SP13;

a winding SW13 arranged between the stator magnetic pole SP13 and the stator magnetic pole SP14;

a DC power supply having a positive terminal and a negative terminal and outputting DC power, a power element PE11, a power element PE12, and a power element PE13 which are electrically connected to the positive terminal;

a power element PE14 and a power element PE15 which are electrically connected to the negative terminal; and a diode DD11, a diode DD12, and a diode DD13, wherein the winding SW11, the diode DD11, the winding SW12, the diode DD12, the winding SW13, and the diode SS13 are electrically connected in series to each other, and the respective power elements are driven to apply in series a voltage to two windings among the windings SW11, SW12, and SW13 so as to control respective currents through the two windings.

According to this configuration, an unnecessary voltage component acting on the winding can be removed, an excessive voltage can be removed, and the current of the reluctance motor can be efficiently applied.

The invention according to claim 16 provides the reluctance motor of claim 9 or 10, characterized in that the motor comprises:

a stator magnetic pole SP21;

a winding SW21 configured to apply a current IS21 to the stator winding SP21 for excitation thereof;

a stator magnetic pole SP22; and a winding SW22 configured to apply a current IS22 to the stator magnetic pole SP22 for excitation thereof, wherein, at a rotation angle position of the rotor, a negative current IS22 is supplied to the winding SW22 to generate in a designated direction, provided that a positive current IS21 is supplied to the winding SW21 to generate the torque in the designated direction while a positive current IS22 is supplied to the other winding SW22 to generate torque in a direction opposite to the designated direction.

According to this configuration, more effective torque can be generated, so that the reluctance motor can be miniaturized.

Effects of the Invention

The novel technology of the present invention reduces the noise of the reluctance motor, improves the continuous rated torque, increases the maximum torque, reduces the torque ripple, increases the torque and torque ripple in the high-speed rotation range, reduces the torque ripple, and improves the force factor. It is also possible to realize miniaturization and manufacturing cost reduction by improving the efficiency of the motor, and miniaturization and cost reduction of the inverter. As a result of the features of the reluctance motor and these improvements, it is possible to realize a reluctance motor drive system that is competitive with the drive system using the conventional permanent magnet type synchronous motor.

BRIEF DESCRIPTIONS OF THE DRAWINGS

MODES FOR CARRYING OUT THE INVENTION

First Embodiment

Figure 1:
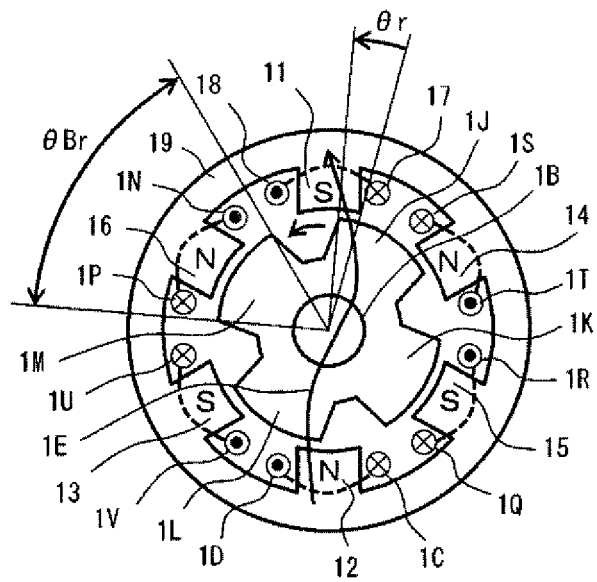
FIG. 1 is a lateral sectional view exemplifying a motor according to the present invention.

FIG. 1 shows an example of a cross-sectional view of the reluctance motor of the present invention. The reluctance motor is provided with 6 magnetic poles on the stator and 4 magnetic poles on the rotor, which is also called a switched reluctance motor. A reference sign 19 is a stator and a reference sign 1B is a rotor shaft. Reference signs 1J, 1K, 1L, and 1M show magnetic poles of the rotor, in which an angular width θBr of each rotor magnetic pole in the circumferential direction is larger than 30°, and the rotor magnetic poles are arranged at four places on the entire circumference at equal intervals. Compared with the example of the conventional reluctance motor shown in FIG. 46, the circumferential angular width θBr of each of the salient poles of the rotor is different, and further, the internal shape and magnetic resistance of the rotor magnetic pole are different from those shown FIG. 46. In addition, there are some differences as to the shapes and magnetic characteristics of the rotor magnetic poles. Some examples of such shapes and characteristics of the rotor magnetic poles will be described in detail later.

A reference 11 shown in FIG. 1 is an A1 phase stator magnetic pole, and concentrated winding windings 17 and 18 are wound therearound as shown by broken lines. The current of each winding of this motor is a one-way current, and each winding is indicated by a current symbol. The winding 17 is shown by a current symbol in which X is written in a circle and is energized as a current flowing from the front side to the back side of the drawing sheet. The winding 18 is shown a current symbol in which a dot is written in a circle and is energized as a current flowing from the back side to the front side of the drawing sheet. Therefore, when the current is energized in such a way, the stator magnetic pole 11 of the A1 phase becomes an S pole. A reference sign 12 denotes an A1/ phase stator magnetic pole whose phase is opposite to that of the A1 phase, around which concentrated winding windings 1C and 1D are wound as shown by broken lines. When an A1/ phase current is supplied thereto, the A1/ phase stator magnetic pole 12 becomes an N pole. The phase stator magnetic poles 11 and 12 are excited at the same time, resulting in that the magnetic fluxes indicated by the arrow 1E are passed through the rotor, from the lower side to the upper side of the drawing sheet, and through the stator magnetic pole 12, the rotor magnetic pole 1L, the rotor magnetic pole J, and to the stator magnetic pole 11. Then, the magnetic fluxes go around through the back yoke. In the state of FIG. 1, torque is generated in the rotor in the counterclockwise rotation direction CCW.

Reference signs 13 and 14 are B1 and B1/ phase stator magnetic poles which are provided in the same way as the A1 and A1/ phase stator magnetic poles. Excitation windings are wound around each of the B1 and B1/ phase stator poles. Similarly, reference signs 15 and 16 are C1 and C1/ phase stator magnetic poles. Excitation windings are wound around each of the C1 and C1/ phase stator magnetic poles. The circumferential width of each stator magnetic pole is 30°, and the stator magnetic poles are arranged at six locations on the entire circumference at equal intervals.

The rotor magnetic poles 1J, 1K, 1L, and 1M are evenly arranged on the circumference. The rotation angle position θr of the rotor is defined by the position of the rotor magnetic pole 13. As shown in FIG. 1, the rotation angle position of the clockwise end of the A1 phase stator magnetic pole 11 is defined as the start point of the rotor. The rotor rotation angle position θr is the rotation angle from this start point to the end of the rotor magnetic pole 1J in the CCW direction. The circumferential angular width Br of the salient pole of the rotor has a different rotor shape depending on the type of motor and can take various values according to the desired motor characteristics.

Figure 2:
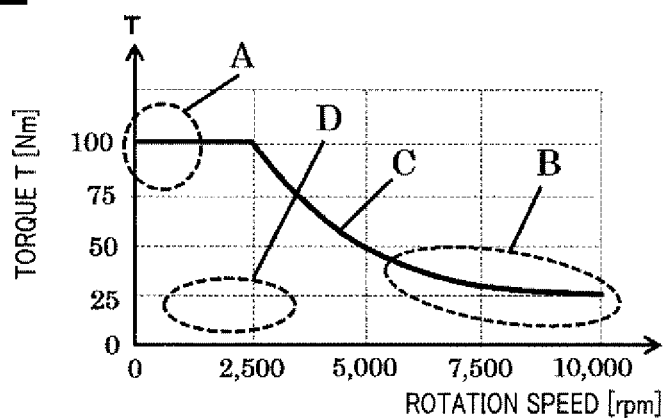
FIG. 2 is an example showing characteristic of rotation speeds and torque values of the motor.

Here, FIG. 2 shows an example of the characteristics required for the motor for the main-machine engine of an electric vehicle. This characteristic is also an example of the performance targeted by the reluctance motor of the present invention. The horizontal axis is the number of revolutions, and the maximum number of revolutions is 10,000 rpm. The vertical axis is torque T, which has a continuous rated torque of 33 Nm and a maximum torque of 100 Nm. The region shown by A in FIG. 2 is required for climbing a steep slope for the main engine of an automobile, and the large torque region of low-speed rotation is an important characteristic. Since a large current is applied, the power factor generally decreases and the copper loss increases, so that it is a thermally harsh operating area and often affects the size of the motor. The region shown by B in FIG. 2 is a high-speed rotation region, which is required for high-speed traveling of an automobile. Although the conventional reluctance motor can rotate, the torque pulsation becomes large, the noise becomes large, and the torque is not easily generated. The conventional magnet type synchronous motor has a problem that the power factor decreases due to the field weakening, the voltage and the current increase, and the inverter becomes large. In particular, the low-speed rotation and large torque in the region A and the constant output char- acteristics in the high-speed rotation in the region B may have a trade-off relationship because the amount of magnetic flux may conflict with each other in terms of motor technology.

The region shown by C in FIG. 2 is a constant output region, and since the base rotation speed is 2,500 rpm, the maximum output is 26.18 kW. The region shown by D in FIG. 2 is a region frequently used in urban driving of automobiles but is a region that does not affect the size, weight, and cost of the motor and the inverter. However, it is an area where quietness is required, and noise and vibration need to be reduced.

Figure 47:
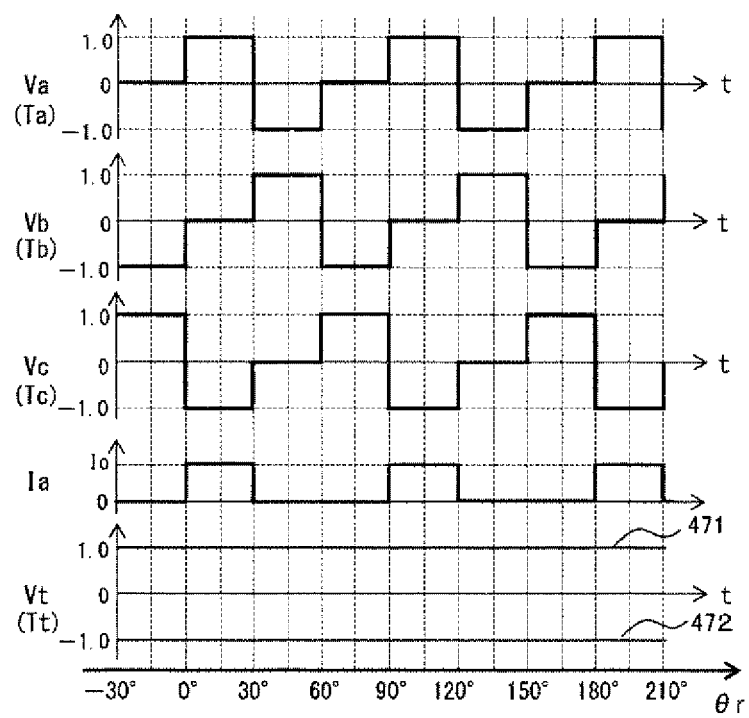
FIG. 47 is a graph exemplifying voltages, currents, and torque values provided in the conventional reluctance motor.
Figure 48:
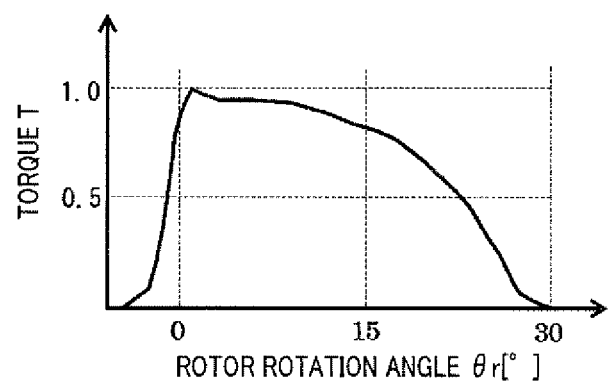
FIG. 48 is a graph exemplifying a torque characteristic of the conventional reluctance motor.

In the description of the conventional reluctance motor in FIG. 47, the magnetic characteristics and the torque characteristics which are simply models of the magnetic characteristics are shown, but as shown in Patent Document 1, it becomes the torque characteristics as shown in the example of FIG. 48. The rotor rotation angle θr does not have a rectangular wavy characteristic between 0° and 30°, and the torque decreases significantly as θr approaches 30°. The cause of this torque decrease is not simple, but there Is a problem of partial magnetic saturation characteristics of the soft magnetic material, a problem of magnetic saturation of the entire magnetic path of the teeth of the stator and the back yoke, and a problem of leakage flux.

The solid line in FIG. 3(a) is an example of the magnetic characteristics of a soft magnetic material such as an electromagnetic steel plate. The magnetic flux density increases with the exciting current If, but the relative magnetic permeability decreases from around 1.6 [T]. Then, it is magnetically saturated near the magnetic flux density of 2.0 [T]. FIG. 3(b) shows the relationship between the rotor rotation angle θr shown in FIGS. 46, 47, and 48 and the magnitude φ [Wb] of the magnetic flux passing through the teeth of the stator. The rotor rotation angle θr is relatively linear up to the vicinity of 15°, and magnetic flux passes between the corner of the salient pole of the stator and the corner of the salient pole of the rotor. When the rotor rotation angle θr is around 30°, the magnetic resistance of the entire magnetic path of the stator and rotor teeth and the back yoke increases, and the increase in magnetic flux decreases. Improvements to these problems will also be described later.

In FIG. 48, there is a problem of noise in the vicinity of the rotor rotation angle θr of 30°. The torque decreases in the vicinity of 30°, and a negative torque is generated when it exceeds 30°. Therefore, it is necessary to reduce the exciting current of the corresponding stator magnetic pole before 30°. Further, when the rotor rotation angle position θr approaches 30°, the radial attractive force between the A-phase stator magnetic pole and the rotor magnetic pole increases. If the exciting current is sharply reduced in this state, the radial attractive force between the stator magnetic pole and the rotor magnetic pole is sharply reduced, and the back yoke portion of the stator is deformed and vibrates. As a result, a large amount of noise is generated from the back yoke portion of the motor and its surroundings. Further, as the rotor rotates, a resonance phenomenon occurs, and a large noise is generated.

Further, if the torque of each phase has the torque characteristics as shown in FIG. 48, the torque will pulsate greatly, and there is a problem of torque ripple. Further, if the torque of each phase decreases as shown in the vicinity of 30° in FIG. 48, there is a problem that the average torque decreases.

Figure 4:
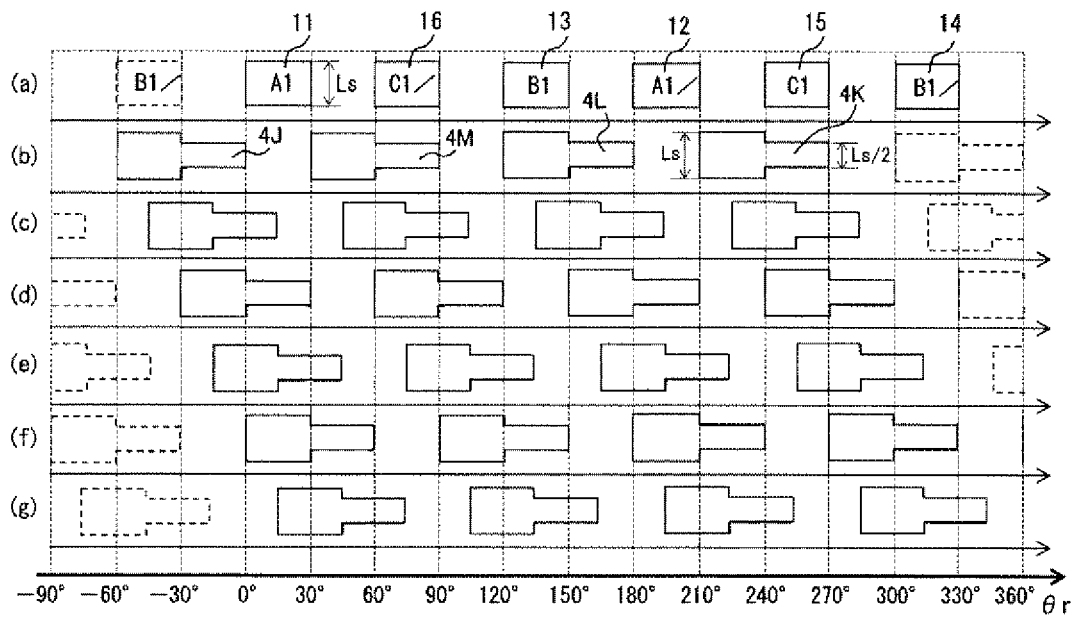
FIG. 4 is a horizontally developed view of both stator magnetic poles and rotor magnetic poles of the motor according to the present invention.
Figure 5:
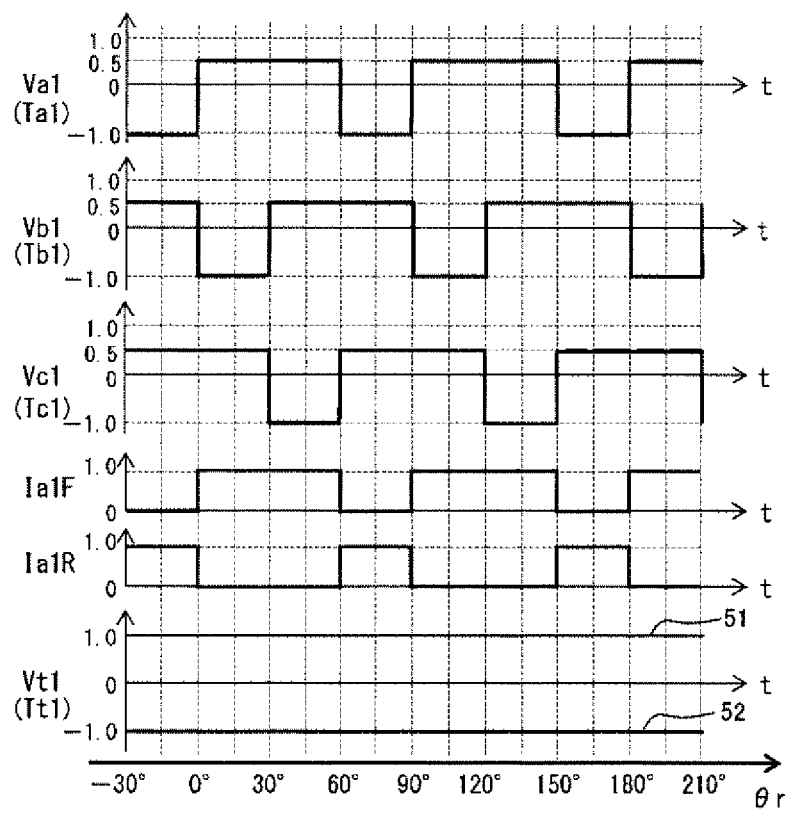
FIG. 5 is a graph exemplifying voltages, currents and torque values of the motor according to the present invention.

Next, as a specific operation example of the reluctance motor of FIG. 1, its operation, voltage, current, and torque will be shown and described in FIGS. 4 and 5. This is an operation of rotating to CCW to generate CCW torque or CW torque. FIG. 4 (a) shows a linear development of the shape of the inner peripheral surface of the stator magnetic pole SP seen from the air gap surface between the stator and the rotor so that the circumferential direction of the CCW is the horizontal axis direction of FIG. 4. The vertical axis direction in FIG. 4 is the rotor axis direction. 11 in FIG. 4 is an A1 phase stator pole, 12 is an A1/ phase stator pole, 13 is a B1 phase stator pole, 14 is a B1/ phase stator pole, 15 is C1 phase stator pole, and 16 is a C1/ phase stator pole. The shape of the air gap surface of the stator magnetic poles of each phase has a circumferential angular width θBs of 30° and a rotor axial length of Ls.

FIG. 4 (b) is the figure that the shape of the outer peripheral surface of the rotor magnetic pole RP as seen from the air gap surface is such that the circumferential direction of the CCW in FIG. 1 is the horizontal axis direction in FIG. 4, that is, developed dinearly as the right direction on the paper surface. The value of the rotor rotation angle position θr is shown at the bottom of FIG. 4. In FIG. 1, the starting point of the rotor is the rotation angle position of the clockwise end of the A1 phase stator magnetic pole 11, and the rotor rotation angle position θr is from the starting point to the CCW direction of the rotor magnetic pole 13. The starting point of the rotor in FIG. 4 is the left end of the stator magnetic pole 11 on the paper. The value of the rotor rotation angle position θr at the bottom of that point is set to 0°. The rotor rotation angle position θr in FIG. 4 is from the start point to the right end of the rotor magnetic pole 4J. In FIG. 4, the right end of the rotor magnetic pole 4J is also the tip of the CCW. The rotation angle position θr of the rotor of FIG. 4(b) is 0°, and this θr indicates from −90° to 360°. From −90° to 0° is the same as from 270° to 360°, and is expanded for easy visual visibility. The stator magnetic pole SP and rotor magnetic pole RP shown by the broken line are shown overlapping.

Next, the shape of the rotor magnetic pole will be described. The rotor magnetic pole 4J of FIG. 4(b) corresponds to the rotor magnetic pole 13 of FIG. 1, but has a unique rotor shape of FIG. 4. The circumferential angular width θBr of each rotor magnetic pole in FIG. 4 is 60°. The rotor axial width of each rotor magnetic pole has a different shape between the front 30° width portion and the rear 30° width portion in the CCW direction. The 30° width portion of the front portion has a rotor axial length of Ls/2. The 30° width portion of the rear portion has a rotor axial length of Ls, which is the same length as the rotor axial length of each stator magnetic pole SP. As will be described later, various motor characteristics can be obtained by changing these shapes.

In FIG. 4(c), the rotor position θr in FIG. 4(b) is rotated by 15° from the rotor position θr=0° to CCW, and θr is 15°. FIG. 4(d) is further rotated by 15° to CCW, and θr is 30°. Parts of (e), (f), and (g) of FIG. 4 are views in which the rotor is similarly advanced to CCW by 15°. By rotating the rotor in this way and changing the rotor rotation angle position θr, the magnetic relative relationship between each stator magnetic pole SP and each rotor magnetic pole RP changes, so each stator magnetic pole SP is excited at an appropriate timing. The rotation torque of the rotor can be obtained. In FIG. 4, those operations can be visually confirmed.

Next, the relationship between the voltage acting when a current is applied to each winding of the stator magnetic pole, the power of the motor output, and the torque will be described. However, it is a characteristic when the electromagnetic relationship is simply modeled. As described above, the three-dimensional positional relationship of the stator magnetic pole of the reluctance motor of FIG. 4, its winding, the rotor magnetic pole, and the magnetic flux is the configuration of the cross-sectional view of the reluctance motor of FIG. 1. Now, with the A1 phase windings 17 and 18 and the A1/ phase windings 1C and 1D connected in series and a constant current Io [A] with a value close to the continuous rating as the A1 phase current Ia1 is energized, the rotor is considered a state in which the coil is rotated to CCW at a constant speed Vso [radian/sec]. The CCW direction of FIG. 1 is the right direction of the paper surface of FIG. 4. The winding voltage of the A1 phase at this time is the voltage Va1 in FIG. 5. The horizontal axis of Va1 in FIG. 5 is time t, and the value of the rotor rotation angle position θr at that time is shown in the lowermost stage of FIG. 5. Although θr shows a value between −30° and 210°, the reluctance torque cycle is 180°, so θr mainly shows a value between 0° and 180°. A front and back part of an angle range 30° are presented for easy viewing.

The magnetic flux interlinking with the winding of the A1 phase and the winding voltage Va1 of the A1 phase will be described. First, when the rotor magnetic pole 4J approaches 0° to 30° of θr, the front portion of the rotor magnetic pole 4J faces the A1 phase stator magnetic pole 11 via an air gap. It is the state from parts (b) to (c) and (d) of FIG. 4. The rotor axial length of the front portion of the rotor magnetic pole 4 is ½ of the axial length Ls of the stator magnetic pole, and the rotational change rate of the magnetic flux passing through the rotor magnetic pole and the stator magnetic pole is ½ of the maximum value. Here, the voltage in FIG. 5 is normalized, and the value between 0° and 30° of Va1 is shown as 0.5.

Next, when the rotor magnetic pole 4 approaches 30° to 60° of θr, the rear portion of the rotor magnetic pole 4 faces the stator magnetic pole 11 of the A1 phase via an air gap. Since the circumferential angular width of the stator magnetic pole 11 and the circumferential angular width of the front portion of the rotor magnetic pole 4J are both 30°, when θr is 30° to 60°, the front portion of the rotor magnetic pole 4 deviates from the A1 phase stator magnetic pole 11. It is the state from parts (d) to (e) and (f) of FIG. 4. The rotor axial length of the rear portion of the rotor magnetic pole 4 is the same as the axial length Ls of the stator magnetic pole. As a result, the rotational change rate of the magnetic flux passing through the rotor magnetic pole and the stator magnetic pole becomes ½ of the maximum value by subtracting the front portion and the rear portion. The value between angles 30° and 60° of Va1 in FIG. 5 is shown as 0.5. After all, the A1 phase voltage Va1 becomes 0.5 between 0° and 60°.

Next, when the rotor magnetic pole 4 approaches from 60° to 90° of θr, the rear portion of the rotor magnetic pole 4 deviates from the A1 phase stator magnetic pole 11. It is from parts (f) to (g) in FIG. 4, and from the position of θr=90°. The rate in changes of the magnetic flux passing through the rotor magnetic pole and the stator magnetic pole becomes a negative maximum value during this period. The range between 60° and 90° of Va1 in FIG. 5 is shown as −1.0. When θr becomes 90°, the rear rotor magnetic pole 1K begins to face the A1 phase stator magnetic pole 11, and the process is repeated from the state where θr is 0°. It is assumed that the magnetic flux passes through the portion where the stator magnetic poles 11 and 12 and the rotor magnetic poles 4J and 1F face each other through the air gap portion.

Similarly, the B1 phase windings 13 and 14 and the B1/ phase winding are connected in series, and the rotor is rotated to the CCW at a constant speed Vso in a state where a constant current Io is applied as a B1 phase current Ib1. The winding voltage at this time is the voltage Vb1 shown in FIG. 5. Similarly, the C1 phase windings 15 and 16 and the C1/ phase winding are connected in series, and the rotor is rotated to the CCW at a constant speed Vso in a state where a constant current Io is applied as the C1 phase current Ic1. The winding voltage at this time is the voltage Vc1 shown in FIG. 5. The voltages Va1, Vb1 and Vc1 have a phase difference of 30° from each other.

Next, the relationship between the winding current of each stator magnetic pole, the magnetic flux interlinking the winding, the induced voltage generated in the winding, and the torque generated by the stator magnetic pole is shown by a mathematical formula. However, it is a mathematical formula that holds under various simplified conditions. The soft magnetic material is magnetically saturated at 2.0 Tesla, and in the region of 2.0 Tesla or less, it is linear and has a sufficiently large relative permeability of 2000 or more. The magnetic flux excited by the current is generated only through the narrow air gap between the stator magnetic pole and the rotor magnetic pole, and no peripheral leakage flux is generated. The magnetic resistance of this air gap and the resistance of each winding are ignored. These are the above simplification conditions. The purpose of describing these mathematical formulas is to qualitatively show the relationship between the shape of each part of the reluctance motor of the present invention and voltage, current, torque, and power, and to clarify quantitatively under specific conditions. It also indicates that the voltage and torque are proportional under specific conditions for the convenience of explaining the reluctance motor of the present invention.

Next, the magnetic flux $\varphi a$ of the A phase, the B phase, and the C phase in the state where the rotor is rotated to the CCW at a constant speed Vso [radian/sec] while the constant current Io [A] having a value close to the continuous rating is energized, $\Phi b$, $\varphi c$ [Wb] and the voltage Va, Vb, Vc [V] and the output power of the reluctance motor Pa, Pb, Pc [W] and the torque Ta, Tb, Tc [Nm] are shown in the following formulas. It is shown by a generalized formula so that it can be applied to the reluctance motors of FIGS. 4, 6, 10, 12, and 14 shown in the present invention.

With respect to the A-phase stator magnetic pole, (rotor axial length)/(axial length Ls of the stator) of each part of the rotor magnetic pole is defined as the axial length ratio Kra. Specifically, (Kra×Ls) is the axial length of the rotor magnetic pole of the portion where the rotor magnetic pole rotates and approaches the A-phase stator magnetic pole. For example, Kra=1 in the portion where the rotor axial length of the rotor magnetic pole is Ls, Kra=0.5 in the portion where the rotor axial length of the rotor magnetic pole is Ls/2, and Kra=0 in the portion where there is no rotor.

In a state like the A1 phase stator magnetic pole 11 and the rotor magnetic pole 1J in FIG. 1, in the portion where the stator magnetic pole and the rotor magnetic pole face each other, the minute change rate $\Delta\varphi$ of the magnetic flux $\varphi$ passing through and the minute rotation angle $\Delta\theta r$ of the rotor are given by the following formula (1). Let the rotor radius be Rr.

$$\Delta\varphi a = Kr \times Ls \times Bo \times \Delta\theta r \times Rr \quad (1)$$

$$d\varphi a/d\theta r = Kra \times Ls \times Bo \times Rr \quad (2)$$

Bo is the magnetic flux density Bo of the magnetic flux generated in the portion where the stator magnetic pole and the rotor magnetic pole face each other in a state where a constant current Io is applied to the winding of the stator magnetic pole.

The constant velocity Vso can be generalized and written as follows.

$$Vso = d\theta r/dt \quad (3)$$

Since the voltage Va induced in the A-phase winding is connected in series with the windings wound around the two stator magnetic poles, the sum of the winding times of both windings is set to Nwa, and the winding resistance is ignored. It becomes formula (4). Then, it can be transformed into the formula (5). The winding voltage Is a time change rate of the number of magnetic flux chain crossings (Nwa× $\varphi a$).

$$Va = Nwa \times d\varphi a/dt \quad (4)$$
$$= Nwa \times (d\varphi a/d\theta r) \times (d\theta r/dt)$$
$$= Kra \times Ls \times Nwa \times Bo \times Rr \times Vso \quad (5)$$

In the formula (5), since (Ls×Nwa×Bo×Rr×Vso) is assumed to be a constant value, the voltage Va is a value proportional to the axial length ratio Kra. The above-mentioned "normalized voltage in FIG. 5" means that (Ls×Nwa×Bo×Rr× Vso), which is a constant value in the formula (5), is assumed to be 1.

The power Pa supplied by the A-phase winding is the product of voltage and current, and Is given by the following formula.

$$Pa = Va \times Io \quad (6)$$

Then, the torque Ta generated by the A phase is given by the following formula, assuming that the supplied power and the mechanical power are equal.

$$Ta = Pa/Vso \quad (7)$$
$$= Va \times Io/Vso \quad (8)$$

In the formula (8), since Io/Vso is a constant value, the A-phase torque Ta is a value proportional to the A-phase voltage Va. The unit of power is [W], torque is [Nm], voltage is [V], current is [A], speed is [radian/sec], and Ls and Rr are [m].

Since the relationship between formulas (2) and (8) is the same for the B phase and the C phase, the relationship is as following formulas.

$$Vb = Krb \times Ls \times Nwa \times Bo \times Rr \times Vso \quad (9)$$

$$Vc = Krc \times Ls \times Nwa \times Bo \times Rr \times Vso \quad (10)$$

$$Tb = Vb \times Io/Vso \quad (11)$$

$$Tc = Vc \times Io/Vso \quad (12)$$

Here, Krb is the axial length ratio of the B phase, and Krc is the axial length ratio of the C phase. However, these are formulas that hold in the section where the stator magnetic pole and the rotor magnetic pole face each other.

The A1 phase voltage Va1, the B1 phase voltage Vb1, and the C1 phase voltage Vc1 described with reference to FIG. 5 correspond to the formulas (5), (9), and (10). Then, based on the formulas (8), (11), and (12), the phase torque values Ta1, Tb1, and Tc1 related to the reluctance motor shown in FIG. 4 are proportional to the respective phase voltages Va1, Vb1, and Vc1, because (Io/Vso) is a constant value. In that sense, the phase torque values Ta1, Tb1, and Tc1 are added in parentheses below the phase voltages Va1, Vb1, and Vc1 in FIG. 5.

Next, a method of generating continuous torque in the positive direction of CCW in the reluctance motor of FIG. 4 will be described. In the section where Ta1 which is the A1 phase torque of FIG. 5 generates a positive torque, θr is 0° to 60° and 90° to 150θ and the current shown in Ia1F of FIG. 5 is energized. In the section where Tb1 which is the B1 phase torque in FIG. 5 generates a positive torque, θr is 30° to 90° and 120° to 180° and the current Ib1F whose phase is delayed by 30° with respect to Ia1F in FIG. 5 is energized. In the section where Tc1 which is the C1 phase torque in FIG. 5 generates a positive torque, θr is 60° to 120° and 150° to 210° and the current Ic1F whose phase is delayed by 60° with respect to Ia1F in FIG. 5 is energized. The CCW voltage and torque in each phase shown in FIG. 5 have a magnitude of 0.5. However, the torque generation sections each have a phase overlap by 30°, and two of the three phases always generate the torque. As a result, the sum of the torque values in each phase is a constant torque value of 1.0 shown in 51 of Tt1 in FIG. 5.

Next, a method of generating torque in the CW direction in a state where the reluctance motor of FIG. 4 rotates at a speed Vso in the CCW direction will be described with reference to FIG. 5. It is also an operation that brakes the motor and regenerates it. In the section where Ta1 which is the A1 phase torque of FIG. 5 generates a negative torque, θr is 60° to 90° and 150° to 180°, and the current shown in the A1 phase current Ia1R of FIG. 5 is energized. In the section where Tb1 which is the B1 phase torque in FIG. 5 generates a negative torque, θr is 90° to 120° and 180° to 210°, and although not shown, the B1 phase current whose phase is delayed by 30° with respect to Ia1R in FIG. 5 is energized. In the section where Tc1 which is the C1 phase torque in FIG. 5 generates a negative torque, θr is 120° to 150° and 30° to 60°, and although not shown, the C1 phase current whose phase is delayed by 60° with respect to Ia1R in FIG. 5 is energized.

The sum of the torques of each phase is a value shown in 52 of Tt1 in FIG. 5, and is a negative constant torque. In this case, there is no portion where the negative torque generation sections of the respective phases overlap, and the torques of the respective phases alternately generate the negative torque to generate a negative constant torque. In addition, Vt1 in FIG. 5 corresponds to the sum of the torques of each phase, and is a virtual voltage obtained by adding the operating voltages of the respective phases. Also, the algorithm that generates torque in the CW direction can basically be generated regardless of the rotation direction and rotation speed, but for convenience of explaining in comparison with CCW torque using FIG. 5, the CW torque at the time of CCW rotation has been described.

Figure 46:
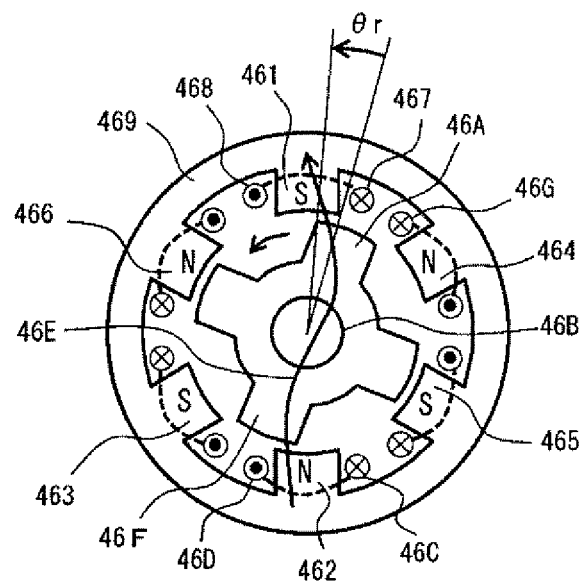
FIG. 46 is a lateral sectional view of a conventional reluctance motor.

It was shown that the conventional reluctance motors shown in FIGS. 46, 47, and 48 have problems of noise, torque ripple, and average torque decrease. On the other hand, the features of the reluctance motors shown in FIGS. 4 and 5 are that the torque generation sections of each phase are widened and the torque generation sections of each phase overlap each other. As shown in FIG. 5, since the torque generation ranges of each phase overlap, the effect of simply canceling the torque pulsation of each phase and various countermeasures become easier.

For the problem of noise, for example, a method can be considered in which the current of each phase in FIG. 5 is increased in the first half 30° and the current value is decreased in the latter half 30°. Specifically, the A1 phase current Ia1 is made large from 0° to 30° of the rotor rotation angle θr in FIG. 5, and is made small from 30° to 60°. Similarly, at this time, the 81 phase current Ib1 is increased from 30° to 60° and decreased from 60° to 90°. Then, the C1 phase current Ic1 is made large from around 60° to 90° and small from 90° to 120°. In this way, by modifying the current energization method of each phase and reducing the current change rate when the current of each phase is reduced to 0 [A], it is possible to reduce the rate of change of the radial suction force, reduce the vibration of the back yoke, case, etc. of the motor, and reduce the noise.

Further, as can be seen from the positive side of the three-phase torque waveforms Ta1, Tb1 and Tc1 shown in FIG. 5, The torque generation range is wide, and the torque waveform is similar to the case where a permanent magnet type three-phase AC synchronous motor is driven by so-called 120° energization. Therefore, deformation and vibration in the circumferential direction of the teeth of the stator and the teeth of the rotor can be reduced, and noise can be reduced.

Regarding the problem of torque ripple, as can be inferred from the characteristics of FIG. 48, the torque of the A1 phase torque Ta1 of FIG. 5 is relatively large from 0° to around 30°, and the torque decreases as it approaches 60°. However, the B1 phase torque Tb1 is relatively large between 30° and 60°, and is in a relationship that compensates for the decrease in the A1 phase torque Ta1. In the reluctance motor of the present invention shown in FIGS. 4 and 5, the relationship is the same between the three phases, the torque pulsation of each phase has an effect of canceling each other, and the torque ripple is reduced. It also has the effect of reducing noise and vibration.

As described above, in the case of the A phase, the problem of the average torque decrease can be compensated by increasing the current from 0° to the vicinity of 30°, which has a large torque constant. However, in the reluctance motors shown in FIGS. 1, 4 and 5, the energization section of the current energizing each phase is doubled, so that the copper loss of the reluctance motor is doubled. The reduction of copper loss can be supplemented by other techniques shown in the present invention, such as shortening the circumferential length of the front portion of each rotor magnetic pole in the CCW direction.

Second Embodiment

Figure 6:
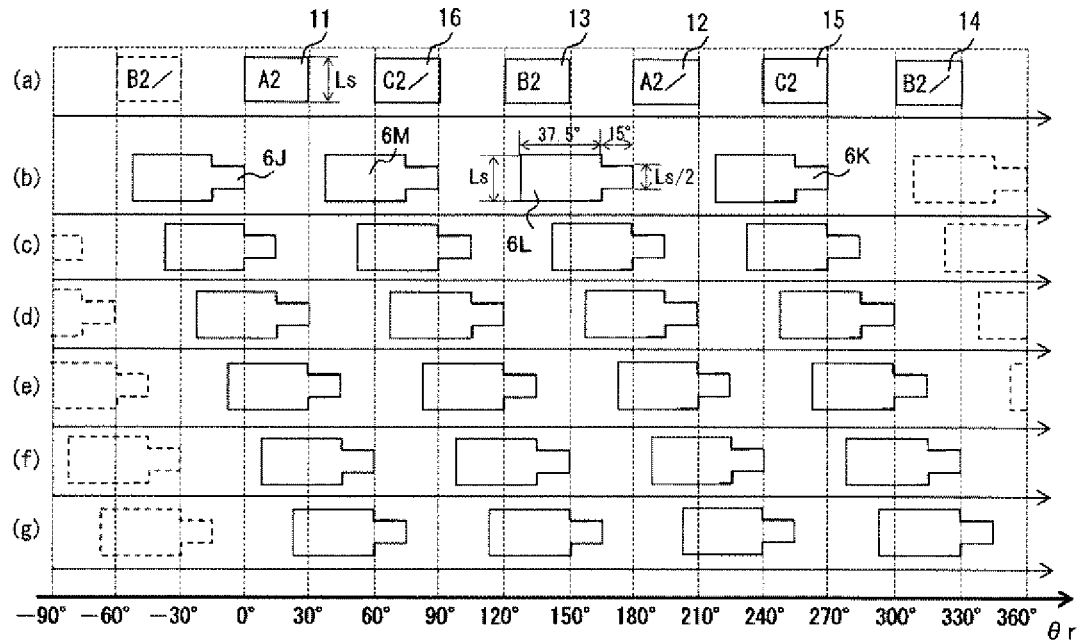
FIG. 6 is a horizontally developed view of both stator magnetic poles and rotor magnetic poles of a motor according to the present invention.
Figure 7:
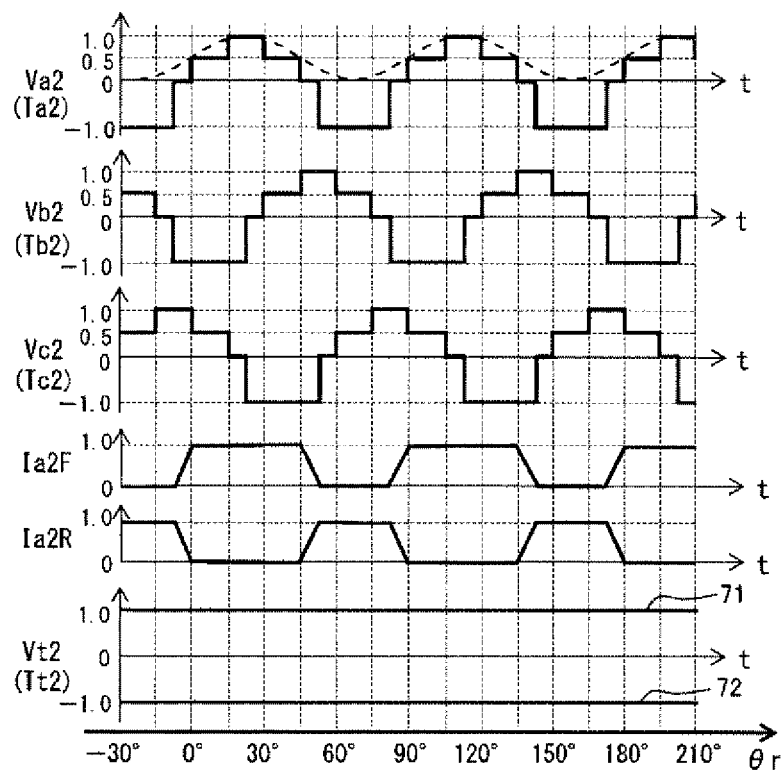
FIG. 7 is a graph exemplifying voltages, currents and torque values of the motor according to the present invention.

Next, another example of the present invention will be shown and described with reference to FIGS. 1, 6, and 7. The cross-sectional view 1 of the reluctance motor will be described in common with FIGS. 4, 6 and 14. The expression methods of FIGS. 6 and 7 are the same as those of FIGS. 4 and 5. Here, the description of the expression method and the like will be omitted. The reluctance motor shown in FIG. 6 has a different rotor shape from the reluctance motor shown in FIG. 4.

FIG. 6(a) shows the shape of the inner peripheral surface of the stator magnetic pole SP as seen from the air gap surface between the stator and the rotor, and the circumferential direction of the CCW is the horizontal axis direction of FIG. 6. It is the figure which developed linearly so that it may be in the right direction of the paper surface in FIG. 6. The vertical axis direction of the paper in FIG. 6 is the direction of the rotor axis. 11 in FIG. 6 is an A2 phase stator pole, 12 is an A2/ phase stator pole, 13 is a B2 phase stator pole, 14 is a B2/ phase stator pole, 15 is a C2 phase stator pole, and 16 is a C2/ phase stator pole. The shape of the air gap surface of the stator magnetic poles of each phase has a circumferential angular width θBs of 30° and a rotor axial length of Ls.

FIG. 6(b) shows the shape of the outer peripheral surface of the rotor magnetic pole RP as seen from the air gap surface, and the circumferential direction of CCW in FIG. 1 is the horizontal axis direction in FIG. 6, that is, the figure which developed linearly so that it may be in the right direction of the paper surface in FIG. 6. The value of the rotor rotation angle position θr is shown at the bottom of FIG. 6. The angle position θr in FIG. 6B is 0°. This angle position θr indicates from −90° to 360°.

The rotor magnetic pole 6J of FIG. 6(b) is the same as the rotor magnetic pole 1J of FIG. 1, and the rotor rotation angle position θr is 0°. The circumferential angular width θBr of each rotor magnetic pole in FIG. 6 is 52.5°. Four rotor magnetic poles of 6J, 6K, 6L, and 6M are arranged in a range of 360 degrees. Explaining the shape of each rotor magnetic pole separately for the front portion and the rear portion in the CCW direction, as shown in the figure, the front part in the CCW direction has a circumferential angular width of 15° and a rotor axial length of Ls/2. The rear portion has a circumferential angular width of 37.5° and a rotor axial length of Ls.

FIG. 6(c) shows a rotor shape rotated by 15° from the rotor position of FIG. 6(b) to CCW, and θr is 15°. FIG. 6(d) is further rotated by 15° to CCW, and θr is 30°. Parts (e), (f), and (g) of FIG. 6 are views in which the rotor is similarly advanced to CCW by 15°. By rotating the rotor in this way and changing the rotor rotation angle position θr, the magnetic relative relationship between each rotor magnetic pole RP and each stator magnetic pole SP changes. Therefore, it is possible to obtain the rotational torque of the rotor by energizing each phase winding of each stator magnetic pole SP by applying a current at an appropriate timing.

Now, with the A2 phase windings 17 and 18 and the A2/ phase windings 1C and 1D connected in series and a constant current Io with a value close to the continuous rating as the A2 phase current Ia2 is energized, Consider a state in which the rotor is rotated to CCW at a constant speed Vso. The CCW direction of FIG. 1 is the right direction of the paper surface of FIG. 6. The winding voltage at this time is the voltage Va2 in FIG. 7. The horizontal axis of Va2 is time t, and the value of the rotor rotation angle position θr at that time is shown at the bottom of FIG. 7.

First, when the rotor magnetic pole 6J approaches from 0° to 15° of θr, the front portion of the rotor magnetic pole 6J faces the A2 phase stator magnetic pole 11 via an air gap. Such facing is shown in the states shown by parts (b) to (c) of FIG. 6. The rotor axial length of the front portion of the rotor magnetic pole 6J is ½ of the axial length Ls of the stator magnetic pole, and the rotational change rate of the magnetic flux passing through the rotor magnetic pole and the stator magnetic pole is ½ of the maximum value. The value between 0° and 15° of Va2 in FIG. 7 is shown as 0.5.

Next, when the rotor magnetic pole 6J approaches from 15° to 30° of θr as shown in FIG. 6(c), the rear portion of the rotor magnetic pole 6J faces the A2 phase stator magnetic pole 11 via an air gap. The axial length of the rear portion of the rotor magnetic pole 6J is Ls, and the rotational change rate of the magnetic flux passing through the rotor magnetic pole and the stator magnetic pole is the maximum value. The value of Va2 in FIG. 7 between 15° and 30° is shown as 1.0. When the rotor magnetic pole 63 approaches from 30° to 45° of θr as shown in FIG. 6(d), the rear portion of the rotor magnetic pole 6J further faces the stator magnetic pole 11. On the other hand, the front portion of the rotor magnetic pole 6J deviates from the stator magnetic pole 11. As a result, the rotational change rate of the magnetic flux passing through the rotor magnetic pole 6J and the stator magnetic pole 11 becomes ½ of the maximum value by subtraction. The value of Va2 in FIG. 7 between 30° and 45° is shown as 0.5.

As shown in FIG. 6(e), the entire surface of the stator magnetic pole 11 faces the rotor magnetic pole 6J while the rotor magnetic pole 63 is between 45° and 52.5° of θr. The rotational change rate of the magnetic flux passing through the stator magnetic pole 11 is 0, and the value of Va2 in FIG. 7 during this period is 0. As shown in FIGS. 6 (e) to 6 (f), when the rotor magnetic pole 6J is between 52.5° and 60° of θr, the rear portion of the rotor magnetic pole 6J deviates from the stator magnetic pole 11. The rotational change rate of the magnetic flux passing through the stator magnetic pole 11 is −1. As shown in FIG. 6(f), when the rotor magnetic pole 6J is between 75° and 82.5° of θr, the rear portion of the rotor magnetic pole 6J deviates from the stator magnetic pole 11. The rotational change rate of the magnetic flux passing through the stator magnetic pole 11 is −1. After all, the value of Va2 in FIG. 7 is −1 between 52.5° and 82.5° of θr.

When the rotor rotation angle position θr is from 82.5° to 90°, there is no rotor magnetic pole facing the stator magnetic pole 11, and the value of Va2 in FIG. 7 is 0. When θr reaches a rotion angle position 90°, the rotor magnetic pole 6K approaches the stator magnetic pole 11, and the state shown in FIG. 6B is reached, returning to the initial state of the operation description. The operation is repeated to continuously rotate to the CCW direction.

Similarly, the B2 phase windings 13 and 14 of FIG. 6 and the B2/ phase winding are connected in series, and the rotor is transferred to the CCW at a constant speed Vso with a constant current Io as the B2 phase current Ib2. The winding voltage at this time is the voltage Vb2 shown in FIG. 7. Similarly, the C2 phase windings 15 and 16 and the C2/ phase winding are connected in series, and the rotor is rotated to the CCW at a constant speed Vso in a state where a constant current Io is applied as a C2 phase current Ic2. The winding voltage at this time is the voltage Vc2 shown in FIG. 7. The voltages Va2, Vb2, and Vc2 have a phase difference of 30° from each other. The values of each voltage are normalized by the formulas (5), (9), and (10).

The A2 phase voltage Va2, the B2 phase voltage Vb2, and the C2 phase voltage Vc2 described with reference to FIG. 7. Then, from the formulas (8), (11), and (12), Since (Io/Vso) is a constant value, each phase torque Ta2, Tb2, and Tc2 related to the reluctance motor of FIG. 6 is respectively proportional to each phase voltage Va2, Vb2, and Vc2. In that sense, the phase torques Ta2, Tb2, and Tc2 are added in parentheses below the phase voltages Va2, Vb2, and Vc2 in FIG. 7. However, it is a mathematical formula that holds under the above-mentioned various simplified conditions.

Next, a method of generating continuous torque in the positive direction of CCW with the reluctance motor of FIG. 6 will be described. In the section where Ta2, which is the A2 phase torque of FIG. 7, generates a positive torque, θr is 0° to 45° and 90° to 135°, and the current shown in Ia2F of FIG. 7 is energized. As described above, since the section between 45° and 52.5° of the rotor rotation angle position θr and between 82.5° and 90° is a section in which A2 phase Va2 is 0 [V], It can be used as an increase time and a decrease time of the A2 phase current Ia2F, and can be a trapezoidal current as shown in Ia2F of FIG. 7. Since the copper loss can be reduced by shortening the energization section, the time for increasing or decreasing the current can be shortened according to the rotation speed.

In the section where Tb2, which is the B2 phase torque in FIG. 7, generates a positive torque, θr is 30° to 75° and 120° to 165°, and the current Ib2F whose phase is delayed by 30° with respect to Ia2F In FIG. 7 is energized. In the section where Tc2, which is the C2 phase torque in FIG. 7, generates a positive torque, θr is 60° to 105° and 150° to 195°, and the current Ic2F whose phase is 60° behind Ia2F in FIG. 7 is energized. When the positive part of the torque Ta2 of the A2 phase, the positive part of the torque Tb2 of the B2 phase, and the positive part of the torque Tc2 of the C2 phase are added, it becomes 71 of Tt2 in FIG. 7, and the positive constant torque is 1.0. Therefore, the torque of the three phases has a stepped characteristic of 0.5 and 1.0, respectively, but the rotor shape is such that the torque becomes a constant torque when the torques of the three phases are added.

Next, a method of generating torque in the CW direction in a state where the reluctance motor of FIG. 6 rotates at a speed Vso in the CCW direction will be described with reference to FIG. 7. It is also an operation that brakes the motor and regenerates it. The section in which Ta2, which is the A2 phase torque in FIG. 7, generates a negative torque is between 52.5° to 82.5° and 142.5° to 172.5° of θr, and the value of Ta2 in FIG. 7 becomes −1. During this time, the A2-phase current Ia2R shown in FIG. 7 is energized. The section between 45° and 52.5° of the rotor rotation angle position θr and between 82.5° and 90° is a section in which the A2 phase voltage Va2 is 0 [V]. Since it can be used as an increase time and a decrease time of the A2 phase current Ia2R, a trapezoidal current as shown in Ia2R of FIG. 7 can be obtained. Similarly, as the B2 phase current Ib2, a current whose phase is delayed by 30° from Ia2R in FIG. 7 is energized. Also, as the C2 phase current Ic2, a current whose phase is delayed by 6° from Ia2R in FIG. 7 is energized.

The sum of the negative torques of each phase is the value shown in 72 of Tt2 in FIG. 7, and is a negative constant torque. In this case, there is no portion where the negative torque generation sections of the respective phases overlap, and the torques of the respective phases alternately generate the negative torque to generate a negative constant torque. The voltage Vt2 in FIG. 7 corresponds to the sum of the torques of each phase, and is also a virtual voltage obtained by adding the operating voltages of the respective phases. Further, the algorithm for generating the torque in the CW direction can be generated in principle regardless of the rotation direction and the rotation speed, but for convenience of explaining in comparison with CCW torque using FIG. 7, the CW torque generated during the CCW rotation has been described.

The motor of the present invention shown in FIGS. 1, 6 and 7 has unique characteristics as described above. For the problem of noise, for example, a method of increasing the current of each phase in FIG. 7 in the first half and decreasing the current value in the second half can be considered. Specifically, for example, the A2 phase current Ia2 is made large from 0° to 15° of the rotor rotation angle θr in FIG. 7, and is made small from 30° to 45°. Similarly, at this time, the B2 phase current Ib2 is Increased from 30° to 45° and decreased from 60° to 75°. Similarly, the C2 phase current Ic2 is increased from 60° to 75° and decreased from 90° to 105°. In this way, by modifying the current energization method of each phase, that is, the magnitude of the current, and reducing the current change rate when the current of each phase decreases from a large current value to 0 [A], The rate of change of the radial direction suction force will be reduced. As a result, vibration of the back yoke and case of the motor can be reduced, and noise can be reduced.

Further, since the current waveforms Ia2F and Ia2R in FIG. 7 can be trapezoidal current waveforms, noise can be reduced by suppressing the current change rate such as a rapid Increase or decrease of each phase current. Further, as shown in FIG. 7, the torque of each phase generates torque in a section of 50%. Then, in the section where the torque of each phase is 0.5 in FIG. 7, two of the three phases generate torque. In this way, by generating torque in a section where the stator magnetic poles of each phase are wide and by overlapping the torque generating sections with each other in the three phases, smoother rotation can be realized and noise can be reduced.

For comparison, the torque of one phase of the three-phase sinusoidal AC motor is shown by the broken line in FIG. 7. This broken line is a squared formula of a sine wave, and its conversion formula is $(\sin\theta \times \sin\theta) = (1-\cos(2\theta))/2$. Note that this formula and the broken line are ideal torque waveform shapes of one phase of the three-phase AC motor, and when the torques of the three phases are added, the constant value becomes 3/2. Here, focusing only on the positive torque portion of Ta2 in FIG. 7, smoothing the stepped torque waveform and considering the fundamental wave component, it can be inferred that the waveform is similar to the broken line. Therefore, the positive torque of each phase in FIG. 7 is similar to the torque of a synchronous motor driven by a three-phase sine wave, even though it is a reluctance motor driven by a current having a substantially square wave shape, and it can be expected to reduce noise and vibration. Further, as described above, the total of the positive torques of the reluctance motor of FIG. 6 is a constant value shown in 71 of Tt2 of FIG. 7.

The copper loss in the driving method of FIG. 7 will be described. When rotating in the CCW direction, the current of each phase energizes the current at 50% of the total energization section, and the copper loss Increases as compared with the case of 33% of the energization section of the conventional method of FIG. 47. Priority is given to the quietness of the motor. A method for significantly reducing copper loss and a method for increasing torque of the motor of the present invention will be described later.

Further, the shape of each rotor magnetic pole shown in FIG. 6 has a two-stage shape of a front portion having an axial length of Ls/2 and a rear portion having an axial length of Ls, but it can be deformed into various shapes. For example, it is possible to modify the shape of the rotor magnetic pole so that the positive side portion of the A2 phase torque Ta2 shown in FIG. 7 has a characteristic closer to $(1-\cos(2\theta))/2$. The staircase shape becomes smoother. Further, since each torque characteristic can be created by the relative magnetic characteristics of the stator magnetic pole and the rotor magnetic pole, not only the rotor magnetic pole shape but also the stator magnetic pole shape can be deformed.

Further, in FIG. 6, the length of the front portion of each rotor magnetic pole in the rotor axial direction Is Ls/2, which is doubled in terms of the magnetic resistance value in the radial direction, that is, 200%. Although The length in the rotor axial direction of the front portion, that is, the magnetic resistance value in the radial direction can take various values, if it is 20% or more larger than the magnetic resistance value at the rear portion of the rotor magnetic pole, the effect of expanding the angle width for outputting torque and reducing noise can be exhibited. At this time, each stator magnetic pole can generate torque over an angular width larger than the circumferential angular width of the stator magnetic pole. Further, as a method of changing the torque waveform from the stepped shape of FIG. 7 to a smoother shape, there is a method of changing the drive current waveform from a rectangular shape to a trapezoidal wave or a smoother waveform, and it can be selected according to the shape of the front portion of the rotor magnetic pole.

The length of the front portion of the rotor magnetic pole in the rotor axial direction, that is, the method of designing and manufacturing the magnetic resistance value in the radial direction, is a promising method such as drilling a hole in an electromagnetic steel sheet shown later in FIG. 17, and it is excellent in terms of magnetic characteristics such as eddy currents, productivity, and mass productivity.

Further, as shown in FIGS. 4, 6, 10, 12, and 16, various values and various shapes can be selected for the circumferential angular width of the front portion of the rotor magnetic pole. The torque generation width of each rotor magnetic pole is expanded, noise is reduced, copper loss is increased, and the advantages and disadvantages of the drive circuit are involved. Further, as shown in FIGS. 7, 11 and 13, since the torque shape can be stepped if the circumferential angular width of the front portion of the rotor magnetic pole is 10% or more of the circumferential angular width of the rear portion, the effect of expanding the torque generation range and reducing noise can be expected.

Further, in the motor of the present invention shown in FIGS. 1, 6 and 7, the example in which the torque of each phase does not overlap with respect to the torque of CW has been described, but the width of each stator magnetic pole in the circumferential direction is changed from 30°. If (30°+α), the CW torque can be overlapped by the angle of α. And the driving method for the angle of a can also be changed. It is also possible to change the shape of the stator magnetic poles before and after the circumferential direction like the rotor magnetic poles. However, there is a problem of space for winding arrangement. It is also possible to skew the rotor or the stator.

Third Embodiment

Figure 8:
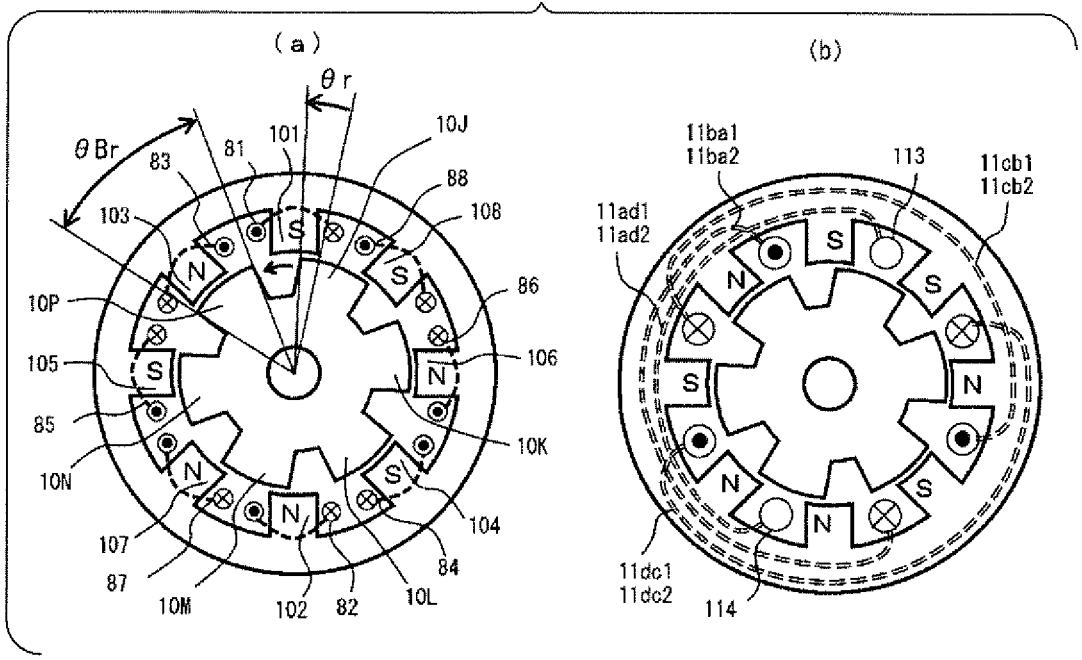
FIG. 8 is a lateral sectional view exemplifying a motor according to the present invention.

Next, FIG. 8(a) shows an example of a cross-sectional view of another reluctance motor of the present invention. It is a reluctance motor with 8 stator magnetic poles and 6 rotor magnetic poles. The expression method of FIG. 8A is the same as that of FIG. 1. The configuration of the reluctance motor shown in FIG. 8A is point-symmetrical with respect to the center point of the rotor, and the generated magnetic flux passes 180° opposite to the electric angle. In that case, when the number of stator magnetic poles is a multiple of 4, there will be a portion where the north and south poles of the stator magnetic poles cannot be arranged alternately in the circumferential direction. FIG. 8 shows an example in which the arrangement of the stator magnetic poles is partially irregular. On the other hand, when the number of stator magnetic poles is 6, 10, 14, or 18 in FIG. 9, the north and south poles of the stator magnetic poles can be alternately arranged in the circumferential direction.

A reference sign 101 of FIG. 8 is an A3 phase stator magnetic pole, in which a concentrated winding 81 shown by a broken line is wound, the winding is indicated by a current symbol, and a one-way A3 phase current Ia3 is energized in the direction of the current symbol. Reference sign 102 denotes an A3/ phase stator magnetic pole, which winds the concentrated winding 81 shown by the broken line and energizes the unidirectional A3 phase current Ia3 In the direction of the current symbol. Normally, the winding 81 and the winding 82 are connected in series, and the same A3 phase current Ia3 Is applied to both windings. At that time, 102 becomes the north pole and 101 becomes the south pole. In the case of the state (a) of FIG. 8, the magnetic flux excited passes through the rotor magnetic poles 10M and 10J from the stator magnetic pole 102, passes through the stator magnetic pole 101, and makes a round through the back yoke. In that case, CCW torque is generated in the rotor.

Similarly, a reference sign 103 denotes a B3 phase stator magnetic pole, which winds the concentrated winding 83 shown by the broken line. Reference sign 104 denotes a B3/ phase stator magnetic pole, which winds the concentrated winding 84 shown by the broken line. The winding 83 and the winding 84 are connected in series, and the same B3 phase current Ib3 is applied to both windings in the direction of the current symbol. At that time, 103 becomes the north pole and 104 becomes the south pole.

Similarly, reference sign 105 denotes a C3 phase stator magnetic pole, which winds the concentrated winding 85 indicated by the broken line. Reference sign 106 denotes a C3/ phase stator magnetic pole, which winds the concentrated winding 86 shown by the broken line. The winding 85 and the winding 86 are connected in series, and the same C3 current Ic3 is applied to both windings in the direction of the current symbol. At that time, 106 becomes the north pole and 105 becomes the south pole.

Similarly, a reference sign 107 denotes a D3 phase stator magnetic pole, which winds the concentrated winding 87 shown by the broken line. Reference sign 108 denotes a D3/ phase stator magnetic pole, which winds the concentrated winding 88 shown by the broken line. The winding 87 and the winding 88 are connected in series, and the same D3 current Id3 is applied to both windings in the direction of the current symbol. At that time, 107 becomes the north pole and 108 becomes the south pole.

Here, the same poles of the S poles of the stator magnetic poles 101 and 108 are aligned in the circumferential direction, and the positive current side of the winding 81 and the negative current side of the winding 88 are arranged in the slots located between them. Similarly, the same poles of the north poles of the stator magnetic poles 107 and 102 are arranged in the circumferential direction, and the positive current side of the winding 87 and the negative current side of the winding 82 are arranged in the slots located between them. As described above, when the number of stator magnetic poles is an integral multiple of 4, such Irregularity occurs.

Figure 10:
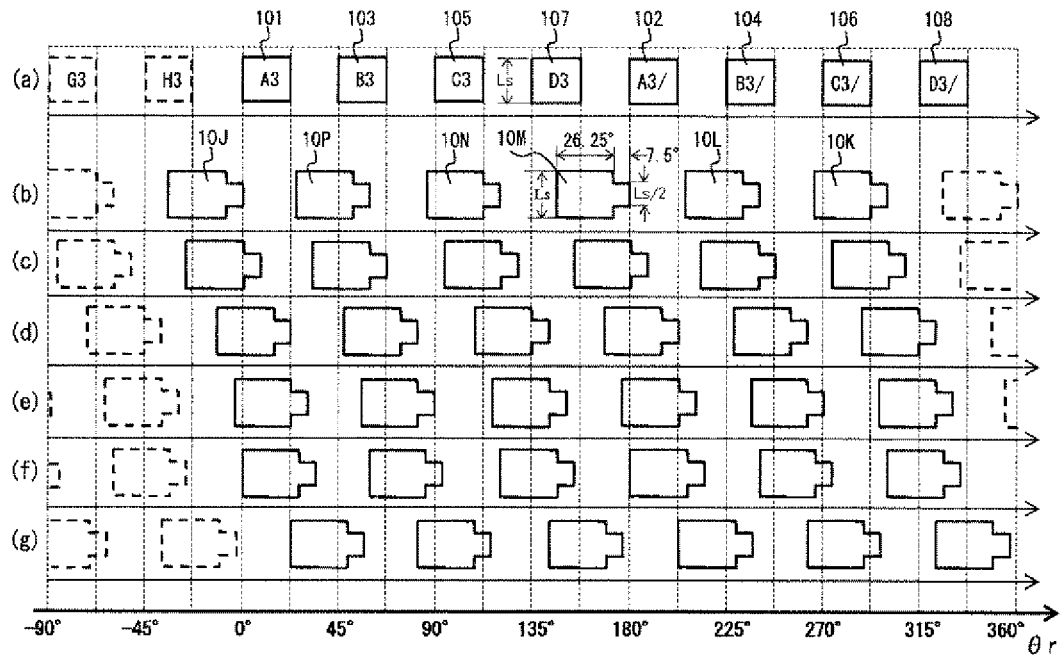
FIG. 10 is a horizontally developed view of both stator magnetic poles and rotor magnetic poles of the motor according to the present invention.
Figure 11:
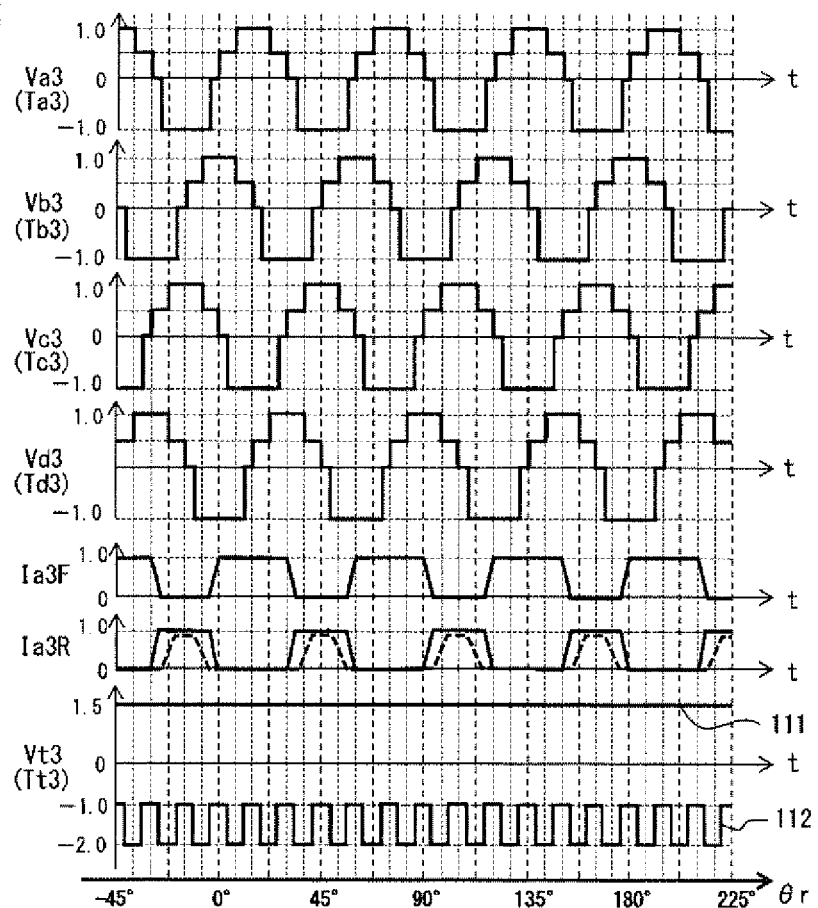
FIG. 11 is a graph exemplifying voltages, currents and torque values of the motor according to the present invention.

Next, the voltage, current, and torque of the reluctance motor of FIG. 8A will be shown and described in FIGS. 10 and 11. This shows a situation where the rotation in the CCW direction generates CCW torque or CW torque. In FIG. 10A, the shape of the inner peripheral surface of the stator magnetic pole SP seen from the air gap surface between the stator and the rotor is linearly developed so that the circumferential direction of the CCW is the horizontal axis direction of FIG. 10. The vertical axis direction in FIG. 10 is the rotor axial direction. In FIG. 10, 101 is an A3 phase stator pole, 102 is an A3/ phase stator pole, 103 is a B3 phase stator pole, 104 is a B3/ phase stator pole, 105 is a C3 phase stator pole, and 106 is a C3/ phase stator pole. 107 is a D3 phase stator magnetic pole, and 108 is a D3/ phase stator magnetic pole. The shape of the air gap surface of the stator magnetic poles of each phase has a circumferential angular width θBs of 22.5° and a rotor axial length of Ls. Those having the same reference signs in FIG. 8 (a) and FIG. 10 are the same.

FIG. 10(*b*) shows the outer peripheral surface shape of the rotor magnetic pole RP as seen from the air gap surface, and the circumferential direction of the CCW of FIG. 8(*a*) is the horizontal axis direction of FIG. 10. That is, it is a figure developed in a straight line so as to be in the right direction of the paper surface of FIG. 10. In FIG. 8(*a*), the starting point of the rotor is the rotation angle position of the clockwise end of the A3 phase stator magnetic pole 101, and the rotor rotation angle position θr is from the starting point to the end of the rotor magnetic pole 10J in the CCW direction. The starting point of the rotor in FIG. 10 is the left end of the stator magnetic pole 101 on the paper. The value of the rotor rotation angle position θr at the bottom of that point is set to 0°. The rotor rotation angle position θr in FIG. 10 is from the start point to the right end of the rotor magnetic pole 10J. In FIG. 10, the right end of the rotor magnetic pole 10J is also the tip of the CCW of 10J in FIG. 8(*a*). The rotation angle position θr of the rotor of FIG. 10 (*b*) is 0°. In FIG. 10, the rotation angle position θr is shown from −90° to 360°.

Next, the shape of the rotor magnetic pole will be described. The circumferential angular width θBr of each rotor magnetic pole in FIGS. 8(*a*) and 10 is 33.75°. The width of each rotor magnetic pole in the rotor axis direction is different between the 7.5° width portion in the front portion and the 26.25° width portion in the rear portion in the CCW direction. The 7.5° width portion of the front portion has a rotor axial length of Ls/2. The 26.25° portion of the rear portion has a rotor axial length of Ls, which is the same length as the rotor axial length of each stator magnetic pole SP.

In FIG. 10(*c*), the rotor position θr in FIG. 10(*b*) is rotated by 7.5° from the rotor position θr=0° in the CCW direction, and θr is 7.5°. FIG. 10(*d*) is further rotated by 15° to CCW, and θr is 22.5°. In FIG. 10, θr in (e) is 30°, θr in (f) is 33.75°, and θr in (g) is 56.25°. By rotating the rotor in this way and changing the rotor rotation angle position θr, the magnetic relative relationship between each stator pole SP and each rotor pole RP changes. Therefore, rotational torque of the rotor can be obtained by exciting each stator magnetic pole SP at an appropriate timing.

Next, the relationship between the voltage acting when a current is applied to each winding of the stator magnetic pole, the motor output power, and the torque will be described. However, it is a characteristic when the electromagnetic relationship is simply modeled. Now, consider the A3 phase winding 81 and the A3/ phase winding 82 of FIG. 8A are connected in series, and a constant current Io [A] having a value close to the continuous rating as the A3 phase current Ia3 is energized, and the rotor is rotated to CCW at a constant speed Vso [radian/sec]. The CCW direction of FIG. 8A is the right direction of the paper surface of FIG. 10. The winding voltage of the A3 phase at this time is the voltage Va3 in FIG. 11. The horizontal axis of Va3 in FIG. 11 is the time t, and the value of the rotor rotation angle position θr at that time is shown in the lowermost stage of FIG. 11.

First, the magnetic flux interlinking with the A3 phase winding when the rotor rotation angle position θr approaches from 0° to 7.5° and the A3 phase winding voltage Va3 will be described. The rotor magnetic pole 10J starts to face the A3 phase stator magnetic pole 101 from 0° of θr via an air gap. It is the state from (b) to (c) of FIG. 10. The rotor axial length of the front portion of the rotor magnetic pole 10J is ½ of the axial length Ls of the stator magnetic pole, and rotational change rate of the magnetic flux passing through the rotor magnetic pole and the stator magnetic pole is ½ of the maximum value. Here, the voltage in FIG. 11 is normalized by the formulas (5), (9), (10), and The A3 phase winding voltage Va3 between 0° and 7.5° of Va3 is shown as 0.5.

Next, when θr is between 7.5° and 22.5°, it is the state from a part (c) to a part (d) in FIG. 10. The rear portion of the rotor magnetic pole 10J faces the A3 phase stator magnetic pole 101, and the magnetic flux passing through the rotor magnetic pole 10J has a maximum axial length Ls and increases with rotation. The rotational change rate of the magnetic flux passing through the rotor magnetic pole and the stator magnetic pole becomes the maximum value. As a result, the winding voltage Va3 of the A3 phase in which θr in FIG. 11 is between 7.5° and 22.5° is 1.0.

Next, when θr is between 22.5° and 30°, it is the state from (d) to (e) in FIG. 10. The rear portion of the rotor magnetic pole 10J faces the A3 phase stator magnetic pole 101, and the passing magnetic flux increases with rotation. On the other hand, the front portion of the rotor magnetic pole 10J deviates from the A3 phase stator magnetic pole 101. An increase in the subtraction of the magnetic fluxes is ½, and the rotational change rate of the magnetic flux passing through the rotor magnetic pole and the stator magnetic pole is ½ of the maximum value. As a result, the winding voltage Va3 of the A3 phase in which θr in FIG. 11 is between 22.5° and 30° is 0.5.

Next, when θr is between 30° and 33.75°, it is the state from a part (e) to a part (f) in FIG. 10. During this period, since the rotor magnetic pole 103 faces the entire surface of the stator magnetic pole 101, the magnetic flux passing through is constant. Therefore, the rotational change rate of the magnetic flux passing from the rotor magnetic pole to the stator magnetic pole is 0. The winding voltage Va3 of the A3 phase in which θr in FIG. 11 is between 30° and 33.75° is 0.

Next, when θr is between 33.75° and 56.25°, it is the state from a part (f) to a part (g) in FIG. 10. The rear portion of the rotor magnetic pole 10J deviates from the state of facing the A3 phase stator magnetic pole 101, and is completely disengaged when θr is 56.25°. During this time, the magnetic flux passing through decreases with rotation. The rotational change rate of the magnetic flux passing through the rotor magnetic pole and the stator magnetic pole has a negative maximum value. As a result, the winding voltage Va3 of the A3 phase in which θr in FIG. 11 is between 33.75° and 56.25° is −1.0.

Next, when θr is between 56.25° and 60°, it is a state from a part (g) in FIG. 10 to a part (b) in FIG. 10 in the original state. Since the distance between the rotor magnetic poles is 60°, the process returns to the original state (b) where the explanation was first started. During this period, the stator magnetic pole 101 does not face the rotor magnetic pole 10J, so the magnetic fluxes passing through is 0 and constant. The winding voltage Va3 of the A3 phase in which θr in FIG. 11 is between 56.25° and 60° is 0. As described above, θr rotates by repeating the operation of 0° to 60°.

As for the B3 phase, the winding 83 wound around the B3 phase stator magnetic pole 103 in FIG. 8(*a*) and the winding 84 wound around the B3/ phase stator magnetic pole are wound in series with the same polarity. Then, the rotor is rotated to CCW at a constant speed Vso [radian/sec] while a constant current Io [A] having a value close to the continuous rating is applied to this winding. The winding voltage of the B3 phase at this time is the voltage Vb3 of FIG. 11, which is a voltage whose phase is delayed by 45° with respect to the A3 phase voltage Va3. Since the period is 60°, it is also a voltage whose phase is advanced by 15°.

Similarly, the C3 phase voltage Vc3 is the voltage of the winding in which the windings 85 and 86 are wound in series, which is the voltage Vc3 in FIG. 11, which is a voltage whose phase is delayed by 30° with respect to the A3 phase voltage Va3. Similarly, the D3 phase voltage Vd3 is the voltage of the winding in which the windings 87 and 88 are wound in series, which is the voltage Vd3 in FIG. 11, which Is a voltage whose phase is delayed by 15° with respect to the A3 phase voltage Va3.

The voltage of each of these phases has a relationship provided by the formulas (1) to (12). The same formulae apply to the D phase. However, it is a mathematical formula that holds under the above-mentioned various simplified conditions. Further, the values of each voltage, each current, and each torque are normalized by the formulas (5), (9), (10) and the like.

The A3 phase voltage Va3, the B3 phase voltage Vb3, the C3 phase voltage Vc3, and the D3 phase voltage Vd3 described with reference to FIG. 11 have the relationship of the formula (5). Then, (Io/Vso) is a constant value in A3 phase torque Ta3, B3 phase torque Tb3, C3 phase torque Tc3, D3 phase torque Td3 which related to the reluctance motor of FIG. 8 (*a*) so that the A phase torque is proportional to the A phase voltage in the formula (8). It is proportional to each phase voltage Va3, Vb3, Vc3, and Vd3, respectively. In that sense, the phase torques Ta3, Tb3, Tc3, and Td3 are added in parentheses under each phase voltage Va3, Vb3, Vc3, and Vd3 in FIG. 11.

Next, a method of generating continuous torque in the positive direction of CCW by the reluctance motor shown in FIG. 8A, FIG. 10 and FIG. 11 will be described. In the section where Ta3, which is the A3 phase torque of FIG. 11, generates a positive torque, θr is 0° to 30°, 60° to 90°, and the like, and the current shown in Ia3F of FIG. 11 is energized. Here, for example, since the winding voltage Va3 is 0 between θr of −3.75° and 0° and between 30° and 33.75°, there is no effect on torque, and it is used as the current increase time and decrease time. doing. In the section where Tb3, which is the B3 phase torque in FIG. 11, generates a positive torque, θr is 45° to 75°, 105° to 135°, and the like, and the current Ib3F whose phase is delayed by 45° with respect to Ia3F in FIG. 11 is energized. In the section where Tc3, which is the C3 phase torque in FIG. 11, generates a positive torque, θr is 30° to 60°, 90° to 120°, and the like, and the current Ic3F whose phase is delayed by 30° with respect to Ia3F in FIG. 11 is energized.

In the section where Td3, which is the D3 phase torque in FIG. 11, generates a positive torque, θr is 15° to 45° and 75° to 105°, and the current Id3F whose phase is delayed by 15° with respect to Ia3F in FIG. 11 is energized. The sum of the positive torques of each phase at this time is the torque shown in 111 of Vt3 in FIG. 11, which is a constant value having a magnitude of 1.5. At all times, two of the four phases are generating torque, and the sum is 1.5.

Next, a method of generating torque in the CW direction in a state of rotating at a speed Vso in the CCW direction with the reluctance motors of FIGS. 8A, 10 and 11 will be described with reference to FIG. 11. It is also an operation that brakes the motor and regenerates it. In the section where Ta3, which is the A3 phase torque in FIG. 11, generates a negative torque, θr is 33.75° to 56.25°, 93.75° to 116.25°, and the like, the trapezoidal current shown by the solid line of Ia3R in FIG. 11 is energized. Here, for example, since the winding voltage Va3 is 0 between θr of −3.75° and 0° and between 30° and 33.75°, there is no effect on torque, and it is used as the current increase time and decrease time. The same applies to other current cycles of Ia3R. In the section where Tb3, which Is the B3 phase torque in FIG. 11, generates a negative torque, θr is 18.75° to 41.25°, 78.75° to 101.25°, and the like, and the current Ib3R whose phase is 45° behind Ia3R in FIG. 11 is energized. In the section where Tc3, which is the C3 phase torque in FIG. 11, generates a negative torque, θr is 48.75° to 71.25°, 108.75° to 131.25°, and the like, the current Ic3R whose phase is delayed by 30° with respect to Ia3R in FIG. 11 is energized. In the section where Td3, which is the D3 phase torque in FIG. 11, generates a negative torque, θr is 48.75° to 71.25°, 108.75° to 131.25°, and the like, and the current Id3R whose phase Is delayed by 15° with respect to Ia3R in FIG. 11 is energized.

The sum of the torques of each phase is the value shown in 112 of Tt3 in FIG. 11, and has a torque characteristic in which the values of −1.0 and −2.0 are repeated every 7.5°. The average torque is −1.5, which is the same magnitude as the positive torque. However, this characteristic has a large torque pulsation, which is not preferable from the viewpoint of noise and vibration. As one of the countermeasures, there is a method in which the current energization method is a trapezoidal current waveform shown by a broken line in 1*a*3R of FIG. 11. By making the current waveform of each phase into this trapezoidal waveform, the negative torque of the reluctance motor of FIG. 10 has a torque characteristic of a constant value of magnitude −1.0. As a result, the torque pulsation becomes zero. Further, in terms of current control, it is possible to create an increase time and a decrease time of the current, so that the difficulty in current control can be solved. Note that Vt3 in FIG. 11 corresponds to the sum of the torques of each phase, and is a virtual voltage obtained by adding the operating voltages of the respective phases. Further, although the algorithm for generating the torque in the CW direction can be basically generated regardless of the rotation speed, the CW torque at the time of CCW rotation was described for the convenience of explaining in comparison with the CCW torque using FIG. 11.

The reluctance motor of the present invention shown in FIGS. 8(*a*), 10 and 11 has unique characteristics as described above. To solve the problem of noise, for example, a method of increasing each phase current such as the A3 phase current Ia3F in FIG. 11 in the first half of each cycle and decreasing the current value in the latter half can be considered. Since the torque of each phase overlaps with the torque of the other phase, the two phases complement each other in the first half and the second half. Specifically, for example, the A3 phase current Ia3 is made large from 0° to 15° of the rotor rotation angle θr in FIG. 11, and is made small from 15° to 30°. Similarly, at this time, the D3 phase current Id3 is increased from 15° to 30° and decreased from 30° to 45°. Similarly, the C3 phase current Ic3 is increased from 30° to 45° and decreased from 45° to 60°. Similarly, the B3 phase current Ib3 is increased from 45° to 60° and decreased from 60° to 75°. In this way, by modifying the current energization method of each phase, that is, the magnitude of the current, and reducing the current change rate when the current of each phase decreases from a large current value to 0 [A], it is possible to reduce the rate of change of the radial suction force, reduce the vibration of the back yoke, case, etc. of the motor, and reduce the noise.

Further, since the current waveforms Ia3F and Ia3R in FIG. 11 can be trapezoidal current waveforms, noise can be reduced by suppressing the current change rate such as a rapid increase or decrease of each phase current. Further, as shown in FIG. 11, the torque of each phase generates torque in a section of 50%. As for the torque of each phase, two phases always generate torque. In this way, by generating torque in a section where the stator magnetic poles of each phase are wide and by overlapping the torque generating sections with each other in the three phases, smoother rotation can be realized and noise can be reduced.

Further, when focusing only on the positive torque portion of Ta3 in FIG. 11 and smoothing the stepped torque waveform to estimate the fundamental wave component, the shape is close to a sine wave squared formula $(1-\cos(2\theta))/2$. Therefore, since the positive torque of each phase in FIG. 11 is close to the torque of a synchronous motor driven by a 4-phase sine wave, even though it is a reluctance motor driven by a current having a substantially square wave shape, it can be expected to reduce noise and vibration. Further, as described above, the total positive torque of the reluctance motor of FIG. 10 is also a constant value shown in 111 of Tt3 of FIG. 11.

The copper loss in the driving method of FIG. 11 will be described. When rotating to CCW, the current of each phase energizes the current at 50% of the pre-energized section, and the copper loss increases as compared with the case of 33% of the energized section of the conventional method of FIG. 47. Priority is given to the quietness of the motor. The method for reducing the copper loss of the motor of the present invention will be described with reference to FIGS. 8 (b) and 42. The drive circuit becomes a little complicated.

Figure 26:
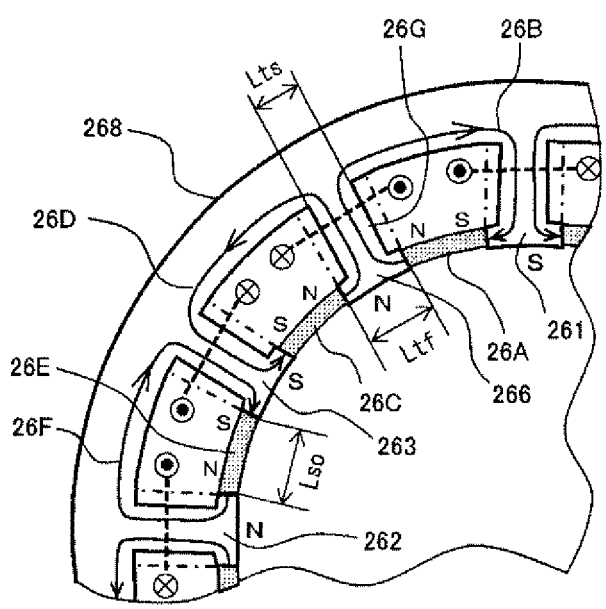
FIG. 26 is a partial lateral sectional view exemplifying a motor in which permanent magnets are arranged between tooth of stator magnetic poles.

In addition, some inconveniences occur in the method of utilizing the permanent magnet shown in FIG. 26. The order in which the N and S polarities of the stator magnetic poles shown in FIG. 8(a) are arranged in the circumferential direction can be changed, although there are various advantages and disadvantages.

Further, the shape of each rotor magnetic pole shown in FIG. 10 can be deformed into various shapes. For example, the staircase shape can be made smoother. Further, since each torque characteristic can be created by the relative magnetic characteristics of the stator magnetic pole and the rotor magnetic pole, not only the rotor magnetic pole shape but also the stator magnetic pole shape can be deformed. It is also possible to skew the rotor or stator.

Fourth Embodiment

Next, FIG. 9(a) shows an example of a cross-sectional view of another reluctance motor of the present invention. It is a reluctance motor with 10 stator magnetic poles and 6 rotor magnetic poles. The expression method of FIG. 9(a) is the same as that of FIG. 1 and other figures. Since the number of stator magnetic poles is 10, it is possible to alternately arrange the north pole and the south pole of the stator magnetic poles in the circumferential direction, and an example thereof is shown. The north and south magnetic poles are arranged symmetrically with respect to the center point of the rotor. The generated magnetic flux is configured to pass from the stator pole of the N pole through the rotor magnetic pole, to the stator pole of the S pole opposite by 180° in electrical angle, and to make a round through the back yoke.

A Reference sign 121 denotes an A4 phase stator magnetic pole, which winds a concentrated winding 91 indicated by a broken line, indicates the winding with a current symbol, and energizes a one-way A4 phase current Ia4 in the direction of the current symbol. A reference sign 122 denotes an A3/ phase stator magnetic pole, which winds the concentrated winding 91 shown by the broken line and energizes the unidirectional A3 phase current Ia3 in the direction of the current symbol. Normally, the winding 91 and the winding 92 are connected in series, and the same A4 phase current Ia4 is applied to both windings. At that time, a reference sign 122 becomes the north pole and the A3/ phase stator magnetic pole 121 becomes the south pole. In the case of the state shown in a part (a) of FIG. 9, the magnetic fluxes to be excited passes through the rotor magnetic poles 12M and 12J from the stator magnetic pole 122, passes through the stator magnetic pole 121, and makes a round through the back yoke. In that case, the CCW torque is generated in the rotor.

Similarly, a reference sign 123 shows a B4 phase stator magnetic pole and winds the concentrated winding 93 shown by the broken line. A reference sign 124 denotes a B4/ phase stator magnetic pole, which winds the concentrated winding 94 shown by the broken line. Windings 93 and 94 are connected in series, and the same B4 phase current Ib4 is applied to both windings. At that time, the magnetic pole 124 becomes the north pole and the magnetic pole 123 becomes the south pole.

Similarly, a reference sign 125 denotes a C4 phase stator magnetic pole, which winds the concentrated winding 95 shown by the broken line. A reference sign 126 denotes a C4/ phase stator magnetic pole, which winds the concentrated winding 96 shown by the broken line. The windings 95 and 96 are connected in series, and the same C4 phase current Ic4 is applied to both windings. At that time, the magnetic pole 126 becomes the north pole and the magnetic 125 becomes the south pole.

Similarly, a reference sign 127 is a D4 phase stator magnetic pole, and winds the concentrated winding 97 shown by the broken line. A reference sign 128 denotes a D4/ phase stator magnetic pole, which winds the concentrated winding 98 shown by the broken line. The windings 97 and 98 are connected in series, and the same D4 phase current Id4 is applied to both windings. At that time, the magnetic pole 128 becomes the north pole and the magnetic pole 127 becomes the south pole.

Similarly, a reference sign 129 shows an E4 phase stator magnetic pole, and winds the concentrated winding 99 shown by the broken line. A reference sign 12A is an E4/ phase stator magnetic pole, which winds the concentrated winding 9A indicated by the broken line. The windings 99 and 9A are connected in series, and the same E4 phase current Ie4 is applied to both windings. At that time, the magnetic pole 12A becomes the north pole and the magnetic pole 129 becomes the south pole.

Figure 12:
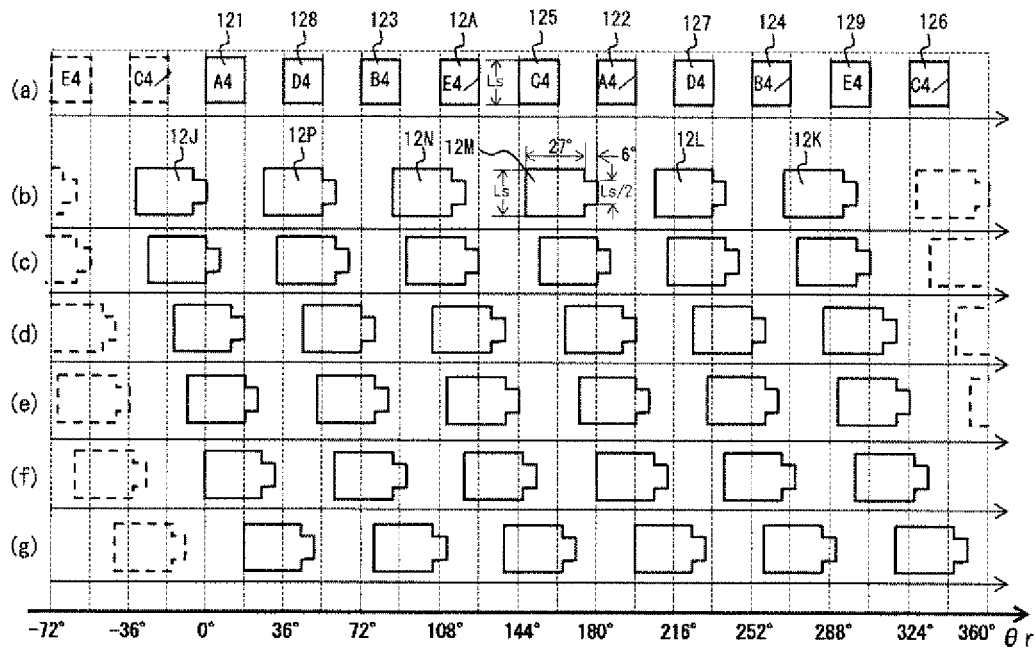
FIG. 12 is a horizontally developed view of both stator magnetic poles and rotor magnetic poles of a motor according to the present invention.
Figure 13:
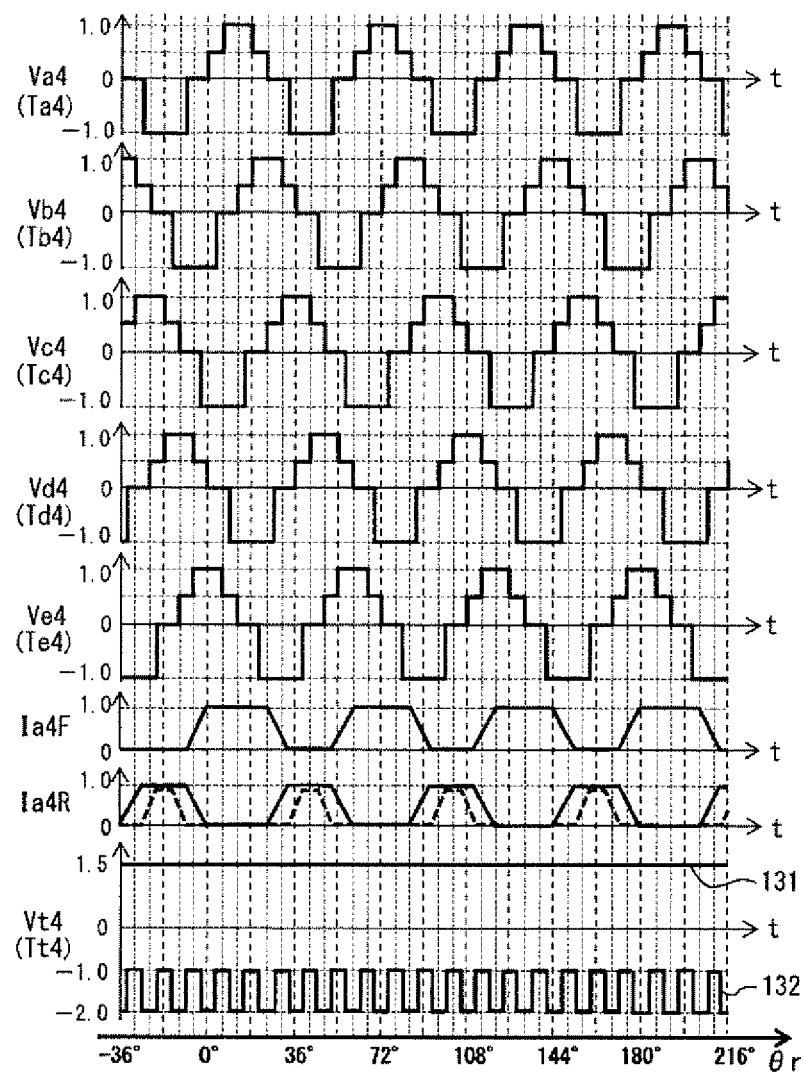
FIG. 13 is a graph exemplifying voltages, currents and torque values of the motor according to the present invention.

Next, the voltage, current, and torque of the reluctance motor of FIG. 9(a) will be shown and described in FIGS. 12 and 13. This shows that the rotation in the CCW direction generates CCW torque or CW torque. FIG. 9A shows a linear development of the shape of the inner peripheral surface of the stator magnetic pole SP seen from the air gap surface between the stator and the rotor so that the circumferential direction of the CCW is the horizontal axis direction of FIG. 12. The vertical axis direction in FIG. 12 is the rotor axis direction. In FIG. 12, a reference sign 121 shows an A4 phase stator pole, a reference sign 122 shows an A4/ phase stator pole, a reference sign 123 shows a B4 phase stator pole, a reference sign 124 shows a B4/ phase stator pole, a reference sign 125 shows a C4 phase stator pole, a reference sign 126 shows a C4/ phase stator pole, a reference sign 127 shows a D4 phase stator pole, a reference sign 128 shows a D4/ phase stator pole, a reference sign 129 shows an E4 phase stator pole, and a reference sign 12A shows an E4/ phase stator pole. The shape of the air gap surface of the stator magnetic poles of each phase has a circumferential angular width θBs of 18° and a rotor axial length of Ls.

Those having the same reference signs in FIG. 9(a) and FIG. 12 have the same reference signs.

FIG. 12(b) is a linear development of the outer peripheral surface shape of the rotor magnetic pole RP seen from the air gap surface so that the circumferential direction of the CCW of FIG. 9(a) is the horizontal axis direction of FIG. 12. That is, it is a figure developed linearly so as to be in the right direction of the paper surface of FIG. 12. In FIG. 9(a), the start point of the rotor is the rotation angle position of the clockwise end of the A4 phase stator magnetic pole 121, and the rotor rotation angle position θr is from the start point to the CCW direction end of the rotor magnetic pole 12J. The starting point of the rotor in FIG. 12 is the left end of the stator magnetic pole 121 on the paper. The value of the rotor rotation angle position θr at the bottom of that point is set to 0°. The rotor rotation angle position θr in FIG. 12 is from the start point to the right end of the rotor magnetic pole 12J. In FIG. 12, the right end of the rotor magnetic pole 12J is also the tip of the CCW of 12J in FIG. 9(a). The rotation angle position θr of the rotor of FIG. 12 (b) is 0°, and this θr indicates from −72° to 360°.

Next, the shape of the rotor magnetic pole will be described. The circumferential angular width Br of each rotor magnetic pole in FIG. 12 is 33°. The rotor axial width of each rotor magnetic pole has a different shape between a 6° width portion in the front portion and a 27° width portion in the rear portion in the CCW direction. The 6° width portion of the front portion has a rotor axial length of Ls/2. The 27° portion of the rear portion has a rotor axial length of Ls, which is the same length as the rotor axial length of each stator magnetic pole SP. The axial length of the front portion Is halved of that of the rear portion.

In FIG. 12(c), the rotor position θr in FIG. 12(b) is rotated by 6° from the rotor position θr=0° to CCW, and θr is 6°. FIG. 12(d) is further rotated by 12° to CCW, and θr is 18°. In FIG. 12, θr in (e) is 24°, θr in (f) is 33°, θr in (g) is 51°, and θr in (h) is 60°. By rotating the rotor in this way and changing the rotor rotation angle position θr, the magnetic relative relationship between each stator pole SP and each rotor pole RP changes, and rotational torque of the rotor can be obtained by exciting each stator magnetic pole SP at an appropriate timing.

Next, the relationship between the voltage acting when a current is applied to each winding of the stator magnetic pole, the motor output power, and the torque will be described. However, it is a characteristic when the electromagnetic relationship is simply modeled. Now, consider the A4 phase winding 91 and the A3/ phase winding 92 of FIG. 9A are connected in series, and a constant current Io [A] having a value close to the continuous rating as the A4 phase current Ia4 is energized, and the rotor is rotated to CCW at a constant speed Vso [radian/sec]. The CCW direction of FIG. 9A is the right direction of the paper surface of FIG. 12. The winding voltage of the A4 phase at this time is the voltage Va4 in FIG. 13. The horizontal axis of Va4 in FIG. 13 is the time t, and the value of the rotor rotation angle position θr at that time is shown in the lowermost stage of FIG. 13.

First, the magnetic flux interlinking with the A4 phase winding when the rotor rotation angle position θr approaches from 0° to 6° and the A4 phase winding voltage Va4 will be described. The rotor magnetic pole 123 starts to face the A4 phase stator magnetic pole 121 from 0° of θr via an air gap. It is the state from the part (b) to the part (c) of FIG. 12. The rotor axial length of the front portion of the rotor magnetic pole 12J is ½ of the axial length Ls of the stator magnetic pole, and the rotational change rate of the magnetic flux passing through the rotor magnetic pole and the stator magnetic pole is ½ of the maximum value. Here, the voltage in FIG. 13 is normalized, and the A4 phase winding voltage Va4 between 0° and 6° of Va4 is shown as 0.5.

Next, when θr is between 6° and 18°, it is the state from the part (c) to the part (d) in FIG. 12. The rear portion of the rotor magnetic pole 12J faces the A4 phase stator magnetic pole 121, and the magnetic flux passing through the rotor magnetic pole 12J has a maximum axial length Ls and increases with the rotation. And the rotational change rate of the magnetic flux passing through the rotor magnetic pole and the stator magnetic pole becomes the maximum value. As a result, the A4 phase winding voltage Va4 in which θr in FIG. 13 is between 6° and 18° is 1.0.

Next, when θr is between 18° and 24°, it is the state from the part (d) to the part (e) in FIG. 12. The rear portion of the rotor magnetic pole 12J faces the A4 phase stator magnetic pole 121, and the passing magnetic flux increases with rotation, while the front portion of the rotor magnetic pole 12J deviates from the A4 phase stator magnetic pole 121. The Increase in the subtraction of the magnetic flux is ½, and the rotational change rate of the magnetic flux passing through the rotor magnetic pole and the stator magnetic pole is ½ of the maximum value. As a result, the A4 phase winding voltage Va4 in which θr in FIG. 13 is between 18° and 24° is 0.5.

Next, when θr is between 24° and 33°, it is the state from the part (e) to the part (f) in FIG. 12. During this period, since the rotor magnetic pole 12J faces the entire surface of the stator magnetic pole 121, the magnetic flux passing through is constant. Therefore, the rotational change rate of the magnetic flux passing from the rotor magnetic pole to the stator magnetic pole is 0. The winding voltage Va4 of the A4 phase in which θr in FIG. 13 is between 24° and 33° is 0.

Next, when θr is between 33° and 51°, it is the state from the part (f) to the part (g) in FIG. 12. The rear portion of the rotor magnetic pole 12J deviates from the state of facing the A4 phase stator magnetic pole 121, and completely deviates when θr is 51°. During this time, the magnetic flux passing through decreases with rotation. The rotational change rate of the magnetic flux passing through the rotor magnetic pole and the stator magnetic pole has a negative maximum value. As a result, the winding voltage Va4 of the A4 phase in which θr in FIG. 13 is between 33° and 51° becomes −1.0.

Next, when θr is between 51° and 60°, it is the state from the part (g) in FIG. 12 to the part (b) in FIG. 12 in the original state. Since the distance between the rotor magnetic poles is 60°, the process returns to the original state (b) where the explanation was first started. During this period, the stator magnetic pole 121 does not face the rotor magnetic pole 12J, so the magnetic flux passing through is 0 and constant. The winding voltage Va4 of the A4 phase in which θr in FIG. 13 is between 51° and 60° is 0. As described above, θr rotates by repeating the operation of 0° to 60°.

As for the B4 phase, the winding 93 wound around the B4 phase stator magnetic pole 123 in FIG. 9(a) and the winding 94 wound around the B4/ phase stator magnetic pole are wound in series with the same polarity. Then, the rotor is rotated in the CCW direction at a constant speed Vso [radian/sec] while a constant current Io [A] having a value close to the continuous rating is applied to this winding. The winding voltage of the B4 phase at this time is the voltage Vb4 shown in FIG. 13, which is a voltage whose phase is delayed by 12° with respect to the A4 phase voltage Va4. Similarly, the C4 phase voltage Vc4 is the voltage of the winding in which the windings 95 and 96 are wound in series, which is the voltage Vc4 in FIG. 13, which is a voltage whose phase is delayed by 24° with respect to the A4 phase voltage Va4. Similarly, the D4 phase voltage Vd4 is the voltage of the winding in which the windings 97 and 98 are wound in series, which is the voltage Vd4 in FIG. 13, which is a voltage whose phase is delayed by 36° with respect to the A4 phase voltage Va4. Similarly, the E4 phase voltage Ve4 is the voltage of the winding in which the windings 99 and 9A are wound in series, and is the voltage Ve4 in FIG. 13, which is a voltage whose phase is 48° behind the A4 phase voltage Va4.

The respective voltages of these phases satisfy a relationship of formulas (1) to (12). The same formula applies to the D phase and the E phase. However, it is a mathematical formula that holds under the above-mentioned various simplified conditions. Further, the values of each voltage, each current, and each torque are normalized by the formulas (5), (9), (10) and the like.

The A4 phase voltage Va4, the B4 phase voltage Vb4, the C4 phase voltage Vc4, the D4 phase voltage Vd4, and the E4 phase voltage Ve4 described with reference to FIG. 13 have the relationship of the formula (5). Then, as the A phase torque is proportional to the A phase voltage in the formula (8), the A4 phase torque Ta4, B4 phase torque Tb4, C4 phase torque Tc4, D4 phase torque Td4, and E4 phase torque Te4 related to the reluctance motor of FIG. 9(a) has a constant value of (Io/Vso), and it is proportional to each phase voltage Va4, Vb4, Vc4, Vd4, and Ve4, respectively. In that sense, the phase torques Ta4, Tb4, Tc4, Td4, and Te4 are added below the phase voltages Va4, Vb4, Vc4, Vd4, and Ve4 in FIG. 13.

Next, a method of generating continuous torque in the positive direction in the CCW direction by the reluctance motor shown in FIG. 9(a), FIG. 12 and FIG. 13 will be described. In the section where Ta4, which is the A4 phase torque of FIG. 13, generates a positive torque, θr is 0° to 24°, 60° to 84°, and the like, and the current shown in Ia4F of FIG. 13 is energized. Here, for example, when θr is −9° to 0° and between 24° and 33°, the winding voltage Va4 is 0, so that there is no influence on the torque, and the current is used as an increase time and a decrease time. The same applies to other current cycles of Ia4F. In the section where Tb4, which is the B4 phase torque in FIG. 13, generates a positive torque, θr is 12° to 36°, 72° to 96°, and the like, the current Ib4F whose phase is delayed by 12° with respect to Ia4F in FIG. 13 is energized. In the section where Tc4, which is the C4 phase torque in FIG. 13, generates a positive torque, θr is 24° to 48°, 84° to 108°, and the like, the current Ic4F whose phase is delayed by 24° with respect to Ia4F in FIG. 13 is energized. In the section where Td4, which is the D4 phase torque in FIG. 13, generates a positive torque, θr is 36° to 60° and 96° to 120°, and the current Id4F whose phase is 36° behind Ia4F in FIG. 13 is energized. In the section where Te4, which is the E4 phase torque in FIG. 13, generates a positive torque, θr is 48° to 72° and 108° to 132°, and the current Ie4F whose phase is 48° behind Ia4F in FIG. 13 is energized. The sum of the positive torques of each phase at this time is the torque shown in 131 so of Vt4 in FIG. 13, which is a constant value of a magnitude of 1.5. At all times, two of the five phases are generating torque, and the sum is 1.5.

Figure 9:
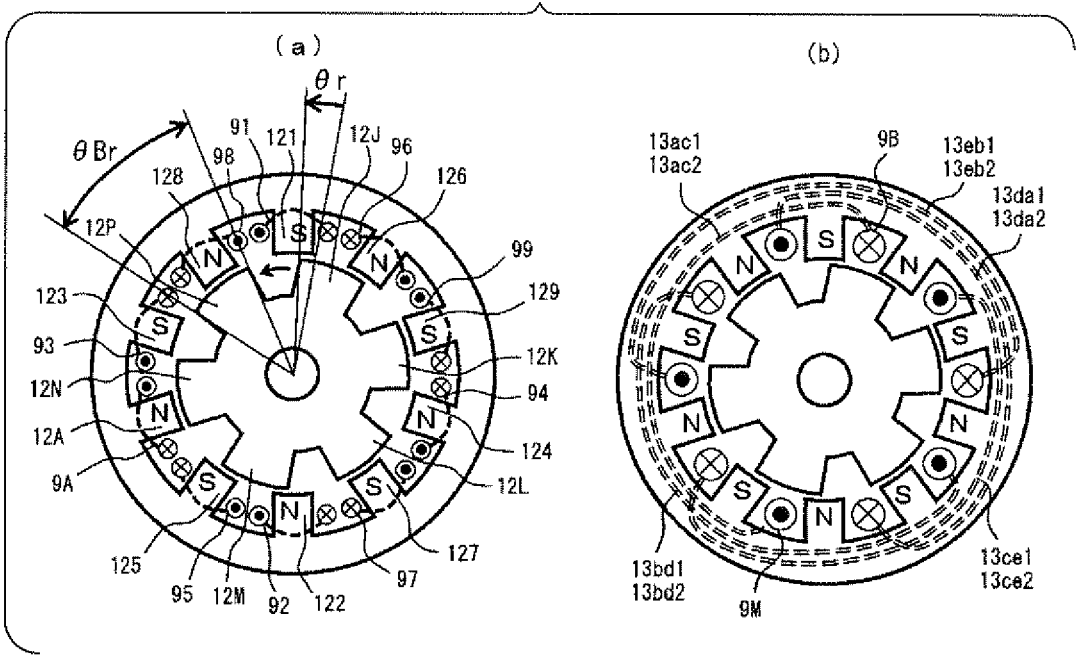
FIG. 9 is a lateral sectional view exemplifying a motor according to the present invention.

Next, a method of generating torque in the CW direction while rotating at a speed Vso in the CCW direction with the reluctance motors of FIGS. 9A, 12 and 13 will be described with reference to FIG. 13. It is also an operation that brakes the motor and regenerates it. In the section where Ta4, which is the A4 phase torque in FIG. 13, generates a negative torque, θr is 33° to 51° and 93° to 111°, and the like, and the trapezoidal current shown by the solid line of Ia4R in FIG. 13 is energized. Here, for example, when θr is −9° to 0° and between 24° and 33°, the winding voltage Va4 is 0, so that there is no influence on the torque, and the current is used as an increase time and a decrease time. The same applies to other current cycles of Ia4R. In the section where Tb4, which is the B4 phase torque in FIG. 13, generates a negative torque, θr is 45° to 63° and 105° to 123°, and the like, and the current Ib4R whose phase is delayed by 12° with respect to Ia4R in FIG. 13 is energized. In the section where Tc4, which is the C4 phase torque in FIG. 13, generates a negative torque, θr is 57° to 75° and 117° to 135°, and the like, and the current Ic4R whose phase is delayed by 24° with respect to Ia4R in FIG. 13 is energized. In the section where Td4, which is the D4 phase torque in FIG. 9, generates a negative torque, θr is 69° to 87°, 129° to 147°, and the like, and the current Id4R whose phase is 36° out of phase with that of Ia4R in FIG. 9 is energized. In the section where Te4, which is the E4 phase torque in FIG. 9, generates a negative torque, θr is 21° to 39° and 81° to 99°, and the like, and the current Ie4R whose phase is 48° behind Ia4R in FIG. 9 is energized.

The sum of the torque values of the respective phases is the value shown in 132 of Tt4 in FIG. 13, and has a torque characteristic in which the values of −1.0 and −2.0 are repeated every 9°. The average torque is −1.5, which is the same magnitude as the positive torque. However, this characteristic has a large torque pulsation, which Is not preferable from the viewpoint of noise and vibration. As one of the countermeasures, there is a method in which the current energization method is a trapezoidal current waveform shown by a broken line in 1a4R of FIG. 13. By making the current waveform of each phase into this trapezoidal waveform, the negative torque of the reluctance motor in FIG. 13 has a torque characteristic of a constant value of magnitude −1.0. As a result, the torque pulsation becomes zero. Further, in terms of current control, it is possible to create an increase time and a decrease time of the current, so that the difficulty in current control can be solved. Note that Vt4 in FIG. 13 corresponds to the sum of the torques of each phase, and is a virtual voltage obtained by adding the operating voltages of the respective phases. Further, in principle, although the algorithm for generating the torque in the CW direction can be generated regardless of the rotation direction and the rotation speed, the CW torque at the time of CCW rotation has been described, for the convenience of explaining the CCW torque in comparison with FIG. 13.

The reluctance motor of the present invention shown in FIGS. 9(a), 12 and 13 has unique characteristics as described above. To solve the problem of noise, for example, a method of Increasing each phase current such as the A4 phase current Ia4F in FIG. 13 in the first half of each cycle and decreasing the current value in the latter half can be considered. Since the torque of each phase overlaps with the torque of the other phase, the two phases complement each other in the first half and the second half. Specifically, for example, the A4 phase current Ia4 Is made large from 0° to 12° of the rotor rotation angle θr in FIG. 13, and is made small from 12° to 24°. Similarly, at this time, the B4 phase current Ib4 is increased from 12° to 24° and decreased from 24° to 36°. Similarly, the C4 phase current Ic4 is increased from 24° to 36° and decreased from 36° to 48°. Similarly, the D4 phase current Id4 should be large from 36° to 48° and small from 48° to 60°. Then, the E4 phase current Ie4 is made large from 48° to 60° and small from 60° to 72°.

In this way, the current energization method of each phase, that is, by modifying the magnitude of the current and reducing the current change rate when the current of each phase decreases from a large current value to 0 [A], it is possible to reduce the rate of change of the radial suction force, reduce the vibration of the back yoke, case, etc. of the motor, and reduce the noise.

Further, since the current waveforms Ia4F and Ia4R in FIG. 13 can be trapezoidal current waveforms, noise can be reduced by suppressing the current change rate such as a rapid increase or decrease of each phase current. Further, as for the torque of each phase, the torque is always generated by two phases. In this way, by generating torque in a section where the stator magnetic poles of each phase are wide and by overlapping the torque generating sections with each other in the three phases, smoother rotation can be realized and noise can be reduced.

Further, focusing only on the positive torque portion of Ta4 in FIG. 13, smoothing the stepped torque waveform and estimating the fundamental wave component, the shape is close to a sine wave squared formula $(1-COS(2\theta))/2$. Therefore, the positive torque of each phase in FIG. 13 is close to the torque of a synchronous motor driven by a 5-phase sine wave, even though it is a reluctance motor driven by a current having a substantially square wave shape, and It can be expected to reduce noise and vibration. Further, as described above, the total positive torque of the reluctance motor of FIG. 10 is also a constant value shown in 131 of Tt4 of FIG. 13.

The copper loss in the driving method of FIG. 13 will be described. When rotating to CCW, the current of each phase energizes the current at 40% of the pre-energized section, and the copper loss increases as compared with the case of 33% of the energized section of the conventional method of FIG. 47. Priority is given to the quietness of the motor. A method for significantly reducing copper loss and a method for increasing torque of the motor of the present invention will be described later.

Further, the shape of each rotor magnetic pole shown in FIG. 12 can be deformed into various shapes. For example, the staircase shape can be made smoother. Further, since each torque characteristic can be created by the relative magnetic characteristics of the stator magnetic pole and the rotor magnetic pole, not only the rotor magnetic pole shape but also the stator magnetic pole shape can be deformed. It is also possible to skew the rotor or stator.

Fifth Embodiment

Figure 14:
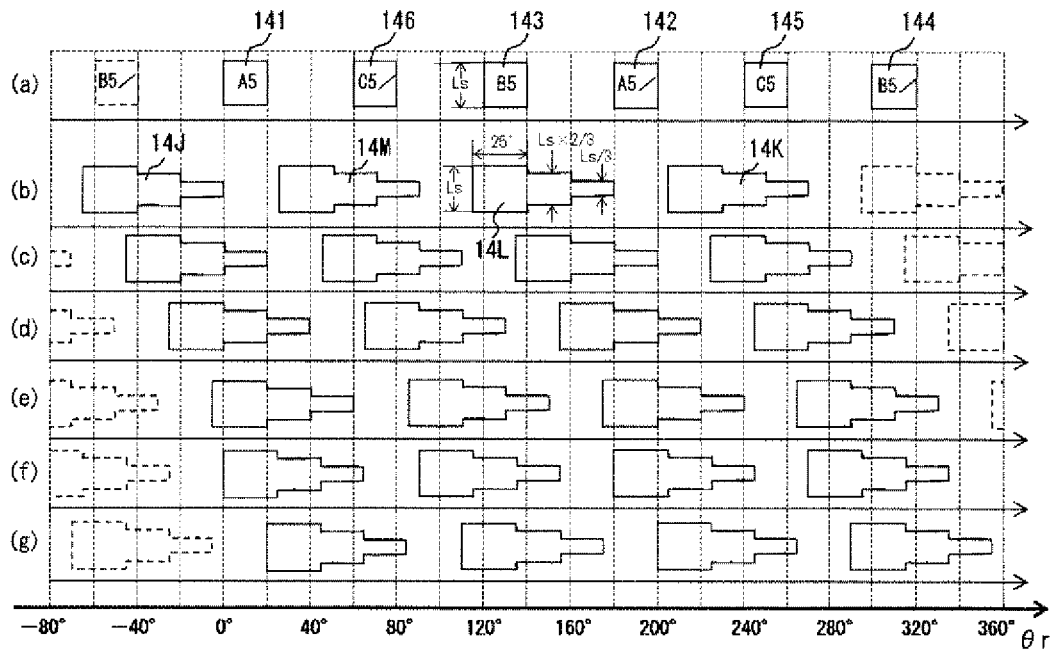
FIG. 14 is a horizontally developed view of both stator magnetic poles and rotor magnetic poles of a motor according to the present invention.
Figure 15:
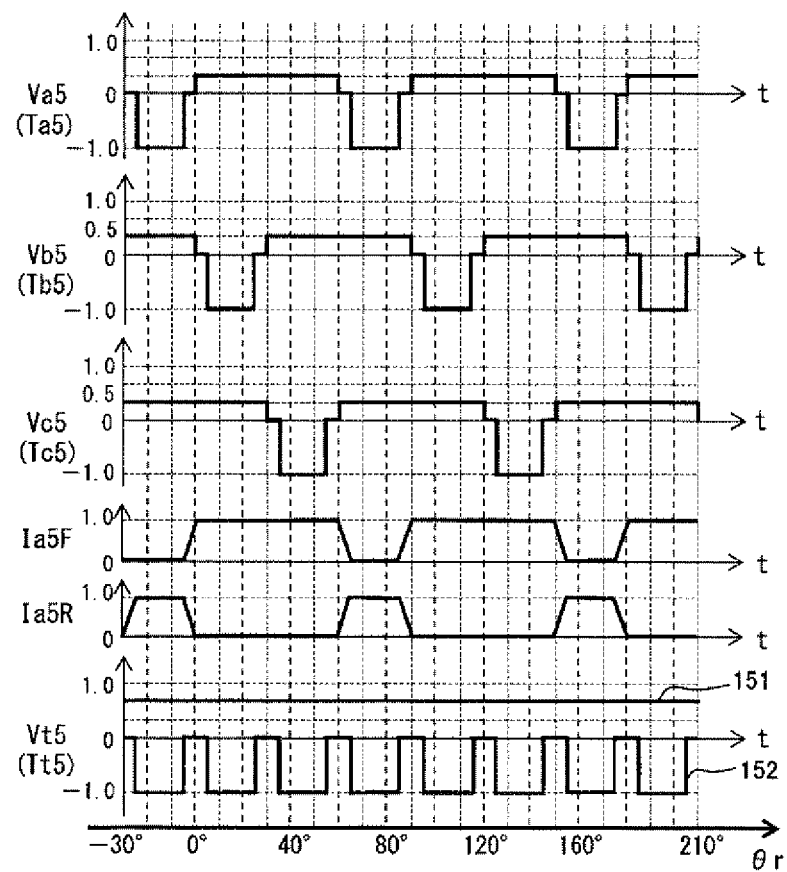
FIG. 15 is a graph exemplifying voltages, currents and torque values of the motor according to the present invention.

Next, an embodiment of claim 2 will be shown and described with reference to FIGS. 1, 14, and 15. The cross-sectional view 1 of the reluctance motor will be described in common with FIGS. 4, 6 and 14. The expression methods of FIGS. 14 and 15 are the same as those of FIGS. 4, 5, 6, and 7. Here, the description of the expression method and the like will be omitted. The shape of the rotor magnetic pole of the reluctance motor shown in FIG. 14 has a portion having an axial length of Ls/3, a portion having an Ls×⅔ portion, and a portion having an Ls portion, and has a shape having three stages of axial length. The characteristic of this rotor magnetic pole is that the circumferential range of the torque generated by one rotor magnetic pole can be three times wider than the circumferential width of the stator magnetic pole, and the torque generation ratio of each phase is high and the torque can be generated in the rotation range of ⅔.

FIG. 14(a) shows the shape of the inner peripheral surface of the stator magnetic pole SP as seen from the air gap surface between the stator and the rotor, and the circumferential direction of the CCW is the horizontal axis direction of FIG. 14, that is, it is a figure developed linearly so as to be in the right direction of the paper surface of FIG. 14. The vertical axis direction of the paper surface of FIG. 14 is the direction of the rotor axis. In FIG. 14, 141 is an A5 phase stator magnetic pole, 142 is an A5/ phase stator magnetic pole, 143 is a B5 phase stator magnetic pole, 144 is a B5/ phase stator magnetic pole, 145 is a C5 phase stator magnetic pole, and 146 is a C5/ phase stator magnetic pole. The shape of the air gap surface of the stator magnetic poles of each phase has a circumferential angular width θBs of 20° and a rotor axial length of Ls.

In FIG. 14B, the shape of the outer peripheral surface of the rotor magnetic pole RP as seen from the air gap surface is such that the circumferential direction of the CCW in FIG. 1 is the horizontal axis direction in FIG. 14, that is, it is a figure developed linearly so as to be in the right direction of the paper surface of FIG. 14. The value of the rotor rotation angle position θr is shown at the bottom of FIG. 14. Θr in FIG. 14(b) is 0°. It should be noted that this θr indicates from −80° to 360°.

The rotor magnetic pole 14J of FIG. 14B is the same as the rotor magnetic pole 1J of FIG. 1, and the rotor rotation angle position θr is 0°. The circumferential angular width θBr of each rotor magnetic pole in FIG. 14 is 65°. Four rotor magnetic poles of 14J, 14K, 14L, and 14M are arranged in a range of 360 degrees. The shape of each rotor magnetic pole is in the CCW direction, and the front portion in the right direction on the paper of FIG. 14 has a circumferential angular width of 20° and a rotor axial length of Ls/3, as shown in the figure. The middle portion of the rotor magnetic pole has a circumferential angular width of 20° and a rotor axial length of Ls×⅔. The rear portion of the rotor magnetic pole has a circumferential angular width of 25° and a rotor axial length of Ls.

FIG. 14 (c) shows a rotor shape rotated by 20° from the rotor position of FIG. 14 (b) to CCW. At this time, θr is 20°. FIG. 14(d) is further rotated by 20° to CCW, and θr is 40°. FIG. 14(e) is further rotated by 20° to CCW, and θr is 60°. FIG. 14(f) is further rotated by 5° to CCW, and θr is 65°. FIG. 14(g) is further rotated by 20° to CCW, and θr is 85°. By rotating the rotor in this way and changing the rotor rotation angle position θr, the magnetic relative relationship between each rotor magnetic pole RP and each stator magnetic pole SP changes. Therefore, the current can be applied to each phase winding of each stator magnetic pole SP at an appropriate timing to excite it, and a rotor rotation torque can be obtained.

Now, the A5 phase concentrated winding winding 147 and the A5/ phase concentrated winding winding 148 are connected in series with the same polarity, and consider a state in which the rotor is rotated to CCW at a constant speed Vso while a constant current Io having a value dose to the continuous rating is energized as the A5 phase current Ia5. The CCW direction of FIG. 1 is the right direction of the paper surface of FIG. 14. The winding voltage at this time is the voltage Va5 in FIG. 15. The horizontal axis of Va5 is time t, and the value of the rotor rotation angle position θr at that time is shown at the bottom of FIG. 15.

First, when the rotor magnetic pole 14J approaches from 0° to 20° of θr, the front portion of the rotor magnetic pole 14J faces the A5 phase stator magnetic pole 141 via an air gap. This show the state Initiated in a part (b) to a part (c) of FIG. 14. The rotor axial length of the front portion of the rotor magnetic pole 14J is ⅓ of the axial length Ls of the stator magnetic pole, and the rotational change rate of the magnetic flux passing through the rotor magnetic pole and the stator magnetic pole is ⅓ of the maximum value. The value between 0° and 20° of Va5 in FIG. 15 is shown as 0.333.

Next, when the rotor magnetic pole 14J approaches 20° to 40° of θr as shown in FIGS. 14(*c*) to 14(*d*), the Intermediate portion of the rotor magnetic pole 14J faces the A5 phase stator magnetic pole 141. The axial length of the intermediate portion of the rotor magnetic pole 14J is Ls×⅔, and the rotational change rate of the magnetic flux passing through the intermediate portion of the rotor magnetic pole and the stator magnetic pole is ⅔ of the maximum value. However, at the same time, the front portion of the rotor magnetic pole 14J deviates from the stator magnetic pole 141. The value between 20° and 40° of Va5 in FIG. 15 is shown as subtraction (⅔−0.333)=0.333.

When the rotor magnetic pole 14J approaches from 40° to 60° of θr as shown in FIGS. 14D to 14E, the rear portion of the rotor magnetic pole 14J faces the stator magnetic pole 141. On the other hand, the intermediate portion of the rotor magnetic pole 14 deviates from the stator magnetic pole 141. The value between 40° and 60° of Va5 in FIG. 15 is shown as subtraction (1−⅔)=0.333.

As shown in FIGS. 14 (*e*) to 14 (*f*), the entire surface of the stator magnetic pole 141 faces the rotor magnetic pole 14J while the rotor magnetic pole 14J is between 60° and 65° of θr. The rotational change rate of the magnetic flux passing through the stator magnetic pole 141 is 0, and the value of Va5 in FIG. 15 during this period is 0.

As shown in FIGS. 6(*f*) to 16(*g*), the rear portion of the rotor magnetic pole 14J deviates from the stator magnetic pole 141 while the rotor magnetic pole 14J is between 65° and 85° of θr, so the rotational change rate of the magnetic flux passing through the stator magnetic pole 141 is −1, and the value of Va5 in FIG. 15 during this period is −1.

When the rotor rotation angle position θr is from 85° to 90°, there is no rotor magnetic pole facing the stator magnetic pole 141, and the value of Va5 in FIG. 15 is 0. When θr becomes 90°, the rotor magnetic pole 14K approaches the stator magnetic pole 141, the state returns to the initial state of the operation described in the state of (b) of FIG. 14, the operation is repeated, thereby continuously rotating in the CCW direction.

Similarly, the B5 phase windings 143 and 144 of FIG. 14 and the B5/ phase windings are connected in series, and the rotor is rotated to the CCW at a constant speed Vso with a constant current Io as the B5 phase current Ib5. The winding voltage at this time is the voltage Vb5 shown in FIG. 14. Similarly, the C5 phase windings 145 and 146 and the C5/ phase windings are connected in series, and the rotor is rotated to the CCW at a constant speed Vso in a state where a constant current Io is applied as a C5 phase current Ic5. The winding voltage at this time is the voltage Vc5 shown in FIG. 14. The voltages Va5, Vb5, and Vc5 have a phase difference of 30° from each other.

The A5 phase voltage Va5, the B5 phase voltage Vb5, and the C5 phase voltage Vc5 described with reference to FIG. 15 correspond to the formulas (5), (9), and (10). Then, from the formulas (8), (11), and (12), (Io/Vso) is a constant value for each phase torque Ta5, Tb5, and Tc5 related to the reluctance motor of FIG. 14, so it is proportional to each phase voltage Va5, Vb5, Vc5, respectively. In that sense, the phase torques Ta5, Tb5, and Tc5 are added in parentheses below the phase voltages Va5, Vb5, and Vc5 in FIG. 15. However, it is a mathematical formula that holds under the above-mentioned various simplified conditions. Further, the values of each voltage, each current, and each torque are normalized by the formulas (5), (9), (10) and the like.

Next, a method of generating continuous torque in the positive direction in the CCW directions with the reluctance motor of FIG. 14 will be described. In the section where Ta5, which is the A5 phase torque of FIG. 15, generates a positive torque, θr is 0° to 60° and 90° to 150°, and the current shown in Ia5F of FIG. 15 is energized. As described above, the section where the A5 phase Va5 is 0 [V] is between 60° and 65° of the rotor rotation angle position θr and between 85° and 90°, so it can be used as the increase time and decrease time of the A5 phase current Ia5F. Therefore, the current can be trapezoidal as shown in Ia5F of FIG. 15.

In the section where Tb5, which is the B5 phase torque in FIG. 15, generates a positive torque, θr is 30° to 90° and 120° to 180°, and the current Ib5F whose phase is delayed by 30° with respect to Ia5F in FIG. 15 is energized. In the section where Tc5, which is the C5 phase torque in FIG. 15, generates a positive torque, θr is 60° to 120° and 150° to 210°, and the current Ic5F whose phase is delayed by 60° with respect to Ia5F in FIG. 15 is energized. When the positive part of the torque Ta5 of the A5 phase, the positive part of the torque Tb5 of the B5 phase, and the positive part of the torque Tc5 of the C5 phase are added, it becomes 151 of Tt5 in FIG. 15. The torque of each of the three phases has a characteristic of overlapping by 30°, and the rotor shape is such that when the torques of the three phases are added, the torque becomes constant.

Next, a method of generating torque in the CW direction in a state where the reluctance motor of FIG. 14 rotates at a speed Vso in the CCW direction will be described with reference to FIG. 15. It is also an operation that brakes the motor and regenerates it. The section in which Ta5, which is the A5 phase torque in FIG. 15, generates a negative torque is between 65° to 85° and 155° to 175° of θr, and the value of Ta5 in FIG. 15 is −1. During this time, the A5-phase current Ia5R shown in FIG. 15 is energized. Since the rotor rotation angle position θr between 60° and 65° and between 85° and 90° is a section where the A5 phase voltage Va5 is 0 [V], it can be used as the increase time and decrease time of the A5 phase current Ia5R, and can be a trapezoidal current. Similarly, as the B5 phase current Ib5, a current whose phase is delayed by 30° from Ia5R in FIG. 15 is energized. Similarly, as the C5 phase current Ic5, a current whose phase is delayed by 60° from Ia5R in FIG. 15 is energized.

The sum of the negative torques of each phase is the value shown in 152 of Tt5 in FIG. 15, and repeats a cycle in which ⅔ of 20° is −1.0 and ⅓ of 10° is 0. The average value is −⅔. If this torque ripple becomes a problem, various measures such as correction of the rotor magnetic pole shape, correction of the stator magnetic pole shape, and skew can be made. Note that Vt2 in FIG. 15 corresponds to the sum of the torques of each phase, and is a virtual voltage obtained by adding the operating voltages of the respective phases. Further, although the torque in the CW direction can be generated in principle regardless of the rotation direction and the rotation speed, the CW torque at the time of CCW rotation has been described for the convenience of explaining the CCW torque with reference to FIG. 15.

The motor of the present invention shown in FIGS. 1, 14, and 15 has unique characteristics as described above. For the problem of noise, for example, a method of increasing the current of each phase in FIG. 15 in the first half and decreasing the current value in the second half can be considered. Specifically, for example, the A5 phase current Ia5 Is made large from 0° to 30° of the rotor rotation angle θr in FIG. 15, and Ia5 is made small from 30° to 60°. Similarly, at this time, the B5 phase current Ib5 is increased from 30° to 60°, and Ib5 is decreased from 60° to 90°. Similarly, the C5 phase current Ic5 is increased from 60° to 75° and decreased from 90° to 120°. In this way, the current energization method of each phase, that is, modifying the magnitude of the current to reduce the current change rate when the current of each phase decreases from a large current value to 0 [A], it is possible to reduce the rate of change of the radial suction force, reduce the vibration of the back yoke, case, etc. of the motor, and reduce the noise.

Further, as shown in FIG. 15, the torque of each phase generates torque in a section of 67%. Two of the three phases always generate torque. In this way, by generating torque in a section where the stator magnetic poles of each phase are wide and by overlapping the torque generating sections with each other in the three phases, smoother rotation can be realized and noise can be reduced. Further, since the current waveform Ia5F in FIG. 15 can be a trapezoidal current waveform, noise can be reduced by suppressing the current change rate such as a rapid increase or decrease of each phase current.

The copper loss in the driving method of FIG. 15 will be described. When rotating to CCW, the current of each phase energizes the current at 67% of the pre-energized section, and the copper loss increases as compared with the case of 33% of the energized section of the conventional method of FIG. 47. Priority is given to the quietness of the motor. A method for significantly reducing copper loss and a method for increasing torque of the motor of the present Invention will be described later.

Figure 16:
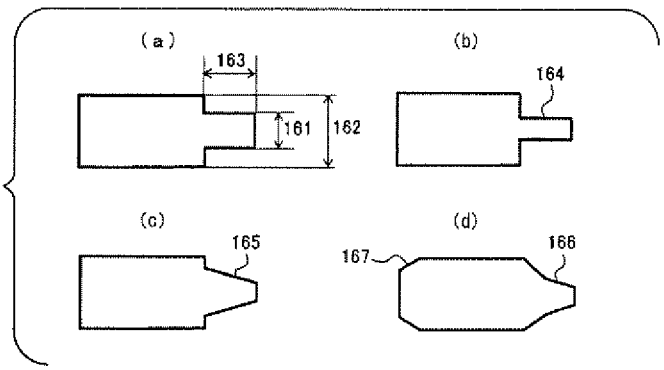
FIG. 16 is an example showing shapes of rotor magnetic poles.

Next, with respect to the outer peripheral surface shape of the rotor magnetic poles shown in FIGS. 4, 6, 10, 12, and 14, a linear development view of a modified example thereof will be described with reference to FIG. 16. FIG. 16(a) shows an example of the rotor magnetic pole, in which the right side of the paper is the direction of rotation of the CCW, the rotor axial width of the front portion of the rotor magnetic pole is 161 and the circumferential angular width of the front portion is 163, the rotor axial width of the rear portion of the rotor magnetic pole is 162. The rotor axial width 161 of the front portion can be reduced or Increased as shown in FIG. 16(b), depending on the desired motor characteristics. The same applies to the circumferential angle width 163. Further, the rotor axial width 161 of the front portion may be tapered as shown by a reference sign 165 of FIG. 16(c) or may be tapered as shown by a reference sign 166 of FIG. 16(d). Further, the shape of the rotor magnetic pole on the CW side can be deformed into various shapes such as shown by a reference sign 167.

Sixth Embodiment

Next, an embodiment of claim 3 will be shown and described with reference to FIG. 17. In FIGS. 4, 6, 10, 12, and 14, an example is shown in which the length in the rotor axial direction is changed between the front portion and the rear portion of the rotor magnetic pole as a means for changing the magnetic resistance value MR in the radial direction over the entire area of the rotor magnetic pole portion RP in the rotor axial direction. The lengths Ls and Ls/2 of the rotor magnetic poles in each figure in the rotor axial direction are shown, and the shape of the rotor magnetic poles on the rotor surface is shown horizontally expanded. The rotor magnetic pole shape that changes the length in the rotor axial direction is one method of arbitrarily setting the magnetic resistance MR of the rotor magnetic poles at the positions in the circumferential direction as viewed from the stator side. Easy to understand visually. However, from the viewpoint of ease of motor production, cost, noise, iron loss, and wind loss, it is possible to change the magnetoresistance value MR in the radial direction of the rotor magnetic pole by other methods. In the reluctance motor of the present invention, the rotor magnetic pole shape as shown in FIG. 17 can be applied.

Figure 17:
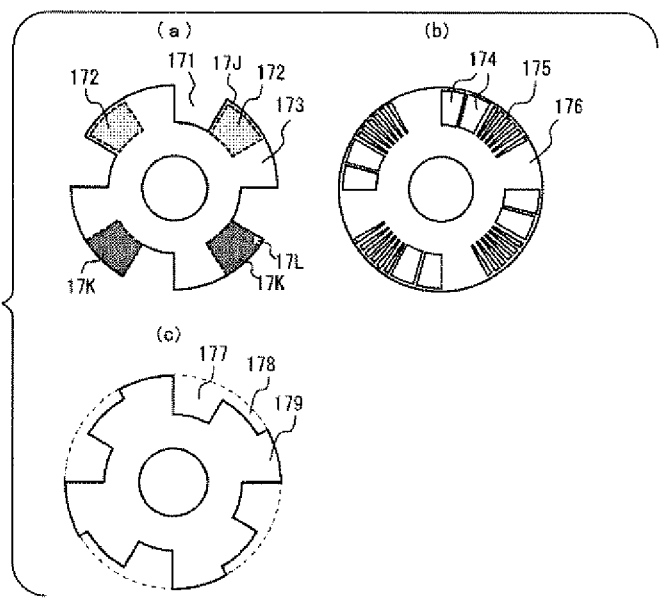
FIG. 17 is an example showing a lateral sectional view of the rotor of which magnetic steel sheets were subjected to processes such as hole drilling.

FIG. 17 shows an example of processing an electromagnetic steel sheet into various shapes. Electromagnetic steel sheets are laminated to form a rotor core, which constitutes the rotor magnetic pole of a reluctance motor. The thickness of the rotor magnetic pole in the rotor axial direction is uniform and Is Ls. FIG. 17A shows an example in which the rotor of FIG. 1 is deformed. Reference sign 173 is an electromagnetic steel sheet, and reference sign 172 is a soft magnetic material having a smaller saturation magnetic flux density than the portion of 173. For example, it is a ferrite iron core or a stainless electromagnetic steel sheet. Reference sign 17J is a holding portion for holding the soft magnetic material 172. 171 is a space. The saturation magnetic flux passing in the radial direction can be limited by the magnetic properties of the material. With such a configuration, it is possible to realize electromagnetic characteristics similar to those of the rotor magnetic pole of FIG. 4.

What is important in the reluctance motor of the present invention is not the reluctance in the small exciting current region but the magnitude of the magnetic flux in the exciting current region such as the continuous rated current Irate of the reluctance motor or the maximum current Imax. It is the magnitude of the magnetic flux in the radial direction including the material and shape of the rotor magnetic pole. By limiting the magnitude of the magnetic flux in the radial direction at each circumferential position of the rotor, various torque characteristics and electromagnetic characteristics can be realized.

For example, the characteristic of the broken line in FIG. 3A shows the same relative permeability as the solid line in the region where the exciting current is small. Therefore, when the magnetic material having the characteristic of the broken line is used as the material of 172 in FIG. 17, the magnetic resistance values of 172 and 173 in the radial direction are the same in the region where the exciting current is small. It does not have the characteristics described in FIG. 5. However, in the current region where the exciting current is such as Irate and Imax, the characteristic of the broken line is about ½ times the characteristic of the solid line, and the passing magnetic flux in the radial direction can be limited. In this state, the characteristics described in FIG. 5 can be almost realized. Here, in FIG. 172 of FIG. 17, which is a portion of the rotor magnetic pole composed of the soft magnetic material having the above-mentioned characteristics of the broken line, the magnetic resistance value in the radial direction can be small because (magnetic flux/exciting current) is small in the region where the exciting current is large. This is an example of characteristics in which the magnetic resistance value in the radial direction is the same in the region where the exciting current is small, but different in the region where the exciting current is large. As described above, the rotor of the reluctance motor of the present invention can be realized in terms of both the shape of the rotor magnetic pole and the magnetic characteristics of the magnetic material.

A reference sign 17K in FIG. 17(a) indicates an example in which a part of the electromagnetic steel sheet 173 is thinned by press working or the like. For example, by setting the thickness of the magnetic steel sheet of 173 to 0.35 mm and the thickness of the 17K portion to 0.175 mm, the magnetic resistance value MR in the radial direction is halved, and the saturation magnetic flux passing in the radial direction can be limited to halved. With such a configuration, it is possible to realize electromagnetic characteristics equivalent to those of the rotor magnetic pole of FIG. 4. This 17K configuration is excellent in productivity because it is possible to provide a thinning processing stage on the production line for press working of electrical steel sheets. In the case of this configuration, the holding portion 17J is not required for centrifugal force, but there is a problem of fixing in the rotor axial direction, and as shown in 17L, it is possible to devise such as leaving a part as a thick plate of 0.35 mm. Further, in laminating the electromagnetic steel sheets, for the purpose of holding, for example, about 1 in 20 disk-shaped electromagnetic steel sheets can be sandwiched. It is also possible to combine it with electromagnetic steel sheets of other shapes and stack them to obtain the desired electromagnetic characteristics and rotor strength. Further, in the 17K configuration, it is possible to obtain electromagnetic characteristics for various purposes by changing the thickness of the steel plate such as a thick plate portion of 0.35 mm, a portion of 0.24 mm, and a portion of 0.12 mm.

In FIG. 17(*b*), a large hole 174 and an elongated slit-mounted hole 175 are machined in the electrical steel sheet 176. The portion 174 is electromagnetically substantially equivalent to the spatial portion between the rotor magnetic poles in FIG. 4. The portion where the slit of 175 is arranged is electromagnetically equivalent to the portion where the length in the rotor axial direction is Ls/2 at the front portion of the rotor magnetic pole in FIG. 4. The slit of 175 has a large magnetic resistance in the circumferential direction and is configured to be about doubled in the radial direction. This slit shape is a pointed triangle, and the magnetic path sandwiched between the slits has a uniform width. In this way, it is possible to limit the maximum value of the radial magnetic flux by performing various hole drilling on the electrical steel sheet. The hole shape can be various shapes such as a square hole, a triangular hole, a round hole, and an elliptical hole, and the number, size, and distribution of holes can also be various. It can be expected to reduce eddy current loss and hysteresis loss, and has excellent magnetic characteristics. Further, it is also possible to limit the maximum value of the radial magnetic flux by laminating two or more kinds of electromagnetic steel plates having different shapes. In that case, effects such as averaging the discreteness of the magnetic resistance in the circumferential direction caused by the hole and averaging and complementing the rotor strength can be expected. It can also be combined with the above-mentioned thinning technique.

Further, the outer circumference of the rotor in FIG. 17(*b*) is circular, so that the noise of the rotor cutting the wind can be reduced. Further, electromagnetically, if the outer circumference of the rotor is circular, the harmonic component of the reluctance force can be reduced, and torque ripple and noise can be expected to be reduced. In order to reduce rotor vibration, each hole can be filled with resin or the like.

FIG. 17(*c*) is an example in which the magnetic characteristics of the rotor are realized by processing the outer peripheral portion of the electromagnetic steel sheet 179 to provide a recess. The recessed portion of 178 is expected to have the effect of reducing the magnetic flux, and 177 is a space portion. In this way, the electromagnetic steel sheet can be recessed to have characteristics that are electromagnetically close to those of the rotor magnetic pole shown in FIG. 4. It can be manufactured by simple punching and laminating of electrical steel sheets, and the rotor is robust. Further, if the dust core is used, even a complicated three-dimensional shape combining the radial unevenness of the rotor and the unevenness in the rotor axial direction can be manufactured by the molding technology using a mold, and can improve productivity.

Seventh Embodiment

Figure 18:
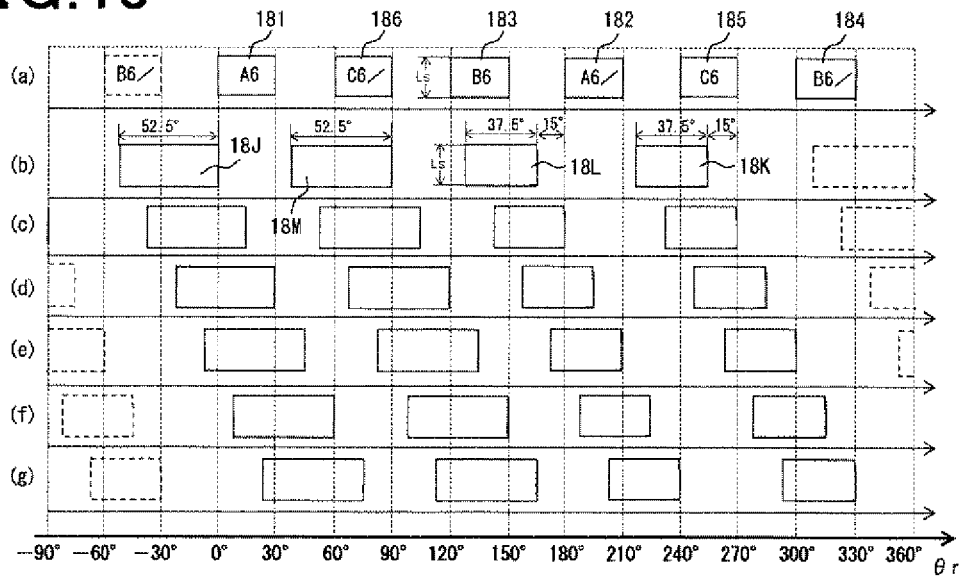
FIG. 18 is a horizontally developed view of both stator magnetic poles and rotor magnetic poles of a motor according to the present invention.

Next, an embodiment of claim 4 will be shown and described with reference to FIGS. 18 and 19. FIG. 18 shows a shape in which the rotor surface shapes of each stator magnetic pole and each rotor magnetic pole are linearly developed, and shows the relationship of electromagnetic action at the rotor rotation angle position θr. The reluctance motor having the configuration shown in FIG. 18 aims to simply realize the motor characteristics shown in FIGS. 6 and 7 with different structures.

FIG. 18A shows the shape of the inner peripheral surface of the stator magnetic pole SP as seen from the air gap surface between the stator and the rotor, and the circumferential direction of the CCW is the horizontal axis direction of FIG. 18, that is, it is a figure developed linearly so as to be in the right direction of the paper surface of FIG. 18. The vertical axis direction of the paper in FIG. 18 is the direction of the rotor axis. In FIG. 18, 181 is an A6 phase stator pole, 182 is an A6/ phase stator pole, 183 is a B6 phase stator pole, 184 is a B6/ phase stator pole, 185 is a C6 phase stator pole, and 186 is a C6/ phase stator pole. The shape of the air gap surface of the stator magnetic poles of each phase has a circumferential angular width θBs of 30° and a rotor axial length of Ls.

The concentrated winding 187 of the stator magnetic pole 181 and the concentrated winding 188 of 182 of FIG. 18 are connected in series with the same polarity, and an A6 phase current Ia6 is energized as an A6 phase winding, and the voltage is A6 phase voltage Va6. The concentrated winding 18A of the stator magnetic pole 183 and the concentrated winding 18B of 184 are connected in series with the same polarity, and a B6 phase current Ib6 is energized as a B6 phase winding, and the voltage is a B6 phase voltage Vb6. The concentrated winding 18D of the stator magnetic pole 185 and the concentrated winding 18E of 186 are connected in series with the same polarity, and a C6 phase current Ic6 is energized as a C6 phase winding, and the voltage thereof is a C6 phase voltage Vc6.

The rotor magnetic poles 18J, 18K, 18L, and 18M shown in FIG. 18B are arranged in the circumferential direction. The rotor magnetic pole 18J of FIG. 18B has a rotor rotation angle position θr of 0° and a circumferential angle width θBr of 52.5°. The rotor magnetic pole 18L has a θr of (180°−15°)=165° and a circumferential angular width θBr of (52.5°−15°)=37.5°. The rotor magnetic pole 18M has a rotor rotation angle position θr of 90° and a circumferential angle width θBr of 52.5°. The rotor magnetic pole 18K has a rotor rotation angle position θr of (90°+180°−15°)=255° and a circumferential angle width θBr of (52.5°−15°)=37.5°.

In FIGS. 4, 6, 10, 12, and 14, a one-pole pair configuration is shown as an example of a configuration that is point-symmetric with respect to the center point of the rotor axis. However, the structure of the rotor magnetic poles in FIG. 18 is not a point-symmetrical structure. That is, the shapes of the rotor magnetic poles separated by an electric angle of 180° in the circumferential direction are not the same. For example, the rotor magnetic poles 18J and 18L do not have the same shape. Here, the rotor rotation angle position θr is indicated by an electric angle.

When the motor has a single pole pair in the configuration of FIG. 18, for example, magnetic flux cannot pass through the stator magnetic pole 181 and the rotor magnetic pole 18K, the rotor magnetic pole 18L, and the stator magnetic pole 182 from (b) to (c) of FIG. 18. The operation is different from that of FIGS. 4, 6, 10, 12, and 14.

As one of the countermeasures, there is a method of configuring two pole pairs or more. For example, as a two-pole pair, this is a method in which the N pole and S poles of the stator magnetic poles with a mechanical angle of 0° to 180° and the N pole and S poles of the stator magnetic poles with a mechanical angle of 180° to 360° have opposite polarities.

Figure 19:
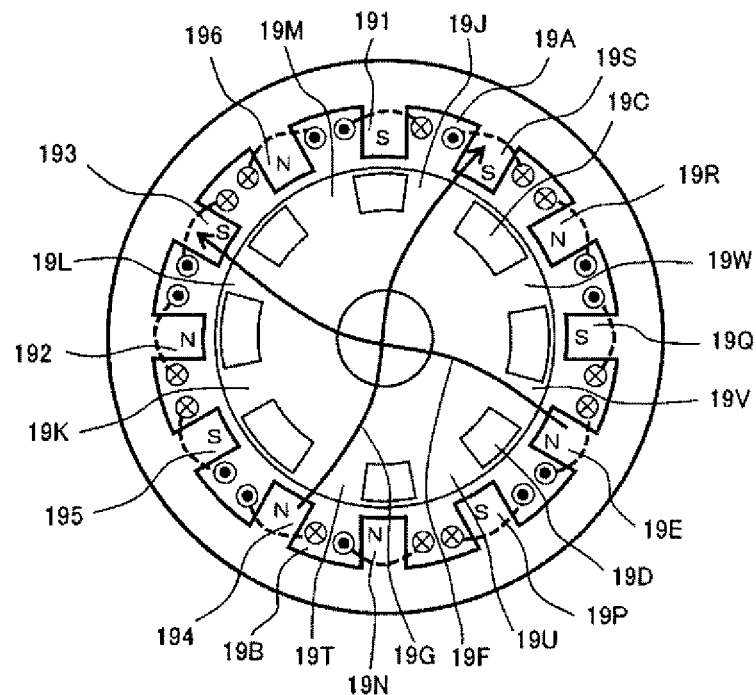
FIG. 19 is an example showing a lateral sectional view of a motor according to the present invention in which two magnetic poles are paired.

FIG. 19 shows a cross-sectional view of the reluctance motor having the configuration of FIG. 18 as a pair of two poles. Reference signs 191 and 19N are A6 phase stator magnetic poles, 192 and 19Q are A6/ phase stator magnetic poles, 193 and 19E are B6 phase stator magnetic poles, reference signs 194 and 19S are B6/ phase stator magnetic poles 195 and 19R are C6 phase stator magnetic poles, and 196 and 19P are C6/ phase stator magnetic poles. A concentrated winding shown by a broken line is wound around each stator magnetic pole. The directions of the windings of the stator magnetic poles are reversed so that the polarities of the north and south poles of the stator magnetic poles separated by 180° in mechanical angle are opposite polarities.

As shown in the figure, concentrated winding windings are wound around the stator magnetic poles 191 and 19N, 192 and 19Q in FIG. 19, and the currents are oriented and connected in series, and the A6 phase current Ia6 is energized as the A6 phase winding, and the voltage is a B6 phase voltage Vb6. As shown in the figure, concentrated winding windings are wound around the stator poles 195, 19R, 196, and 19P, and the currents are oriented in series and connected in series, and the C6 phase current Ic6 is energized as the C6 phase winding, the voltage is C6 phase voltage Vc6.

The rotor shows an example of a configuration in which electromagnetic steel sheets are laminated, and a fan-shaped quadrangle such as 19C or 19D is a space in which an electromagnetic steel sheet is punched out and has a large magnetic resistance. 19J and 19T in FIG. 19 correspond to the rotor magnetic pole 18J in FIG. 18, 19K and 19W correspond to the rotor magnetic pole 18K in FIG. 18, 19L and 19V correspond to the rotor magnetic pole 18L in FIG. 18, and 19M and 19U correspond to the rotor magnetic pole 18M of 18. The rotor magnetic poles separated by 180° in mechanical angle are point-symmetrical and have the same shape. In this rotor configuration, since the outer circumference of the rotor is circular, the wind noise of the rotor is small, and the high-order harmonic components of the torque ripples are also reduced.

As described above, since it is a pair of two poles, the stator magnetic poles separated by 180° in mechanical angle are the stator magnetic poles of the same phase, but the winding directions are opposite. This is also a stator pole that is 360° apart in electrical angle. For example, the B6 phase stator magnetic poles 193 and 19E and the windings of the B6/ phase stator magnetic poles 194 and 19S are connected in series to energize the B6 phase current Ib6. Since it has a point-symmetrical structure, the magnetic flux components shown by 19F and 19G can be generated without difficulties. Since the polarity of the stator magnetic poles is changed, the windings of the slots 19A and 19B have a positive current direction and a negative winding. Since the current polarity is different from that of other slots, care must be taken with other current energization methods described later.

In the explanation of FIG. 19, it was shown that the generation of the magnetic flux component is not unreasonable by forming a point-symmetrical shape by pairing with two poles. Further, in the case of a 4-pole pair, if the polarities of the 2-pole pair are opposite, it is not unreasonable to generate magnetic flux, so that the configuration does not necessarily have to be point-symmetrical. Further, it will be described here that even in the case of the one-pole pair motor configuration in the configuration of FIG. 18, although it is not a point-symmetrical magnetic flux component, a necessary magnetic flux component can be generated and torque can be generated. For example, assuming that the A6 phase current Ia6 is applied to the A6 phase stator magnetic pole 181 and the A6/ phase stator magnetic pole 182, from (b) and θr=0° to (c) and θr=15° in FIG. 18, the A6 phase stator magnetic pole 181 and the rotor magnetic pole 18J gradually face each other, but the A6/ phase stator magnetic pole 182 and the rotor magnetic pole 18L do not face each other, and the magnetic flux passing through 181 does not pass through 182. However, at this time, the other C6/ phase stator magnetic pole 186 and the rotor magnetic pole 18M are sufficiently opposed to each other, and the magnetic resistance is small. At the same time, the B6 phase stator magnetic pole 183 and the rotor magnetic pole 18L are sufficiently opposed to each other, and the magnetic resistance is small. At the same time, the C6 phase stator magnetic pole 185 and the rotor magnetic pole 18K are sufficiently opposed to each other, and the magnetic resistance is small. Therefore, the magnetic flux passing through 181 can pass through 186, 183, and 185 with a relatively small magnetic flux density. That is, the A6 phase stator magnetic pole 181 and the rotor magnetic pole 18J can generate a torque close to that in the case of FIG. 19 of the two-pole pair. The one-pole pair reluctance motor shown in FIG. 18 works well, although its action is not point-symmetrical.

The following description of the magnetic flux of each phase, the voltage of each phase, and the torque of each phase will be described based on the linear development diagram of FIG. 18, but the generation of the magnetic flux component will be described assuming that the two-pole pair configuration of FIG. 19 is assumed and the magnetic flux component is generated point-symmetrically. Now, the centralized winding 187 of the stator magnetic pole 181 and the centralized winding 188 of 182 of FIG. 18 are connected in series with the same polarity, and a constant current Io having a value close to the continuous rating is energized as the A6 phase current Ia6, and consider a state in which the rotor is rotated to CCW at a constant speed Vso. The reluctance motor of FIG. 18 is electromagnetically equivalent to the reluctance motor of FIG. 6, and has the same characteristics as the phase voltage and torque of FIG. 7 of FIG. 6. Here, FIG. 7 will be diverted and described. The CCW direction of the reluctance motor of FIG. 18 is the right direction of the paper surface of FIG. 18.

First, when the rotor magnetic pole 18J of FIG. 18 approaches from 0° to 15° of θr, the rotor magnetic pole 18J faces the A6 phase stator magnetic pole 181 via an air gap. The A6/ phase stator magnetic pole 182 and the rotor magnetic pole 18L are not yet opposed to each other. It is the state of (b) to (c) of FIG. 18. For the A6 phase voltage Va6, the magnetic flux interlinking the winding 187 of the A6 phase stator magnetic pole 181 and the winding 188 of the A6/ phase stator magnetic pole 182 may be obtained from the formula (5) and its definition. At this time, the magnetic flux interlinking with the winding 187 is the magnetic flux passing through the stator magnetic pole 181 and the rotor magnetic pole 18J, and the rotor axial width of both magnetic poles is Ls. The magnetic flux interlinking with the winding 188 is 0 because the stator magnetic pole 182 and the rotor magnetic pole 18L are not yet opposed to each other. Considering these average values, it is equivalent to a state in which a rotor magnetic pole having a rotor axial width of Ls/2 is approaching both the stator magnetic pole 181 and the stator magnetic pole 182. The magnetic flux interlinking both windings of 187 and 188 is equivalent to the magnetic flux on which the rotor magnetic pole having a rotor axial width of Ls/2 acts. Therefore, it can be said that the states (b) to (c) in FIG. 18 are electromagnetically equivalent to the states (b) to (c) in FIG. 6. The A6 phase voltage Va6 at this time is the same as the voltage Va2 in FIG. 7.

Next, when the rotor magnetic pole 18J approaches 30° from 15° of θr, the portion where the rotor magnetic pole 183 faces the stator magnetic pole 181 of the A6 phase increases by 15°. During this time, the A6/ phase stator magnetic pole 182 and the rotor magnetic pole 18L also face each other via the air gap. During this time, the A6/ phase stator magnetic pole 182 and the rotor magnetic pole 18L also face each other via the air gap. This state Is the state from (c) to (d) in FIG. 18, and is electromagnetically equivalent to the state from (c) to (d) in FIG. 18. Currently the A6 phase voltage Va6 is the same as the voltage Va2 in FIG. 7.

The same applies to the following, and the subsequent (d) in FIG. 18 is electromagnetically equivalent to the subsequent (d) in FIG. 6. The A6 phase voltage Va6 at this time is the same as the voltage Va2 in FIG. 7. As described above, since the period of the reluctance motor is 180° in the electric angle, the relationship between the stator magnetic pole and the rotor magnetic pole separated by 180° or 360° in the electric angle is electromagnetically equivalent if their average values are the same. The configuration of FIG. 18 and the configuration of FIG. 6 have such an equivalent relationship. The stator magnetic poles of both configurations are the same, and the average value of the rotor magnetic poles 18J and 18L in FIG. 18, that is, the average shape is the rotor magnetic poles 6J and 6L in FIG. 6. Then, the average value of the rotor magnetic poles 18M and 18K in FIG. 18, that is, the average shape is the rotor magnetic poles 6M and 6K in FIG. 6. However, the degree of distribution of torque generated by each stator magnetic pole, the degree of magnetic saturation, etc. are different, and the force acting inside the motor is also different. Further, comparing the shape of the motor and its manufacturability, the rotor configuration of FIG. 18 is simpler than the rotor configuration of FIG. 6, and is excellent in productivity.

Eighth Embodiment

Next, an embodiment of claim 5 will be shown and described in FIGS. 20, 21, 22, 8, 8 (*b*), and 9 (*b*). In the cross-sectional view of FIG. 20, a configuration is shown in which the concentrated winding of each stator magnetic pole shown in FIG. 1 is converted into a full-pitch winding, and the two concentrated windings in each slot are integrated Into one winding. The purpose is to double the winding cross-sectional area in each slot and reduce copper loss in the slot. Others such as the rotor of FIG. 20 have the same configuration as that of FIG. 1. It should be noted that the rotor magnetic pole configurations shown in FIGS. 4, 6 and 14 increase the copper loss, which is also a technique for compensating for the increase in copper loss.

Although FIG. 1 is shared in the above description of some motors of the present invention, it is also shared as one of the typical motor forms in the description of FIG. 20 and defined again as follows. In FIG. 1, 11 is an A7 phase stator magnetic wire that winds 17 and 18 concentrated windings, and 12 is an A7/ phase stator magnetic pole that winds 1C and 1D concentrated windings, and both windings are connected in series in the same direction of current to energize the A7 phase current Ia7. 13 is a B7 phase stator magnetic pole that winds 1U and 1V concentrated windings, and 14 is a B7/phase stator magnetic pole that winds 1S and 1T concentrated windings, and both windings are connected in series in the same direction of current to energize the B7 phase current Ib7. Reference sign 15 is a C7 phase stator magnetic pole for winding 1Q and 1R concentrated windings, and 16 is a C7/ phase stator magnetic pole for winding 1P and 1N concentrated windings, and both windings are connected in series in the same direction of current to energize the C7 phase current Ic7. Then, for example, when the magnetic flux 1E is generated, the A7 phase current Ia7 is energized.

Figure 20:
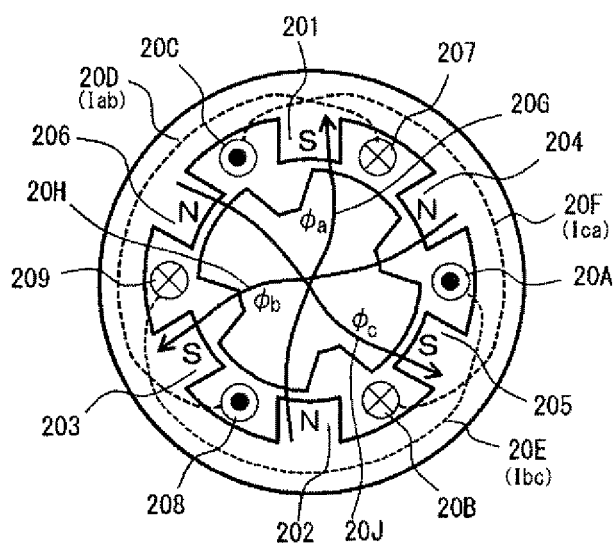
FIG. 20 is an example showing a lateral sectional view of a motor according to the present invention, in which full-pitch windings are applied to the motor.

A reference sign 201 in FIG. 20 indicates an A7 phase stator magnetic pole, and 202 is an A7/ phase stator magnetic pole. The AB phase current Iab that energizes the winding 207, its coil end 20D, and the AB phase full-pitch winding indicated by winding 208, and the winding 20B, the coil end portion 20F thereof, and the CA phase current Ica that energizes the CA-phase all-node winding wound indicated by the winding 20C are energized to excite the A-phase magnetic flux φa shown by 20G. A reference sign 203 indicates a B7 phase stator magnetic pole, while a reference sign 204 indicates a B7/ phase stator magnetic pole. The BC phase current Ibc that energizes the winding 209, its coil end portion 20E, and the BC phase full-pitch winding indicated by the winding 20A, and the winding 207 and the current Iab shown by 208 are energized to excite the B-phase magnetic flux φb shown by 20H. A reference sign 205 indicates a C7 phase stator magnetic pole and 206 is a C7/ phase stator magnetic pole. The current Ica of the windings 20B and 20C and the current Ibc of the windings 209 and 20A are energized to excite the C-phase magnetic flux φc shown by 203.

Here, the current of FIG. 1 and the current of FIG. 20 have the following relationship.

$$Iab = Ia7 + Ib7 \tag{13}$$

$$Ibc = Ib7 + Ic7 \tag{14}$$

$$Ica = Ic7 + Ia7 \tag{15}$$

As for the calculation method of each current in FIG. 20, if each current value in FIG. 1 is calculated according to the formulas (13), (14) and (15) and energized, FIGS. 20 and 1 are electromagnetically equivalent. The same magnetic flux as in the case of FIG. 1 is excited, and torque can be generated.

At this time, for example, when the magnetic flux 20G shown in FIG. 20 is generated, the A7 phase current Ia7 may be energized as the AB phase current Iab, and the A7 phase current Ia7 may be energized as the CA phase current Ica. At this time, comparing the A7 phase winding 17 in FIG. 1 and the CA phase winding 207 in FIG. 20, assuming that the windings have the same number of turns in the same slot, there is also B7/ phase winding 1S in the case of FIG. 1, so the winding cross-sectional area of the CA phase winding 207 can be relatively doubled. Therefore, the winding resistance can be halved in the full-pitch winding of FIG. 20, and the copper loss can be reduced when the same current is applied.

Physically, the winding 207 of FIG. 20 shares the exciting action of the winding 17 of FIGS. 1 and 1S. The winding 207 of FIG. 20 can be used to excite the stator magnetic pole 201, and can also be used to excite 204. In the case of the energization method such as the conventional reluctance motor shown in FIGS. 46 and 47, the energization time of each winding is 33% of the total. For example, the time for which the windings 467 and 46G are energized at the same time is very short, and the effect of reducing copper loss by changing to a full-pitch winding is great. However, in the case of the energization method in which the time for energizing the windings 467 and 46G at the same time is long, the copper loss reduction effect is reduced.

Figure 22:
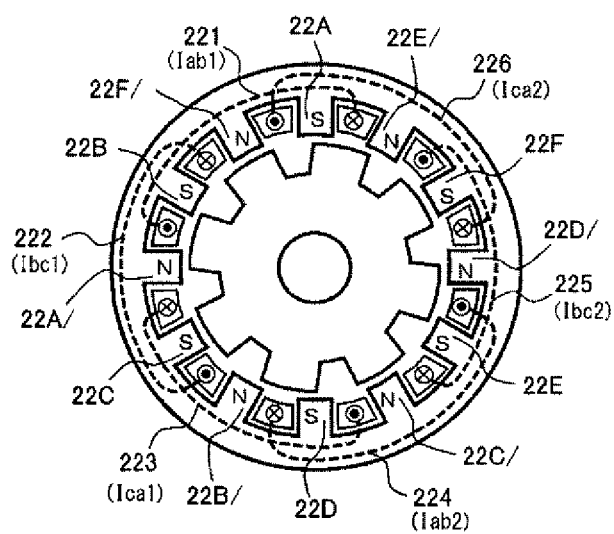
FIG. 22 is a lateral sectional view exemplifying a motor according to the present invention in which full-pitch windings are provided at paired magnetic poles.

Further, at the rotor axial end of each winding in FIG. 20, a coil end portion of the winding as shown in 20D, 20E, and 20F is required. In particular, in the case of a one-pole pair of motors, the motors are connected to slots 180 degrees apart at a mechanical angle, and the length of the coil end portion is a heavy burden in terms of production and efficiency. Here, as a countermeasure, if a two-pole pair is used as shown in FIG. 22, the length of the coil ends 221, 222, 223, 224, 225, and 226 can be shortened to about half. If a 4-pole pair is used, the circumferential length of the coil end is further halved, and the load on the motor can be reduced. Further, even in a mass-produced synchronous motor or the like, in the case of full-pitch winding, there is a problem that the winding becomes complicated due to the overlap of the phase windings of the coil end portion and the rotor axial length of the coil end portion becomes large. However, as shown in FIG. 22, in the centralized winding in which the windings are concentrated in one slot in full-pitch winding, the overlapping of the windings is small, and a relatively simple winding configuration can be obtained. Further, in the case of an elongated motor having a large rotor axial length of the motor, the ratio of the coil end portion in all the windings is reduced.

Figure 21:
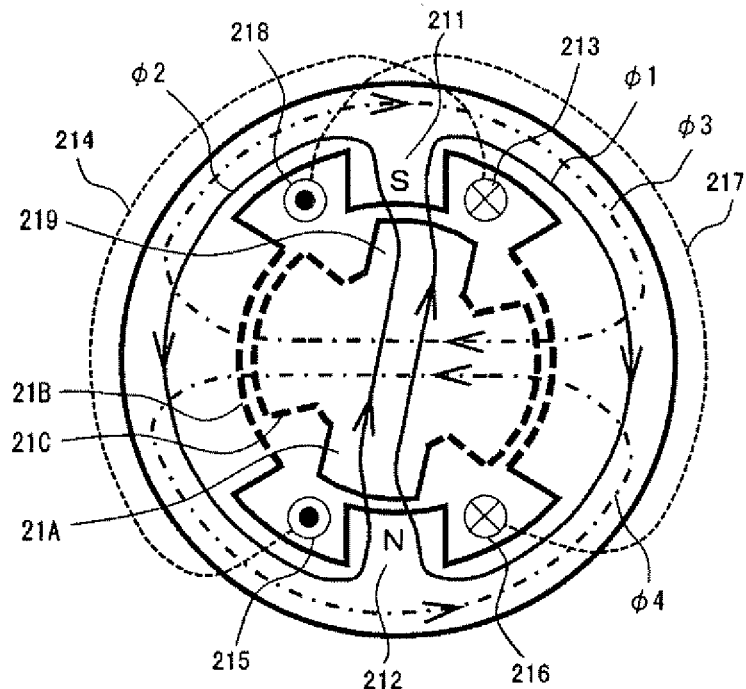
FIG. 21 is a view showing magnetic flux components acting on full-pitch windings.

Next, the interlinkage magnetic flux and the winding voltage of the full-pitch winding winding of FIG. 20 are shown and described in FIG. 21. Note that FIG. 21 will be described as a generalized motor configuration so that it can be applied not only to the motor of FIG. 20 but also to the motor of FIG. 8(*b*), FIG. 9(*b*), and FIG. 23. Since the magnetic fluxes of other phases are also interlinked with the full-pitch winding winding of FIG. 21, the winding voltage has a complicated relationship. The causal relationship of voltage generation and its problems will be explained. In addition, due to the complexity of the interlinkage magnetic flux, not only the current control of the motor becomes complicated, but also the problem of voltage bias occurs, so that the voltage load of the inverter increases and the problem of increasing the size also occurs.

A reference sign 211 in FIG. 21 shows an AX phase stator magnetic pole, and a reference sign 212 shows an AX/ phase stator magnetic pole. The winding 213, the coil end 214, the full-pitch winding W1 of the winding 215, and the winding 216, the coil end 217, and the full-pitch winding W2 of the winding 218 are arranged, and it is assumed that the number of windings is Nwx. Reference signs 219 and 21A show rotor magnetic poles. A reference sign 21C shown by the broken line indicates a part of the rotor other than 219 and 21A, in which the number of rotor magnetic poles is not limited. That is, this configuration can be applied to various types of motors.

Here, as a limiting condition for the motors of FIGS. 20 and 21, it is assumed that the structure and configuration are point-symmetrical with respect to the center point of the rotor axis, and the currents energizing the windings W1 and W2 are currents as shown in formulas (13), (14), and (15) obtained by converting the current of the concentrated winding winding of FIG. 1 into the current value of all the windings of FIG. 20.

Under this condition, the magnetic fluxes generated in FIG. 21 are two types: magnetic fluxes φ1 and φ2 through which the AX phase stator magnetic poles 211 and 212 pass through the AX/phase stator magnetic poles 212 and magnetic fluxes crossing the magnetic fluxes as shown in φ3 and φ4 in FIG. 21. Further, the magnetic fluxes of the other paths can be converted into these four magnetic fluxes. At this time, the voltage Vw1 of the full-pitch winding W1 and the voltage Vw2 of the full-pitch winding W2 are given by the following formulas.

$$Vw1 = Nwx \times d(\varphi1+\varphi2+\varphi3+\varphi4)/dt \quad (16)$$

$$Vw2 = Nwx \times d(\varphi1+\varphi2-\varphi3-\varphi4)/dt \quad (17)$$

$$Vh = Nwx \times d(\varphi3+<\varphi4)/dt \quad (18)$$

If there is no magnetic flux (φ3+φ4) crossing in FIG. 21, the voltage Vh in formula (18) becomes 0, and Vw1 and Vw2 have equal values. However, if (φ3+φ4) exists, the voltage component Vh acts differentially on Vw1 and Vw2, causing a phenomenon in which the voltage is biased.

Normally, even in a reluctance motor having a relatively simple configuration as shown in FIG. 20, the magnetic flux (φ3+φ4) in FIG. 20 is as large as the magnetic flux (φ1+φ2) and is greatly affected thereby. Moreover, since they act differentially, the voltage of one of Vw1 and Vw2 becomes small and the other becomes large, causing a large imbalance. This phenomenon occurs when the A7 phase current Ia7 is applied to the concentrated windings 17, 18 and 1C and 1D in FIG. 1, only the magnetic flux 1E interlinks with the concentrated windings, but when the winding is changed to a full-pitch winding, it means that the other crossing magnetic flux components (φ3+φ4) act like disturbance. As described above, although the configuration of the full-pitch winding winding shown in FIG. 20 can reduce the copper loss due to the current, Not only the voltage becomes complicated and the current control of the motor becomes complicated, but also the problem of voltage bias occurs due to the differential voltage component, which increases the voltage load of the inverter and causes a problem of increasing the size. In particular, there is a problem that an excessive voltage is generated when a heavy load is rotated at high speed. A method for solving this voltage problem will be described later with reference to FIG. 37 and the like.

Ninth Embodiment

Next, another embodiment of claim 5 is shown in FIG. 8(*b*). The reluctance motors shown in FIGS. 8(*a*) and 8(*b*) are reluctance motors having 8 stator magnetic poles and 6 rotor magnetic poles, and the stator magnetic pole numbers in FIG. 8(*b*) are the same, so they are omitted. FIG. 8(*b*) shows the two windings of each slot of FIG. 8(*a*) described above integrated into one winding, and it is also a figure which shows the example which converts the centralized winding wound around each stator magnetic pole into the whole node winding. The voltage, current, drive circuit, etc. of each winding of FIG. 8(b) will be shown later.

Tenth Embodiment

Next, another embodiment of claim 5 is shown in FIG. 9(b). FIG. 9(b) is a combination of the two windings of each slot of FIG. 9(a) described above into one winding, and it is also a figure which shows the example which converts the concentrated winding which winds around each stator magnetic pole into full-pitch winding. In FIG. 9A, as described above, in the slot between the A4 phase stator magnetic pole 121 and the C4/ phase stator magnetic pole 126, a concentrated winding 12J for energizing the A4 phase current Ia4 and a concentrated winding 96 for energizing the C4 phase current Ic4 are arranged. n the slot between the A4/ phase stator pole 122 and the C4 phase stator pole 125, a concentrated winding 92 for energizing the A4 phase current Ia4 and a concentrated winding 95 for energizing the C4 phase current Ic4 are arranged. (Ia4+Ic4) is energized in both of these slots. However, the direction of the current is the direction of the current symbol.

When the AC4 phase current (Ia4+Ic4) is applied to the full-pitch winding windings 9B and 9M of FIG. 9(b), the magnetomotive force generated by the currents of both slots is the same as that of FIG. 9(a). For the convenience of the drive circuit of the present invention, which will be described later, this AC4 phase full-pitch winding is divided into two insulated parallel windings, and the coil end is marked with two symbols, 13ac1 and 13ac2. Similarly, the coil ends of the CE4-phase full-pitch winding wound in the slot between the C4 phase stator pole 125 and the E4/ phase stator pole 12A are 13ce1 and 13ce2, and (Ic4+Ie4) is energized. The coil ends of the EB4 phase full-pitch winding wound in the slot between the E4 phase stator pole 129 and the B4/ phase stator pole 124 are 13eb1 and 13eb2, and EB4 phase current (Ie4+Ib4) is energized. The coil ends of the BD4 phase full-pitch winding wound in the slot between the B4 phase stator pole 123 and the D4/ phase stator pole 128 are 13bd1 and 13bd2, and the BD4 phase current (Ib4+Id4) is energized. The coil ends of the DA4 phase full-pitch winding wound in the slot between the D4 phase stator magnetic pole 127 and the A4/ phase stator magnetic pole 122 are 13da1 and 13da2, and DA4 phase current (Id4+Ia4) is energized. In this way, the configuration of the centralized winding of FIG. 9(a) can be converted to the full-pitch winding of FIG. 9(b). The actions, effects, and problems of the full-pitch winding motor of FIG. 9(b) are the same as those of the reluctance motor of FIG. 20 described above.

Eleventh Embodiment

Figure 23:
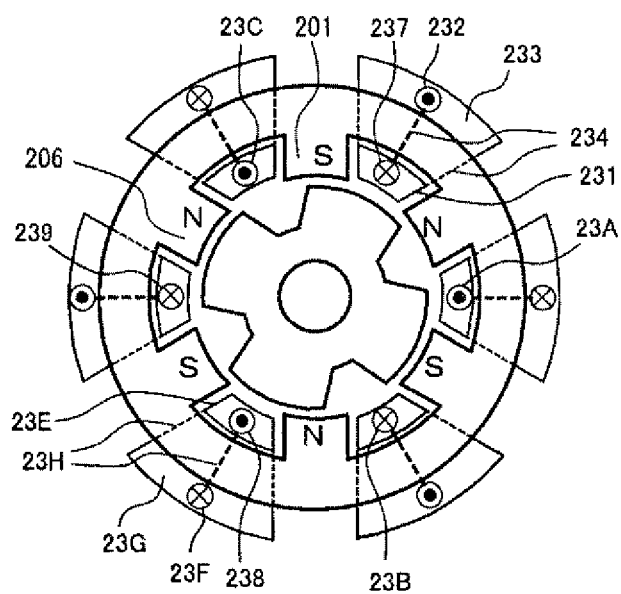
FIG. 23 is a lateral sectional view which exemplifies slot windings provided as toroidal windings.

Next, an embodiment of claim 6 will be shown and described with reference to FIGS. 23, 24, and 25. The cross-sectional view of FIG. 23 shows a configuration in which the set of full-pitch winding windings shown in FIG. 20 is divided into two. It is a method of winding the winding for each slot individually. The stator magnetic pole and rotor magnetic pole in FIG. 23 are the same as those in FIG. 20 above.

A reference 237 of FIG. 23 shows the same as the AB phase winding 207 of FIG. 20, but is not a full-pitch winding, but is wound around the winding 232 outside the back yoke through the coil end portion 234. A reference sign 231 shows the cross-sectional shape of the winding 237, and a reference sign 233 shows an example of the cross-sectional shape of the winding 232. The 238 of FIG. 23 is also the same as the AB phase winding 208 of FIG. 20, but is not a full-pitch winding, but is wound around the winding 23F outside the back yoke through the coil end portion 23H. A reference sign 23E shows the cross-sectional shape of the winding 238, and a reference sign 23G shows an example of the cross-sectional shape of the winding 23F. The AB phase current Iab=(Ia+Ib) is energized through these AB phase windings 237 and 238.

Reference signs 239 and 23A in FIG. 23 indicate BC phase windings, which are wound to the outside of the back yoke in the same manner as the AB phase windings 237 and 238 in FIG. A BC phase current Ibc=(Ib+Ic) is applied to these BC phase windings 239 and 23A. Reference signed 23B and 23C in FIG. 23 indicate CA phase windings, and are wound outside the back yoke in the same manner as the AB phase windings 237 and 238 in FIG. 23. A CA phase current Ica=(Ic+Ia) is applied to these CA phase windings 23B and 23C. When such each phase current is energized, each phase current of FIG. 23 is generated inside the motor, and the magnetomotive force acting on the motor is the same as the magnetomotive force of each phase current of FIG. 2320. The form of these windings in FIG. 23 is a so-called toroidal winding.

Next, the voltages of the AB phase windings 237 and 238 and the CA phase windings 23B and 23C of FIG. 23 will be described with reference to FIG. 21 and (16), (17) and (18). The voltage of the winding 237 in FIG. 23 is Vw11, the voltage of 238 is Vw12, the voltage of 23B is Vw21, and the voltage of 23C Is Vw22. From the relationship between the position and the direction of each magnetic flux in FIG. 21, it can be written as follows.

$$Vw11 = Nwx \times d(\varphi1+\varphi3)/dt \tag{19}$$

$$Vw12 = Nwx \times d(\varphi2+\varphi4)/dt \tag{20}$$

$$Vw21 = Nwx \times d(\varphi1-\varphi4)/dt \tag{21}$$

$$Vw12 = Nwx \times d(\varphi2-\varphi3)/dt \tag{22}$$

Each of these voltages is a voltage different from the formulas (16), (17), and (18).

Here, if the voltage when the windings 237 and 238 are connected in series is Vw1s and the voltage when the windings 23B and 23C are connected in series is Vw2s, the following formula can be written. The formulas (16) and (17) in FIG. 21 are the same, respectively.

$$\begin{aligned} Vw1s &= Vw11 + Vw12 \\ &= Nwx \times d(\varphi1+\varphi2+\varphi3+\varphi4)/dt \\ &= Vw1 \end{aligned} \tag{23}$$

$$\begin{aligned} Vw2s &= Vw11 + Vw12 \\ &= Nwx \times d(\varphi1+\varphi2-\varphi3-\varphi4)/dt \\ &= Vw2 \end{aligned} \tag{24}$$

In comparison with FIGS. 23 and 20, when the windings 237 and 238 of FIG. 23 are connected in series, the voltage is the same as that of the full-pitch windings 207 and 208 of FIG. 20. When the windings 239 and 23A of FIG. 23 are connected in series, the voltage is the same as that of the full-pitch windings 209 and 20A of FIG. 20. When the windings 23B and 23C of FIG. 23 are connected in series, the voltage is the same as that of the full-pitch windings 20B and 20C of FIG. 20.

Next, the features and effective usage when the winding structure as shown in FIG. 23 will be adopted will be described. One of the features is that since the windings of each phase are individually configured, there are no restrictions on current control, and various current controls can be performed.

In addition, the winding can be simplified as compared with the full-pitch winding. A toroidal winding can be formed so as to surround the back yoke, which facilitates winding production and improves the winding space factor. In particular, when the number of phases increases as shown in FIGS. 8 and 9, there is a problem that the winding of the coil end portion becomes complicated when the winding is a full-pitch winding. However, if it is a toroidal winding as shown in FIG. 23, it is possible to simplify and increase the space factor without crossing the windings.

Depending on the shape of the motor, there are advantages and disadvantages of the configuration shown in FIG. 23. The rotor axial length of the motor is small, and the motor diameter is relatively large. In the case of a flat motor, the configuration of FIG. 23 is advantageous. In the configuration of FIG. 23, the winding on the outer diameter side of the back yoke is not useful for generating the magnetomotive force inside the motor like the winding of the coil end portion in FIG. 20. Therefore, one method of reducing the load on the outer diameter side winding is to apply it to a flat motor.

Further, since the winding is exposed to the outer peripheral portion of the rotor, the cooling effect can be increased. The thermal conductivity of the conducting wire is high, and the heat of copper loss generated in the slot can be effectively dissipated to the outside. It is also possible to forcibly air-cool or liquid-cool the outside of the motor, or to add other heat dissipation means.

Figure 24:
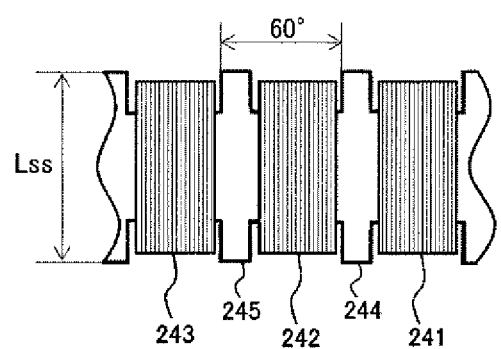
FIG. 24 is an example showing toroidal windings whose winding length and coil end lengths are shortened.

Next, FIG. 24 shows an example in which the reluctance motor of FIG. 23 has a flatter structure and has a characteristic configuration. FIG. 24 is a linear development of the circumferential shape seen from the outside of FIG. 23. The vertical direction of the paper surface in FIG. 24 is the rotor axial direction, and the horizontal direction of the paper surface is the direction in which the circumferential shape is linearly developed. The winding 241 of FIG. 24 corresponds to the windings 233 and 237 of FIG. 23. The winding 242 corresponds to the winding 23C of FIG. 23. The winding 243 corresponds to the winding 239 of FIG. 23. The stator magnetic pole 244 corresponds to the stator magnetic pole 201 of FIG. 23. The stator magnetic pole 245 corresponds to the stator magnetic pole 206 of FIG. 23. The left and right sides of FIG. 24 are wavy lines, and the drawings are omitted. In FIG. 24, a part of the back yoke of the stator is recessed in the rotor axial direction, and the winding is wound in the space. Lss is the rotor axial length of the stator, which is the same as the rotor axial length Ls in FIGS. 20 and 23. Therefore, in the configuration of FIG. 24, the dimension of the coil end portion in the rotor axial direction can be shortened twice, so that a flatter reluctance motor can be realized. Since the length of each coil can be shortened, copper loss can be reduced and copper wire cost can be reduced. As mentioned above, external cooling is easy. When incorporating a motor into various devices such as electric vehicles, flat motors are often used. However, in order to secure the cross-sectional area through which the magnetic flux of the back yoke portion of the stator passes, it is necessary to slightly increase the diameter of the stator. In addition, since the shape of the soft magnetic material of the stator becomes complicated, it is necessary to devise a part thereof, such as using a dust core having an easy three-dimensional structure.

Twelfth Embodiment

Figure 25:
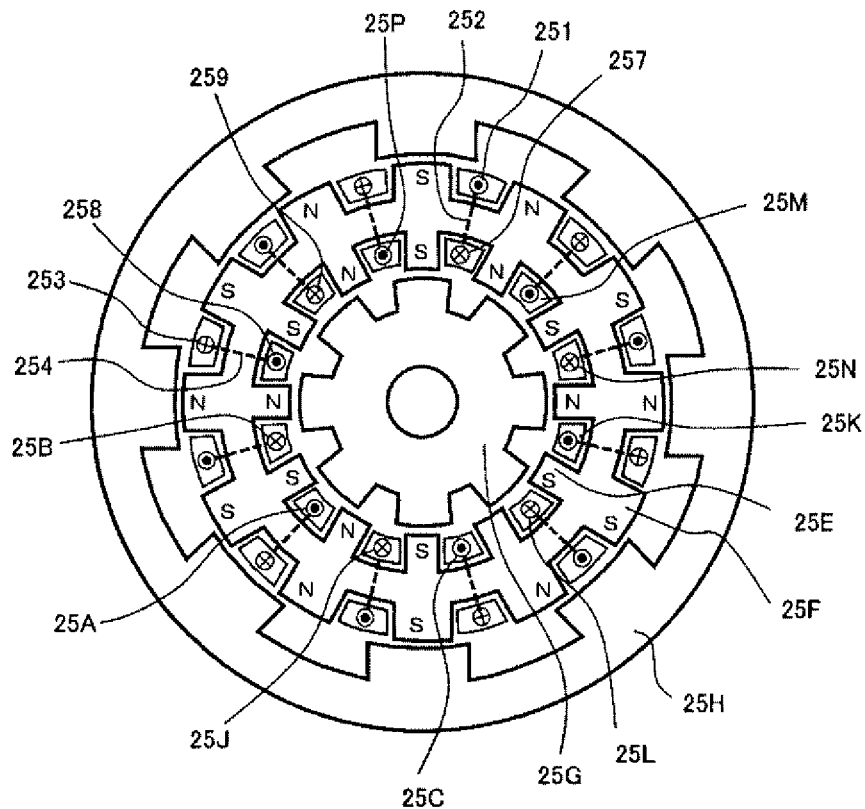
FIG. 25 is a lateral sectional view exemplifying a dual motor provided as the motor according to the present invention.

Next, another embodiment of claim 6 is shown in FIG. 25. Two sets of motors, which are an inner diameter side motor and an outer diameter side motor, are integrated and arranged in one motor. The motor configuration of FIG. 25 is a configuration in which the motor configuration of FIG. 23 is paired with two poles to form an inner diameter side motor, and an outer diameter side motor having a target structure for inner and outer diameters is added.

In FIG. 25, a reference sign 25G shows the first rotor of the inner diameter side motor, and a reference sign 25H shows the second rotor of the outer diameter side motor. A reference sign 25E shows a part of the first stator of the inner diameter side motor, which is a B-phase stator magnetic pole. A reference sign 25F shows a part of the second stator of the outer diameter side motor, and is a B-phase stator magnetic pole. The first stator and the second stator are arranged back to back, and the back yoke is integrated therewith. The back-to-back stator magnetic poles are in-phase stator magnetic poles, and the windings are toroidal windings in which the windings of the first stator and the windings of the second stator are integrated.

The winding 257 serves as an AB phase winding, is wound around the winding 251 through the coil end portion 252, and is wound so as to surround the stator core. These correspond to the windings 237, 234 and 232 in FIG. 23. The winding 258 also serves as also the AB phase winding, but the direction of this winding is opposite to that of the winding 257, and the winding 258 is wound around the winding 253 through the coil end portion 254 and wound so as to surround the stator core. These correspond to the windings 238, 23H, 23F in FIG. 23. Similarly, the windings 259 and 25A serve as BC phase windings that are wound around the stator core. These correspond to the windings 239 and 23A in FIG. 23. Similarly, the windings 25B and 25C serve as CA phase windings and are wound so as to surround the stator core. These correspond to the windings 23B and 23C in FIG. 23. FIG. 25 shows a two-pole pair configuration, and the other half has the similar configuration.

By adopting the motor configuration as shown in FIG. 25, the windings 232, 23F, etc. on the outer side of the stator of FIG. 23 can be effectively used as windings for generating torque. Further, since the inner diameter side of the motor space is also effectively utilized, the motor can have a high output density. Further, it is possible to have a stator configuration as shown in FIG. 24, and it is also possible to flatten the motor. In particular, in a reluctance motor having a large number of phases as shown in FIGS. 8(b) and 9(b), the coil end portions become complicated in their structures when full-pitch windings are wound. Therefore, the coil end portions can be simplified in the structure, of which motor configuration can be provided as shown in FIG. 25.

Thirteenth Embodiment

Next, an embodiment of claim 7 will be shown and described with reference to FIG. 26. FIG. 26 is an enlarged view of the stator in the upper left portion of FIG. 19 in which a permanent magnet is arranged between each tooth of the stator magnetic pole. A reference sign 268 indicates an outer shape of the stator. The reluctance motor shown in FIG. 19 has a two-pole pair of the reluctance motor of FIG. 1 composed of six stator magnetic poles and four rotor magnetic poles.

A reference sign 261 of FIG. 26 shows an A6 phase stator magnetic pole, in which a concentrated winding is wound and an A6 phase current Ia6 is energized in the direction indicated by the current symbol, so that the polarity becomes an S pole. A reference sign 262 shows an A6/ phase stator magnetic pole, the centralized winding is wound and the A6 phase current Ia6 is energized in the direction indicated by the current symbol, so that the polarity becomes an N pole. A reference sign 63 denotes a B6 phase stator magnetic pole, in which a concentrated winding is wound and a B6 phase current Ib6 is energized in the direction indicated by the current symbol, so that the polarity is an S pole. A reference sign 266 denotes a C6/ phase stator magnetic pole, in which a concentrated winding is wound and a C6 phase current Ic6 is energized in the direction indicated by the current symbol, and the polarity becomes an N pole.

A reference sign 26A shows a permanent magnet placed between the teeth of the A6 phase stator pole 261 and the C6/ phase stator pole 266, and the polarity of 26A is in the direction of the polarity of both stator poles. A magnetic flux 26B is generated in the direction opposite to the direction of the magnetic flux generated in the teeth of both stator magnetic poles. A reference sign 26C shows a permanent magnet placed between the teeth of the C6/ phase stator pole 266 and the B6 phase stator pole 263, and the polarity of 26C is oriented in the direction of the polarity of both stator poles. A magnetic flux 26D is generated in the direction opposite to the direction of the magnetic flux generated in the teeth of both stator magnetic poles. A reference sign 26E shows a permanent magnet placed between the teeth of the B6 phase stator pole 263 and the A6/ phase stator pole 262, and the polarity of 26E is oriented toward the polarity of both stator poles. A magnetic flux 26F is generated in the direction opposite to the direction of the magnetic flux generated in the teeth of both stator magnetic poles.

It is assumed that Ltf is a circumferential width of each of the tooth tips of the stator magnetic poles 261, 262, 263, and 266 shown in FIG. 26. It is also assumed that the width of the tooth tip in FIG. 19 and the width of the slot opening are the same, the circumferential angle of the tooth tip is 15° in terms of mechanical angle. In FIG. 19, the width of the tooth is a constant width from the tip of the tooth to the root, and the constant width corresponds to the Ltf. The constant width is the shape of each tooth shown by the alternate long and short dash line in FIG. 26. However, the width of the central portion 26G of the tooth in FIG. 26 is the tooth width of Lts shown by the solid line, and is smaller than the width Ltf. Therefore, the cross-sectional area of the slot is expanded by the cross-sectional integral with the tooth width reduced. As a result, the winding resistance in the slot can be reduced and the copper loss can be reduced.

Now consider a magnetic flux φt that is part of the C6/ phase stator magnetic pole 266 and passes through the tooth center 26G with a tooth width Lts. The relationship between the magnitude φt of the magnetic flux passing through the tooth center portion 26G, the magnetic flux passing cross-sectional area St of the tooth center portion 26G, the magnetic flux density Bt of the tooth center portion 26G, the magnetic flux φpm generated by the permanent magnet, and the shape of the tooth will be described. Regarding the direction of the magnetic flux φt of the tooth center portion 26G, the direction of the magnetic flux from the back yoke to the tip of the tooth is positive and the opposite direction is negative. It is assumed that the saturation magnetic flux density of the soft magnetic material constituting the stator and the rotor is 2.0 [T]. When the winding current is 0, the permanent magnets 26A and 26C supply a negative magnetic flux ppm to the tooth center portion 26G.

First, it is assumed that the tooth width Lts of the tooth center portion 26G is equal to the tooth width Ltf of the tooth tip, and the permanent magnets 26A and 26C are not present. Hence, when the rotor magnetic pole is at the rotation angle position facing the C6/ phase stator magnetic pole 266 and the C6 phase current Ic6 is excited at its maximum value, the magnetic flux densities of the tooth center 26G and the tooth tip are 2.0 [T].

Next, it is assumed that the tooth width Lts of the tooth center 26G is equal to the tooth width Ltf of the tooth tip, the permanent magnets 26A and 26C are sufficiently large, and the magnetic flux density Bt of the tooth center 26G is −2.0 [T]. The magnetic flux φt passing through the tooth center portion 26G is −2.0×St. Since this magnetic flux φt is in the direction opposite to the direction of the magnetic flux that the C6/ phase stator magnetic pole 266 excites with the C6 phase current Ic6, the tooth center portion 26G is biased by the reverse magnetic flux. Now, when the rotor magnetic pole is at the rotation angle position facing the C6/ phase stator magnetic pole 266 and the C6 phase current Ic6 is a current value capable of sufficiently exciting the magnetic circuit, the magnetic flux passing through the tooth tip is 2.0×St [Wb]. At this time, the magnetic flux density of the opposing rotor magnetic poles is 2.0 [T], and the magnets are magnetically saturated. The magnetic flux passing through the tooth center portion 26G is (−2.0×St+2.0×St)=0. The magnetic flux density Bt of the tooth center portion 26G is 0 [T]. As a result, in this state, magnetic flux is supplied from the permanent magnets 26A and 26C to the rotor side, and the magnetic flux passing through the tooth center portion 26G becomes zero.

Next, in a case where the tooth width Lts of the tooth center 26G is as narrow as ½ of the tooth width Ltf of the tooth tip and it is assumed that the permanent magnets 26A and 26C are sufficiently large and the magnetic flux density Bt of the tooth center portion 26G is −2.0 [T]. The magnetic flux φt passing through the tooth center portion 26G is −2.0×(St/2)=−St. Now, when the rotor magnetic pole is at the rotation angle position facing the C6/ phase stator magnetic pole 266 and the C6 phase current Ic6 is a current value capable of sufficiently exciting the magnetic circuit, the magnetic flux passing through the tooth tip is 2.0×St. The magnetic flux passing through the tooth center portion 26G is (−St+2.0×St)=St [Wb]. The magnetic flux density Bt of the tooth center portion 26G is (St/(St/2))=2.0 [T]. Therefore, it is shown that even if the tooth width Lts of the tooth center portion 26G is reduced to ½ of the tooth tip, the rotor magnetic pole can be excited and torque can be generated for driving.

Figure 3:
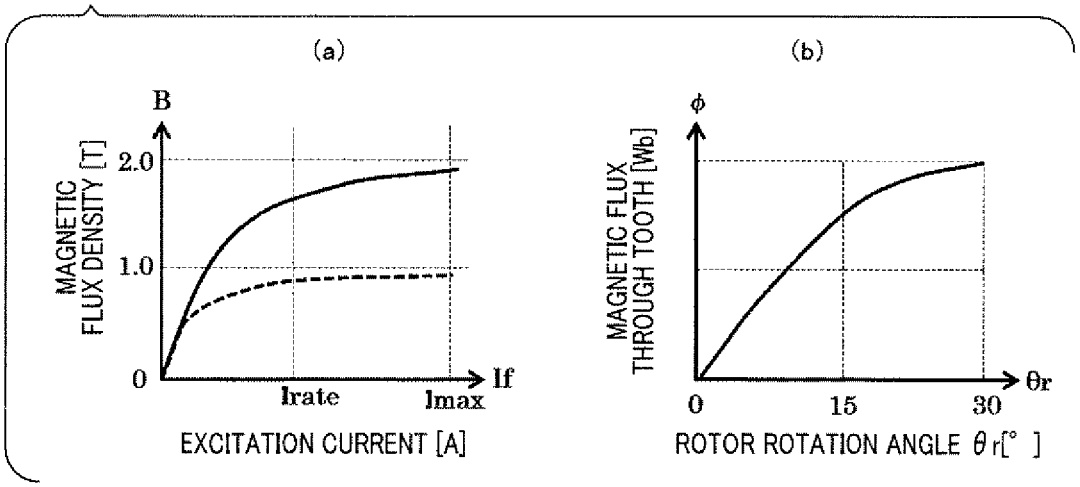
FIG. 3 shows a relationship between excitation currents and magnetic flux densities and a relationship between rotor rotation angles and magnetic fluxes passing through a tooth.

By the way, the magnetic characteristics of the soft magnetic material are as shown in FIG. 3(*a*), and have a relative permeability which is relatively large up to about 1.6 [T]. However, when the relative permeability approaches 2 [T], this permeability tends to decrease, and the iron loss tends to increase. Further, the characteristics of the permanent magnets 26A and 26C are not ideal, and the magnetic flux generated by the magnetomotive force of the C6 phase current Ic6 is reduced. Therefore, when the above setting conditions are changed and the tooth width Lts of the tooth center portion 26G is 80% of the tooth width Ltf of the tooth tip, it is assumed that the magnetic flux density Bt of the tooth center portion 26G by the permanent magnets 26A and 26C is −1.6 [T]. The magnetic flux φt passing through the tooth center portion 26G is $-1.6\times(0.8\times St)=-1.28St$ [T]. Now, when the rotor magnetic pole is at the rotation angle position facing the C6/ phase stator magnetic pole 266 and the C6 phase current Ic6 is a current value capable of sufficiently exciting the magnetic circuit, the magnetic flux passing through the tooth tip is $2.0\times St$. The magnetic flux passing through the tooth center portion 26G is $(-1.28\times St+2.0\times St)=0.72\times St$ [Wb]. The magnetic flux density Bt of the tooth center portion 26G is $(0.72\times St/(0.8\times St))=0.9$ [T]. Therefore, it is shown that even if the tooth width Lts of the tooth center portion 26G is reduced to 80% of the tooth tip, the rotor magnetic pole can be excited and torque can be generated for driving. However, as described above, the magnetic flux generated by the permanent magnets 26A and 26C is reduced by the action of the magnetomotive force of the C6 phase current Ic6, so that the magnetic flux density Bt becomes a value larger than 0.9 [T].

As described, when using the method of FIG. 26, the tooth width Lts of the tooth center portion 26G can be selected to have a width of 50% to 100% with respect to the circumferential width Ltf of the tooth tip of the stator magnetic pole. The magnetic characteristics and shape of the permanent magnets 26A and 26C can also be selected. As a result, it can be expected that the copper loss will be reduced by expanding the slot area, and the iron loss will be reduced by changing the magnetic operating points such as teeth and reducing the volume. If the tooth width Lts of the tooth center portion 26G is 90% or less with respect to the circumferential width Ltf of the tooth tip of the stator magnetic pole, reduction of copper loss due to the expansion of the slot area can be expected. Further, when a large torque is output by the reluctance motor, there is a problem that a leakage flux is generated between the reluctance motor and the adjacent teeth in the circumferential direction due to a large exciting current. The permanent magnets 26A, 26C and the like also have the effect of reducing these leakage fluxes. Various designs are possible depending on the required motor characteristics. Here, an example of typical characteristics is shown. Further, each winding in FIG. 26 can be changed to a full-pitch winding.

In the case of a synchronous motor or an induction motor, the magnetic resistance between the stator and the slot is reduced, and the discreteness of the magnetic resistance in the circumferential direction is reduced. Therefore, the slot opening width Lso in FIG. 26 is reduced. That is, the width Lts of the central portion 26G of the tooth is usually smaller than the width in the circumferential direction of the tooth tip. However, a so-called switched reluctance motor, such as the motor of the present invention, uses the difference in magnetoresistance between the tooth portion and the slot opening to attract a part of the rotor to generate torque. Therefore, the size of the circumferential width of the tooth tip Ltf and the slot opening width Lso are almost equal. As for the width shape of the tooth, the width Ltf in the circumferential direction of the tooth tip and the width Lts of the central portion 26G of the tooth are equal values. Further, considering the leakage flux flowing from the adjacent tooth in the circumferential direction, it is rather preferable that the width Lts of the central portion 26G of the tooth is larger than Ltf.

Fourteenth Embodiment

Next, an embodiment of claim 8 will be shown and described with reference to FIGS. 27 and 28. It is a configuration of a reluctance motor that uses two or more types of soft magnetic materials with different saturation magnetic flux densities. The non-linearity as shown in FIG. 3(b) is improved, and the problem of torque saturation as shown in FIG. 48 is reduced. The soft magnetic material of the motor is mainly an electromagnetic steel plate for the motor, and the saturation magnetic flux density is close to 2.0 [T]. However, due to various circumstances, ferrite core with extremely small iron loss of about 0.4 [T], martensitic stainless electromagnetic steel sheet of about 0.8 [T] that is easy to bend, amorphous thin sheet of about 1.2 [T] with small iron loss, various materials such as a special steel sheet of permendur, which is expensive but can be used up to a magnetic flux density of about 2.4 [T], can be used. For the soft magnetic material MM1 determined from the design conditions of a certain motor, the motor characteristics can be effectively improved by partially using another kind of soft magnetic material MM2 having a large saturation magnetic flux density to the extent that no harmful effect occurs.

Figure 27:
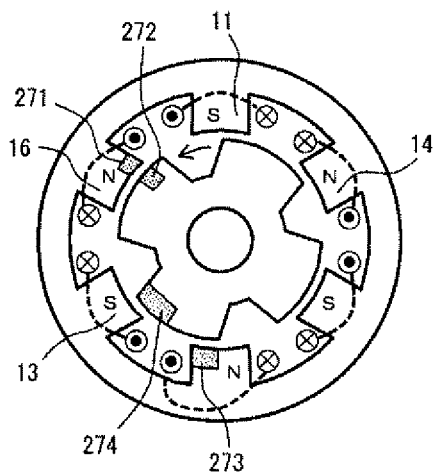
FIG. 27 is a sectional view exemplifying a configuration in which members having different types of materials are partially arranged in a motor configuration made of mainly soft magnetic materials.

FIG. 27 is a cross-sectional view of the motor having a configuration in which another member is added to a part of FIG. 1. The main soft magnetic material that constitutes most of the stator and rotor is MM1, and its saturation magnetic flux density is BM1. A reference sign 271 shows a stator magnetic pole portion made of a soft magnetic material MM2 having a saturation magnetic flux density BM2 larger than that of the saturation magnetic flux density BM1. A reference sign 272 shows a rotor magnetic pole portion made of the soft magnetic material MM2. In FIG. 27, the rotor magnetic pole portions 271 and 272 are shown only for one set of stator magnetic poles and rotor magnetic poles, but such portions 271 and 272 are similarly added to all stator magnetic poles and all rotor magnetic poles in the motor to which these are applied.

Figure 28:
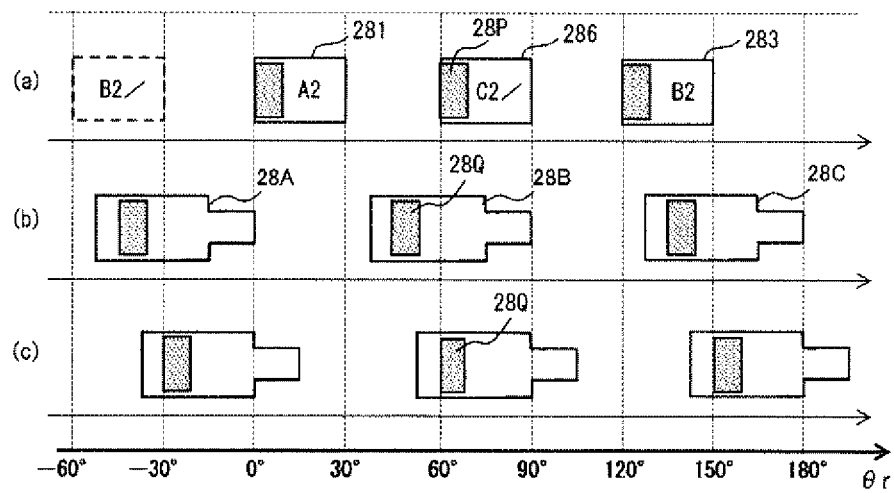
FIG. 28 is a horizontally developed view of the foregoing motor configuration.

FIG. 28 is a partial view of FIG. 6 in which the upper left portion of FIG. 6 is enlarged and the portions 271, 272, or 273, 274 of FIG. 27 is added. The reluctance motor of FIG. 27 will be described in comparison with the characteristics shown in FIGS. 6 and 7. FIG. 28(a) is a linearly developed view of the circumferential shape of the stator magnetic pole. A reference sign 11 of FIG. 27 shows an A2 phase stator magnetic pole and corresponds to the pole 281 of FIG. 28, a reference sign 16 shows a C2/ phase stator magnetic pole and corresponds to the pole 286 of FIG. 28, and a reference sign 13 shows a B2 phase stator magnetic pole and corresponds to the pole 283 of FIG. 28. FIG. 28(b) is a linearly developed view of the circumferential shape of the rotor magnetic pole, and the rotor rotation angle position θr is 0°. Reference signs 28A, 28B and 28C indicate the surface shapes of the rotor magnetic poles. FIG. 28(c) is a diagram of the rotor rotation angle position θr=15° rotated by 15° from the state shown in the part (b) in the CCW direction, and corresponds to the rotor rotation angle position of FIG. 27. A reference sign 271 of FIG. 27 shows a portion 28P of FIG. 28, and a reference sign 272 of FIG. 27 shows a portion 28Q of FIG. 28.

In FIG. 28, in the region where the rotor rotation angle position θr is from around 5° to 15°, torque is generated between the C2/ phase stator magnetic pole 286 and the rotor magnetic pole 28B. This rotation range is a rotation range in which θr corresponds to 20° to 30° in the characteristics of FIG. 48 and is a region in which torque is significantly reduced due to magnetic saturation. Here, since the portions 28P and 28Q in FIG. 28 are composed of the soft magnetic material MM2, the saturation magnetic flux density is larger than that in BM2 and other portions, and the torque decrease as shown in FIG. 48 can be reduced. However, the place where the magnetic saturation in question occurs is not necessarily the tooth tip of the stator magnetic pole or the tooth tip of the rotor magnetic pole. Therefore, if there is a portion that is magnetically saturated in the magnetic flux cycle path, it is necessary to take measures such as thickening the magnetic path of that portion. In the region where the rotor rotation angle position θr in FIG. 28 is from around 5° to 15°, torque starts to be generated between the A phase stator magnetic pole 281 and the rotor magnetic pole 28A, but in this rotation region, the magnetic flux is still small and the problem of magnetic saturation does not occur.

As above, the CCW rotation has been described. For example, since the main-machine motor of an electric vehicle mainly uses the one-way rotation in the forward direction, one-way rotation torque is especially important. The foregoing soft-magnetic-material portions 28P and 28Q in FIG. 28 are thus useful when it is required to prioritize generation of the CCW torque.

The stator magnetic pole portion 273 in FIG. 27 is a configuration example in which the stator magnetic pole portion 271 is enlarged in the circumferential direction. On the other hand, as for the rotor magnetic pole, the rotor magnetic pole portion 274 is a configuration example in which the rotor magnetic pole portion 272 is expanded in the circumferential direction and the soft magnetic material MM2 is formed up to the CW end of the rotor magnetic pole. By adding the slightly larger stator magnetic pole portion 273 and rotor magnetic pole portion 274 to the motor, it is possible to reduce the decrease in torque more effectively than in the case of 271 and 272. In this way, the size and arrangement location of the stator magnetic pole portion and the rotor magnetic pole portion can be selected.

Fifteenth Embodiment

Figure 29:
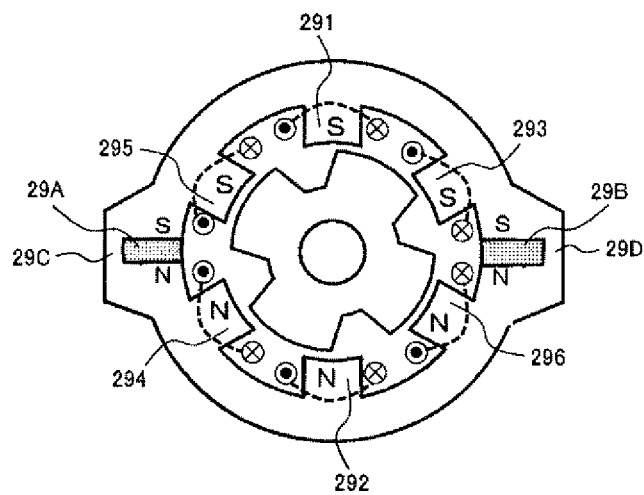
FIG. 29 is a lateral sectional view exemplifying a motor according to the present invention, in which permanent magnets are arranged in the back yoke.

Next, an embodiment of claim 9 is shown in FIG. 29 and described. This is a technique for improving motor efficiency by modifying the motor configurations shown in FIGS. 1, 8 and 9 and utilizing permanent magnets to reduce the excitation load. 291 in FIG. 29 is an A8 phase stator pole, 292 is an A8/ phase stator pole, 293 is a B8 phase stator pole, 294 is a B8/ phase stator pole, 295 is a C8 phase stator pole, and 296 is a B8/ phase stator pole. In FIG. 29, as compared with the configuration of FIG. 1 described above, the B8 phase and B8/ phase stator magnetic poles are arranged in the opposite direction, the C8 phase C8/ phase stator magnetic poles are arranged in the opposite direction, each stator magnetic pole of the S pole is gathered on the upper side of the paper surface of FIG. 29, and each stator magnetic pole of the N pole is gathered on the lower side of the paper surface. Then, the permanent magnets 29A and 29B are inserted into the back yoke portion in the middle of them. The polar directions of the permanent magnets 29A and 29B are the polar directions of the stator magnetic poles. With these configurations, the permanent magnets 29A and 29B have a configuration in which all the stator magnetic poles are equally excited, and even if the rotor rotates, the fluctuation of the magnetic flux passing through the permanent magnets is relatively small.

A soft magnetic bypass portion 29C is provided on the side surface of the permanent magnet 29A, and a soft magnetic bypass portion 29D is provided on the side surface of the permanent magnet 29B. In particular, when the motor is operated at a constant output at a high speed higher than the base rotation speed, the induced voltage exceeds the power supply voltage of the drive circuit due to the excessive magnetic flux of the permanent magnet, and there is a problem that the rotation speed is limited around the base rotation speed. For the purpose of relaxing this limitation of high-speed rotation, a part of the magnetic flux of the permanent magnet is short-circuited through the bypass portions 29C and 29D to reduce the magnetic flux acting as a motor.

Further, in the absence of the permanent magnets 29A and 29B, at high speed rotation higher than the base rotation speed, it is necessary to bear the current and voltage for exciting the magnetic flux. As the rotation speed increases, the frequency also increases, and the exciting voltage corresponding to the leakage inductance becomes the voltage burden of the inverter. In the motor configuration shown in FIG. 29, since the permanent magnets 29A and 29B bear a part of the excitation, the current burden and the voltage burden of the inverter can be reduced at high speed rotation.

On the other hand, when the rotation speed is equal to or less than the base rotation speed and the motor torque is large, the maximum magnetic flux is required. The exciting current of each phase stator magnetic pole is also large, and magnetic flux is supplied to each stator magnetic pole through both the permanent magnets 29A and 29B and the bypass portions 29C and 29D. Here, it is necessary to set the magnetic path passage cross-sectional area of the bypass portions 29C and 29D to an appropriate value from the amount of magnetic flux that can pass through the bypass portions 29C and 29D, it can be designed together with the magnetic flux required for each stator magnetic pole and the magnetic flux generated by the permanent magnet.

In the above description, it is assumed that the motor voltage is close to the DC power supply voltage when the maximum torque is output at the base rotation speed Nba. Therefore, at high speed rotation higher than the base rotation speed, it is necessary to limit the magnetic flux of the reluctance motor, which corresponds to the field weakening control in the synchronous motor. However, when the reluctance motor shown in FIG. 29 is used only at the base rotation speed or less, it is not necessary to weaken the field, so that the bypass portions 29C and 29D are unnecessary.

Sixteenth Embodiment

Figure 30:
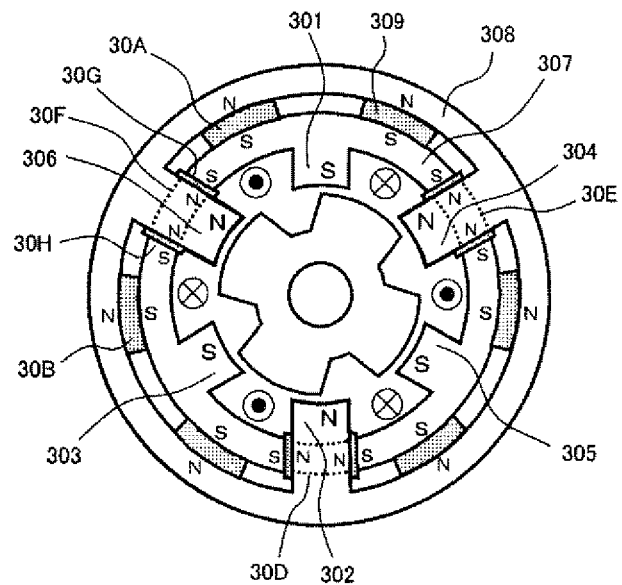
FIG. 30 is a lateral sectional view exemplifying a motor according to the present invention, in which the back yoke portion are separated for the N and S magnetic poles in the radial direction.

Next, an embodiment of claim 10 is shown in FIG. 30. A reference sign 301 shows an A9 phase and 302 is an A9/ phase stator pole, a reference sign 303 shows a B9 phase, and a reference signs 304 shows a B9/ phase stator pole, a reference sign 305 shows a C9 phase, and a reference sign 306 shows a C9/ phase stator pole. The arrangement order is the same as that of the stator magnetic poles and rotor magnetic poles shown in FIG. 20. Each winding of the stator also shows an example of a full-pitch winding in FIG. 20.

The back yoke of FIG. 30 is spatially and magnetically divided into an S-pole back yoke 307 and an N-pole back yoke 308 as shown. The S pole stator poles 301, 303, 305 are connected to the S pole back yoke 307, and the N pole stator poles 302, 304, 306 are connected to the N pole back yoke 308 through a portion such as a hole of the back yoke 307. Permanent magnets 309, 30A, 30B and the like for excitation are arranged between the back yoke 307 for the S pole and the back yoke 308 for the N pole. Each stator magnetic pole can be excited evenly.

The N-pole stator poles 302, 304, and 306 are connected to the N-pole back yoke 308 through a portion such as a hole, avoiding the S-pole back yoke 307. The portion is a portion Indicated by broken lines 30D, 30E, and 30F, and intersects with the back yoke 307 for the S pole, is easily approached, and has a complicated shape. Leakage flux is likely to occur in these parts, and magnets for reducing leakage flux such as 30G and 30H are arranged. At this intersection, the cross-sectional area through which the magnetic flux passes tends to be small, and various measures such as widening in the circumferential direction are possible.

One of these assembly methods can sequentially assemble many permanent magnets and soft magnetic cores as shown in FIG. 30. In addition, as another manufacturing method, a material in which resin and magnet powder are mixed is liquefied to a high temperature and injected into both stator cores and a mold covering them, as in the case of molding a plastic part with an injection molding machine. In that case, even thin and complicated shapes such as permanent magnets 30G and 30H can be manufactured relatively easily. In addition, magnetization of each magnet can be performed by applying a magnetomotive force to both back yokes after assembly to magnetize a complicated magnet-shaped portion or the like all at once. Further, since the amount of magnetic flux required differs between high-speed rotation and large torque, the configuration shown in the bypass portions 29C and 29D in FIG. 29 may be added. That is, an appropriate amount of soft magnetic material may be arranged between the back yoke 307 for the S pole and the back yoke 308 for the N pole and connected by a part of the magnetic paths.

Figure 31:
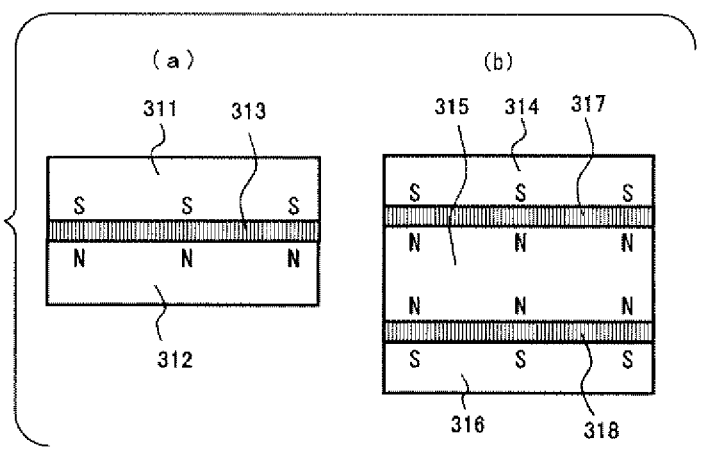
FIG. 31 is a lateral sectional view exemplifying a motor according to the present invention, in which the back yoke portion are separated for the N and S magnetic poles in the rotor axis direction.

In the case of the configurations of FIGS. 30 and 31, unlike the configuration of FIG. 29, the windings in the slots can be integrated into a full-pitch winding, or a toroidal winding as shown in FIG. 23 can be easily formed. Further, as shown in FIG. 26, permanent magnets can be arranged between the teeth of the stator to expand the slot cross-sectional area, reduce the leakage flux between the teeth, and reduce the iron loss of the teeth. High torque can be achieved by reducing the excitation load of the reluctance motor, reducing copper loss, and expanding the slot cross-sectional area.

Seventeenth Embodiment

Next, another embodiment of claim 10 is shown in FIGS. 31(a) and 31(b). FIG. 31 is a side view of the stator core, and the vertical direction on the paper is the rotor axial direction. In the configuration of FIG. 31(a), there are an S-pole back yoke 311 and an N-pole back yoke 312, and a permanent magnet 313 for excitation is sandwiched between them. As shown in FIG. 30, the stator magnetic poles and rotors of each phase are arranged inside (a) of FIG. 31. The S-pole back yoke 311 is magnetically connected to the S-pole stator pole, and the N-pole back yoke 312 is magnetically connected to the N-pole stator pole. In this way, the permanent magnet 313 can excite the S-pole stator pole and the N-pole stator pole.

In the configuration of FIG. 31(b), the back yokes for the S pole are arranged at 314 and 316 at both ends in the rotor axial direction. Reference numeral 315 is a back yoke for the N pole. Reference numerals 317 and 318 are permanent magnets arranged in the direction of the polarity of the back yoke. In this way, depending on the length of the motor in the rotor axial direction, a plurality of back yokes for S poles and back yokes for N poles can be arranged alternately. It is effective to arrange magnets for reducing leakage flux as shown in 30G and 30H in FIG. 31 at a portion where the N-pole stator magnetic pole and the S-pole stator magnetic pole are close to each other in FIG. 31. Further, in FIGS. 31(a) and 31(b), the case where the permanent magnets 313, 317, and 318 have an annular shape is shown, but the magnetic path cross-sectional area from each back yoke to each stator magnetic pole may be expanded by forming an uneven ring in the rotor axial direction according to the arrangement and polarity of each stator magnetic pole.

Eighteenth Embodiment

Figure 33:
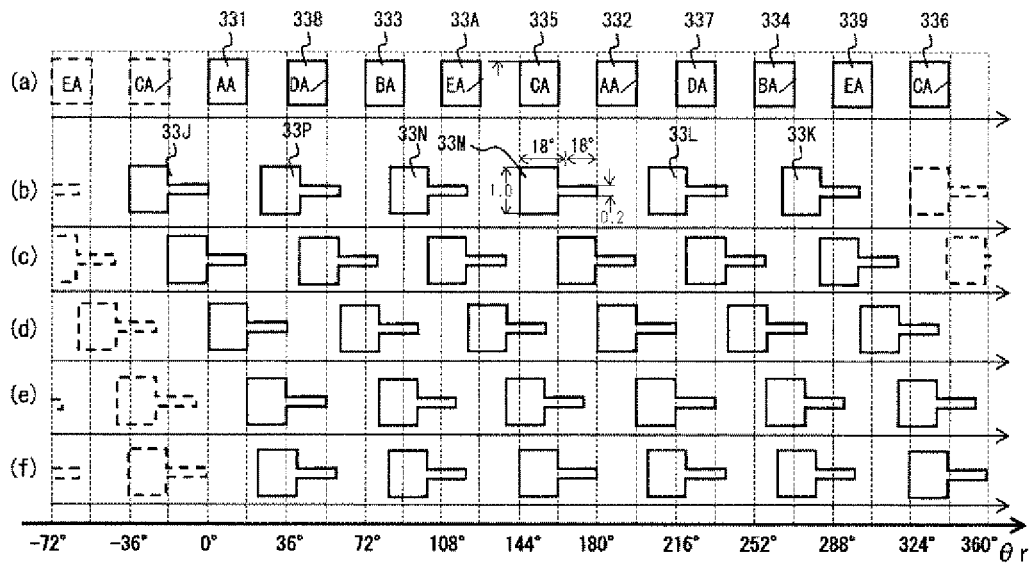
FIG. 33 is a horizontal developed view showing stator magnetic poles and rotor magnetic poles of the motor according to the present invention.
Figure 34:
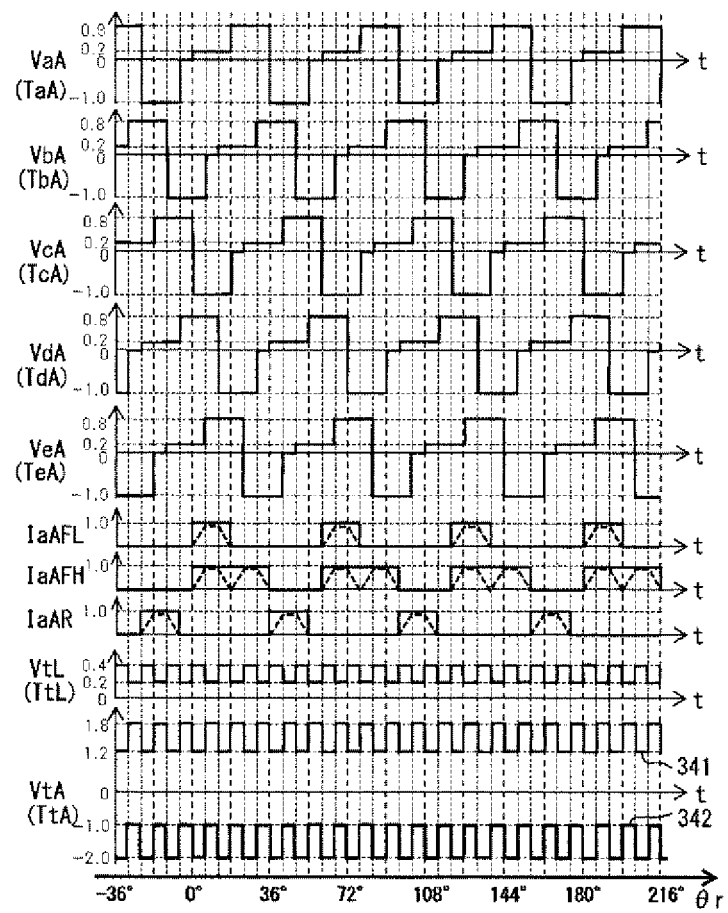
FIG. 34 is a graph exemplifying voltages, currents, and torque values of the motor according to the present invention.

Next, an embodiment of claim 11 will be shown and described with reference to FIGS. 33 and 34. FIGS. 33 and 34 show a motor configuration in which torque ripple is small, noise is low, and torque can be easily increased at high speed rotation. The base rotation speed Nba is defined as the motor rotation speed at which the motor voltage becomes close to the DC power supply voltage when the maximum torque is output at the base rotation speed. This is a technology that involves the number of revolutions and the power supply voltage.

This is to improve the fourth problem of the conventional reluctance motor described above, "difficulty in stable and uniform torque output at high speed rotation". This problem of the conventional reluctance motors shown in FIGS. 46 and 47 is due to that since the width of the rotor magnetic pole in the rotor axial direction is uniform, when an exciting current is applied to the stator magnetic pole at a high speed rotation of the base rotation speed Nba or more, an excessive voltage close to the power supply voltage is generated, the current cannot be increased, and it becomes difficult to increase the torque. The winding voltage of each phase is given by Eq. (5). Here, when a large torque is generated, the current value is also large, and Bo refers to the saturation magnetic flux density of the soft magnetic material as shown in FIG. 3(a). In the formula (5), the rotor axial length of the stator and the rotor is Ls, and the (rotor axial length)/(axial length Ls of the stator) of each part of the rotor magnetic pole is the axial length ratio Kra, and the winding voltage is proportional to Kra. Therefore, according to the formula (5), in order to make the winding voltage smaller than the power supply voltage at high speed rotation, the axial length ratio Kra must be reduced.

When driving the conventional reluctance motors shown in FIGS. 46 and 47 at high speed, limiting the current to weaken the field to reduce the winding voltage to below the power supply voltage and energizing a large current at high speed rotation to output a constant power are inconsistent with respect to the current. In the conventional reluctance motor, it is possible to inject electric power at the timing in the rotation angle range where the voltage of each phase winding is lower in generating pulsating torque. This technique can also be used in combination with the configuration of FIG. 33.

Figure 32:
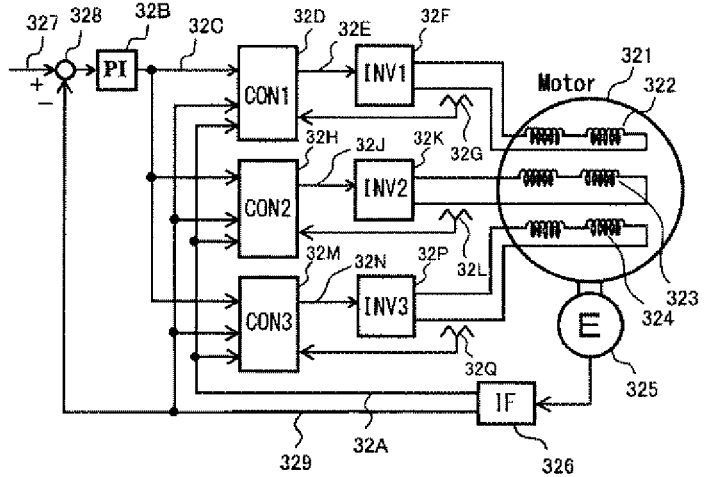
FIG. 32 is a block diagram for controlling a reluctance motor according to the present invention.

First, FIG. 32 describes an example of a control device for the reluctance motor of the present invention. A reference sign 321 shows an example of the reluctance motor shown in FIG. 1 and the like, and a reference sign 322 shows A phase and A/ windings which energize the A-phase current Ia in the A phase winding and the A/ phase winding. A reference sign 323 shows B phase and B/ phase windings which energize the B-phase current Ib in the B-phase winding and the B/ phase winding, and a reference sign 324 C phase and C/ phase windings which energize the C phase current Ic in the C phase winding and the C/ phase winding. A reference sign 325 is an encoder for detecting the position of the rotor, and a reface sign 325 is an interface thereof for outputting a rotation speed signal 329 and 32A which is a rotor rotation angle position θr. A reference sign 32G shows a current detector that detects the A phase current Ia. A reference sign 32L shows a current detector that detects the B phase current Ib. A reference sign 32Q shows a current detector that detects the C phase current Ic.

A reference sign 327 shows a rotation speed command, a reference sign 328 shows an adder for calculating the rotation speed error, and the calculation result is output to the compensator 32B. The compensator 32B performs proportional and integral control, for example, and outputs a torque command or a current command 32C, which is the output thereof, to the A phase control unit 32D, the B phase control unit 32H, and the C phase control unit 32M. The A-phase control unit 32D inputs the current command 32C, the rotation speed signal 329, and the rotor rotation angle position θr, inputs the A-phase current detection value, calculates using the stored information such as the control mode, the drive signal 32E is output to the A-phase drive circuit 32F. The B-phase control unit 32H has the same function and operation, inputs a B-phase current detection value, and outputs a drive signal 32 to the B-phase drive circuit 32K. The B-phase control unit 32H has the same function and operation, inputs a C-phase current detection value, and outputs a drive signal 32N to the C-phase drive circuit 32P. The A-phase drive circuit 32F amplifies the power and supplies the A phase current Ia to the A phase winding and the A/ phase winding of 322. The B-phase drive circuit 32K amplifies the power and supplies the B-phase current Ib to the B-phase winding and the B/ phase winding of 323. The C phase drive circuit 32P amplifies the power and supplies the C-phase current Ic to the C-phase winding and the C/ phase winding of the 324. It should be noted that these control functions are often executed by software using a microprocessor.

FIG. 33 shows an example of a reluctance motor for high-speed rotation that can be driven to a high-speed rotation speed four times the base rotation speed and can output a torque of ¼ of the maximum torque of the base rotation speed at the maximum rotation speed. The cross-sectional view is (a) of FIG. 9. It is a reluctance motor with 10 stator magnetic poles and 6 rotor magnetic poles. Note that FIG. 33 is a modified configuration of the rotor magnetic pole shape shown in FIG. 12.

In FIG. 33(a), the shape of the inner peripheral surface of the stator magnetic pole SP seen from the air gap surface between the stator and the rotor is linearly developed so that the circumferential CCW direction is the horizontal axis direction of FIG. 33. The vertical axis direction in FIG. 33 is the rotor axis direction. In FIG. 33, a reference sign 331 shows the AA phase, a reference sign 332 shows the AA/ phase stator pole, a reference sign 333 shows the BA phase, a reference sign 334 shows the BA/ phase stator pole, a reference sign 335 shows the CA phase, a reference sign 336 shows the CA/ phase stator pole, and a reference sign 337 shows the DA phase, a reference sign 338 shows the DA/ phase stator magnetic pole, a referent sign 339 shows the EA phase, and a referent sign 33A shows the EA/ phase stator magnetic pole. The shape of the air gap surface of the stator magnetic poles of each phase has a circumferential angular width θBs of 18° and a rotor axial length of Ls. The gap between the stator magnetic poles is also 18°.

FIG. 33(b) shows the shape of the outer peripheral surface of the rotor magnetic pole RP as seen from the air gap surface, and the circumferential direction of the CCW in FIG. 9(a) is the horizontal axis direction of FIG. 33, that is, it is a figure developed in a straight line so as to be in the right direction of the paper surface of FIG. 33. In FIG. 33, the right end of the rotor magnetic pole 33J Is also the tip of the CCW of 12J in FIG. 9(a). The rotation angle position θr of the rotor of FIG. 33 (b) is 0°.

Next, the shape of the rotor magnetic pole will be described. The circumferential angular width θBr of each rotor magnetic pole in FIG. 33 is 36°. The rotor axial width of each rotor magnetic pole has a different shape between the front 18° width portion and the rear 18° width portion in the CCW direction. The 18° width portion of the front portion has a rotor axial length of Ls/5. The 18° portion of the rear portion has a rotor axial length of Ls, which is the same length as the rotor axial length of each stator magnetic pole SP. As will be described in detail later, the length of the front portion in the rotor axial direction is reduced to Ls/5, and the time change rate of the magnetic flux interlinking with the stator winding during high-speed rotation is reduced, and the shape is such that the induced voltage generated in the stator winding does not become an excessive value. Further, since the period of the rotor magnetic poles is 60°, the gap between the rotor magnetic poles is 24°.

In FIG. 33(c), the rotor position θr=0° in FIG. 33(b) is rotated by 18° from the rotor position θr=0°, and θr is 18°. FIG. 33(d) shows a further rotated state by 18° in the CCW direction, where the rotation position θr is 36°. The rotor position θr of the part (e) is 54°. The rotor position Θr in FIG. 33(f) is 60°, and the relationship between the stator and the rotor is the same as in FIG. 33(b). By rotating the rotor in this way and changing the rotor rotation angle position θr, the magnetic relative relationship between each stator pole SP and each rotor pole RP changes, so rotational torque of the rotor can be obtained by exciting each stator magnetic pole SP at an appropriate timing.

Next, the relationship between the voltage acting when a current is applied to each winding of the stator magnetic pole, the motor output power, and the torque will be described. However, it is a characteristic when the electromagnetic relationship is simply modeled. Now, consider that the state in which the AA phase winding 91 and the AA/ phase winding 92 of FIG. 9(a) are connected in series, and a constant current Io [A] having a value close to the continuous rating as the AA phase current IaA is energized, then the rotor is rotated to CCW at a constant speed Vso [radian/sec]. The CCW direction of FIG. 9(a) is the right direction of the paper surface of FIG. 33. The winding voltage of the AA phase at this time is the voltage VaA in FIG. 34. The horizontal axis of VaA in FIG. 34 is time t, and the value of the rotor rotation angle position θr at that time is shown in the lowermost stage of FIG. 34.

First, the magnetic flux interlinking with the AA phase winding when the rotor rotation angle position θr approaches from 0° to 18° and the AA phase winding voltage VaA will be described. The rotor magnetic pole 33J in FIG. 33 starts to face the AA phase stator magnetic pole 331 from 0° of θr via an air gap. It is the state from (b) to (c) of FIG. 33. The rotor axial length of the front portion of the rotor magnetic pole 33J is ⅕ of the axial length Ls of the stator magnetic pole, and the rotational change rate of the magnetic field passing through the rotor magnetic pole and the stator magnetic pole is ⅕ of the maximum value. Here, the voltage in FIG. 34 is normalized, and the AA phase winding voltage VaA between 0° and 18° is shown as 0.2.

Next, when θr is between 18° and 36°, it is the state from the parts (c) to (d) in FIG. 33. The rear portion of the rotor magnetic pole 33J faces the AA phase stator magnetic pole 331. On the other hand, the front portion of the rotor magnetic pole 33J goes off. The magnetic flux that passes is the deduction of them, and the winding voltage VaA during this period is (1.0-0.2)=0.8.

Next, when θr is between 36° and 54°, it is the state from the parts (d) to (e) in FIG. 33. The rear portion of the rotor magnetic pole 33J deviates from the state of facing the AA phase stator magnetic pole 331, and all disengage at θr=54° in the part (e). During this time, the magnetic flux passing through decreases with rotation. The rotational change rate of the magnetic flux passing through the rotor magnetic pole and the stator magnetic pole has a maximum negative value. As a result, the winding voltage VaA of the AA phase in which θr in FIG. 34 is between 36° and 54° becomes −1.0.

Next, when θr is between 54° and 60°, it is the state from the parts (e) to (f) in FIG. 33. During this period, the stator magnetic pole 331 does not face the rotor magnetic pole 33J, so the magnetic flux passing through is zero. During this period, the winding voltage VaA of the AA phase becomes 0. Since the distance between the rotor magnetic poles is 60°, the part (e) is in the same state as the original part (b) where the explanation was first started. As described above, θr rotates by repeating the operation of 0° to 60°.

Similarly, the BA phase voltage VbA is the voltage of the winding in which the windings 93 and 94 of FIG. 9(*a*) are wound in series, and the voltage VbA shown in FIG. 34 is a voltage whose phase is delayed by 12° with respect to the AA phase voltage VaA. Similarly, the CA phase voltage VcA is the voltage of the winding in which the windings 95 and 96 are wound in series, which is the voltage VcA of FIG. 34, which is a voltage whose phase is delayed by 24° with respect to VaA. Similarly, the DA phase voltage VdA is the voltage of the winding in which the windings 97 and 98 are wound in series, which is the voltage VdA in FIG. 34, which is a voltage whose phase is delayed by 36° with respect to Va4. Similarly, the E4 phase voltage Ve4 is the voltage of the winding in which the windings 99 and 9A are wound in series, which is the voltage Ve4 in FIG. 34, which is a voltage whose phase is 48° behind Va4.

The voltage of each of these phases has a relationship of formulas (1) to (12). The same formula applies to the D phase and the E phase. However, it Is a mathematical formula that holds under the above-mentioned various simplified conditions. Moreover, each voltage, each current, and each torque normalize their values.

The AA phase voltage VaA, BA phase voltage VbA, CA phase voltage VcA, DA phase voltage VdA, and EA phase voltage VeA described with reference to FIG. 34 have the relationship of the formula (5). Then, in the formula (8), as the A phase torque is proportional to the A-phase voltage, The AA phase torque TaA, BA phase torque TbA, CA phase torque TcA, DA phase torque TdA, and EA phase torque TeA related to the reluctance motor of FIG. 9 (*a*) have constant values (Io/Vso), so that each phase voltage is proportional to VaA, VbA, VcA, VdA, VeA. In that sense, each phase torque TaA, TbA, TcA, TdA, and TeA are added in parentheses under each phase voltage VaA, VbA, VcA, VdA, and VeA in FIG. 34.

Next, a method of generating continuous torque in the positive direction of CCW or a method of generating torque in the CW direction during rotation to CCW will be described with the reluctance motors shown in FIGS. 9(*a*), 33, and 34. The specific method is generating continuous torque in the positive direction of CCW by the reluctance 3*o* motor shown in FIG. 9(*a*), FIG. 12 and FIG. 13 described above, or the same method of generating torque in the CW direction during rotation to CCW. In the section where TaA, which is the AA phase torque of FIG. 34, generates a positive torque, θr is 0° to 36°, 60° to 96°, and the like, and the current shown by the solid line of IaAFH in FIG. 34 is energized. TbA, which is the BA phase torque, energizes a current whose phase is 12° behind IaAFH. TcA, which is the CA phase torque, energizes a current whose phase is delayed by 24° from IaAFH. TdA, which is the DA phase torque, energizes a current whose phase is 36° behind IaAFH. TeA, which is the EA phase torque, energizes a current whose phase is 48° behind IaAFH. The total torque of these is 341 of TtA in FIG. 34. It is a torque that repeats 1.2 and 1.8 in a cycle of 12°, and its average value is 1.5. Here, when the current shown by the broken line of IaAFH in FIG. 34 is applied, the torque pulsation disappears, and the torque becomes a constant value of 1.0. When the required torque of the motor is ⅔ or less of the maximum value, the energization method shown by the broken line is preferable in terms of noise and vibration.

However, in high-speed rotation, the induced voltage of the winding needs to be lower than the power supply voltage, and there is a limitation of the energizing current. For example, at a rotation speed of the motor base rotation speed Nba or less, a current as shown in IaAFH in FIG. 34 can be applied, but when the torque increases to some extent at a rotation speed of Nba or more, the induced voltage of the winding exceeds the power supply voltage. Now, it is assumed that the maximum value of the winding induced voltage VaA of the AA phase at the base rotation speed Nba is 0.8 as shown in FIG. 34, and the power supply voltage Vdc is 1.0. Then, it is assumed that the maximum rotation speed Nmax is four times higher than Nba.

The simplest method of variably controlling the torque at high speed rotation is to create a rotation region in which the winding induced voltage does not exceed the power supply voltage Vdc, and control the current in the rotation region. When the current of IaAFL is applied to the AA phase winding at the maximum rotation speed Nmax, the winding induced voltage VaA of the AA phase at the base rotation speed Nba is 0.2, so the VaA at the maximum rotation speed Nmax is (0.2×(Nmax/Nba))=0.8, which is 0.2 smaller than the power supply voltage Vdc. The same is true for the other phases. Therefore, if the winding impedance is ignored and simplified, there is a margin of 0.2 in the power supply voltage at the maximum rotation speed Nmax.

When a current as shown by the solid line of IaAFL in FIG. 34 is applied to each phase, the total torque becomes TtL. When the current shown by the broken line of IaAFL is applied, the torque becomes a constant value of 0.2, and the torque pulsation can be eliminated. Since the broken line current waveform of IaAFL has a trapezoidal shape, it is easy to increase or decrease the current, which is convenient. In the section where the AA phase current IaAFL is energized, as described above, the winding induced voltage VaA of the AA phase is 0.8 even at the maximum rotation speed Nmax, so the power supply voltage Vdc has a margin of 0.2, and the AA phase current IaAFL can be increased. The motor output power at this time is 0.8 because the torque is 0.2 but the rotation speed is four times the base rotation speed Nba. Furthermore, the power can be increased by increasing the current of each phase. In this way, a large amount of power can be output in the vicinity of the maximum rotation speed Nmax.

It is also possible to output a torque larger than the torque indicated by the TTL at the rotation speed between the base rotation speed Nba and the maximum rotation speed Nmax without increasing the current value. It is a method of energizing a current such as between IaAFL and IaAFH. In the section where the winding voltage exceeds the power supply voltage Vdc, the energizing current is regenerated to the power supply, but since a part of the magnetic energy at that time becomes torque, it can be used as torque output. However, in this case, torque pulsation is unavoidable.

Next, a method of generating torque in the CW direction in a state of rotating at a speed Vso in the CCW direction with the reluctance motors of FIGS. 9(*a*), 33, and 34 will be described with reference to FIG. 13. It is also an operation that brakes the motor and regenerates it. In the section where TaA, which is the AA phase torque in FIG. 34, generates a negative torque, θr is 36° to 54°, 96° to 114°, and the like, and the AA phase current IaA shown by the solid line of IaAR in FIG. 34 is energized. Similarly, the BA phase current IbA energizes a current whose solid phase of IaAR is delayed by 12°. Similarly, the CA phase current IcA energizes a current whose solid phase of IaAR is delayed by 24°. Similarly, the DA phase current IdA carries a current whose solid phase of IaAR is delayed by 36°. Similarly, the EA phase current IeA energizes a current whose solid phase of IaAR Is delayed by 48°. The total torque of each phase is 342 of TtA in FIG. 34. It is a torque that repeats −1.0 and −2.0 in a cycle of 12°, and its average value is −1.5. Here, when the current shown by the broken line of IaAR in FIG. 34 is applied, the torque pulsation disappears, and the torque becomes a constant value of −1.0. The energization method shown by the broken line is preferable in terms of noise and vibration.

As described above, an example in which the maximum rotation speed Nmax is four times the base rotation speed Nba is shown in FIGS. 33 and 34. When the maximum rotation speed Nmax is larger than the base rotation speed Nba, low torque ripple can be achieved, and low noise and low vibration can be realized by devising the shape of the rotor magnetic pole and the control method. Then, the torque can be freely controlled at high speed rotation. Further, the ratio of the base rotation speed Nba to the maximum rotation speed Nmax has the following relationship with the rotor axial length ratio Kra, which is the width of the front portion of the rotor magnetic pole in FIG. 33.

$$Kra=Nba/(Nba+Nmax) \quad (25)$$

For example, when this rotation speed ratio is 2, Kra=⅓, and the width of the front portion of the rotor magnetic pole in the rotor axial direction is Ls/3. The width of the rear part in the rotor axis direction is Ls. As a method for putting the front portion of the rotor magnetic pole into practical use, the magnetic characteristics can be realized by various methods as shown in FIG. 17, and these are also included in the present invention. Further, the shape of the rotor magnetic pole shown in FIG. 33 can be deformed and improved according to the required characteristics and applications.

Nineteenth Embodiment

Next, an embodiment of claim 12 will be shown and described with reference to FIG. 35. The present invention is intended for motors for applications such as motors for main engines for electric vehicles, which mainly rotate in one direction, with the CCW rotation assigned to the forward rotation direction, the motor shape and configuration that prioritize performance in the forward rotation direction will reduce noise and vibration, improve torque characteristics, and so on. However, if the shape of the rotor magnetic pole is devised to improve the torque generation range in the forward rotation direction, on the other hand, new problems such as torque pulsation in the CW direction are likely to occur. Claim 12 is a reluctance motor that improves this torque pulsation in the reverse rotation direction.

Figure 35:
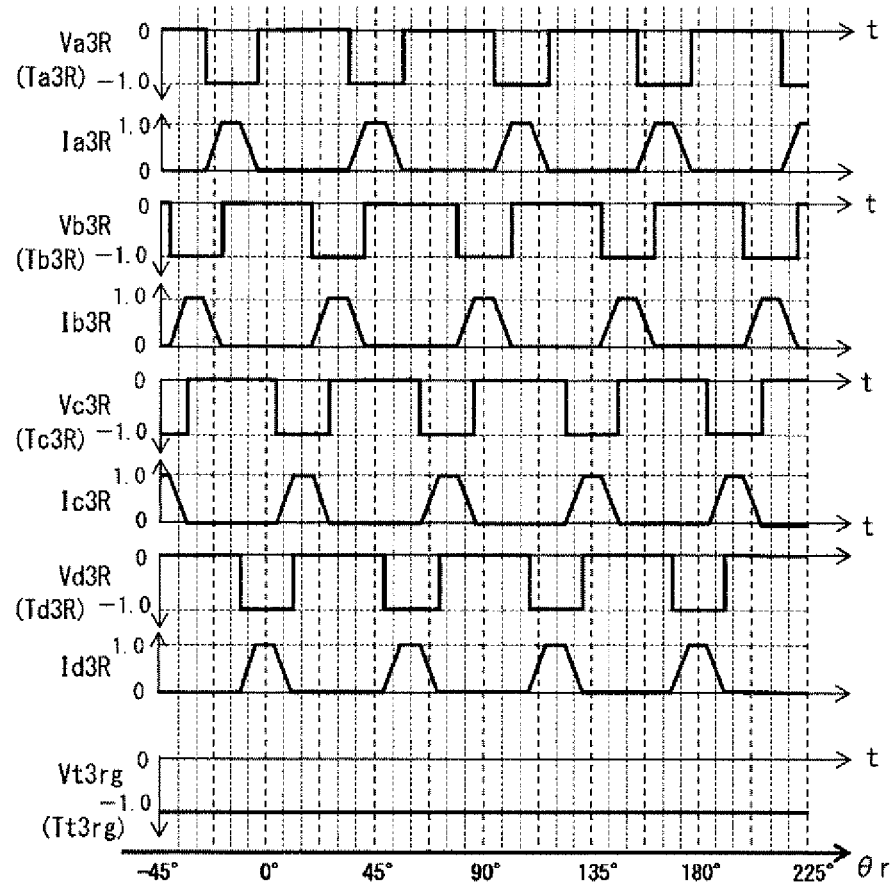
FIG. 35 is a graph exemplifying voltages, currents, and torque values which reduce pulsations in the torque in power regeneration.

FIG. 35 is a diagram showing the voltage, current, and torque of each phase when the reluctance motor of FIG. 8(a), FIG. 10 and FIG. 11 shown above is rotated to CCW to generate torque of CW. A reference sign Va3R of FIG. 35 shows a diagram in which only the negative voltage portion of Va3 of FIG. 11 is taken out. A reference sign Vb3R of FIG. 35 shows a diagram in which only the negative voltage portion of Vb3 of FIG. 11 is taken out. FIG. 35 shows a diagram in which only the negative voltage portion of Vc3 in FIG. 11 is taken out. At the time of these voltage characteristics, when the current shown by the solid line of Ia3R in FIG. 11 is applied as the current of the A3 phase and the currents of the other phases are also applied with the same currents of the respective phases, the motor torque is 112 in Tt3 of FIG. 11, and −1.0 and −2.0 are pulsating torques that repeat every 15° cycle. Therefore, problems of torque ripple, noise, and vibration occur.

The voltage of each phase is expressed by the formula (5), and the torque is expressed by the formula (8). One method of reducing the pulsation of the torque of 112 is to change the current value of each phase according to the formula (8). Since the absolute torque value is large in the portion of each phase voltage of FIG. 35 where the voltages of the two phases overlap, the current of the two phases may be halved in the section where the voltages overlap. Since Va3R and Vb3R overlap while θr is between 33.75° and 41.25° in FIG. 35, during this period, the torque can be halved by linearly increasing the A3 phase current Ia3R and linearly decreasing Ib3R. Similarly, when drawing the other parts in the same manner for the other phases, the A3 phase current Ia3R, the B3 phase current Ib3R, the C3 phase current Ic3R, and the D3 phase current Id3R are obtained in FIG. 35. The torque of the entire motor at this time is −1.0 of Tt3rg in FIG. 35, and the torque pulsation can be reduced.

In this way, for the part where the torque generation of each phase overlaps, the exciting current of the stator magnetic pole that is preceded by the regenerative torque in time is gradually reduced, and at the same time, it is possible to gradually increase the exciting current of the stator magnetic pole that follows in time so that the pulsation of the regenerative torque of the entire motor becomes small. Further, since the waveform of each phase current in FIG. 35 is trapezoidal, it is easy to increase or decrease each phase current, and it is possible to reduce vibration and noise due to a sudden change in the attractive force between the stator magnetic pole and the rotor magnetic pole. Further, the trapezoidalization of each phase current waveform in FIG. 35 is an example in which the broken line of the regenerative current IaAR in FIG. 34 described above also reduces the pulsation of the regenerative torque. The same applies to the dashed line of IaAFL and the trapezoidal current of the broken line of IaAFH, which are the power running currents in FIG. 34, and the torque pulsation can be reduced. It should be noted that the above description is a story under various simplified conditions and is a mathematical formula. In addition, each voltage, each current, and each torque are shown in a normalized manner. In particular, the assumption that the torque of each phase in FIG. 35 is proportional to the current of each phase shown is not accurate because it ignores the exciting current component. However, it can be easily corrected by adding an exciting current component to each phase current.

Twentieth Embodiment

Next, claim 13 will be described. Although the rotor magnetic pole shape and its characteristics have been described in many of the above figures and their explanations, the electromagnetic action between the stator magnetic pole and the rotor magnetic pole is relative, and the stator magnetic pole ban be deformed into various shapes. They are equivalent to those described as the shape of the rotor magnetic poles in the present invention and are included in the present invention. For example, specifically, in order to facilitate the winding of the winding of the stator magnetic pole, a part of the four corners of the stator magnetic pole is deleted and deformed, and the deformed portion is compensated by the rotor shape. Further, the permanent magnet can be arranged and fixed in the vicinity of the tip of the tooth of the stator constituting the stator magnetic pole, and at the same time, the shape of the tooth tip can be deformed. Further, the deformed portion can be made into a shape that is supplemented by the rotor shape. In such a case, the rotor magnetic pole shape shown in the present invention may be realized on the stator magnetic pole side, the surface shape of the rotor magnetic pole may be rectangular, and the rotor magnetic pole shape and the stator magnetic pole shape may be reversed.

Twenty-First Embodiment

Next, an embodiment of claim 14 will be shown and described with reference to FIGS. 37, 40, and 42. First, the configuration of the full-pitch winding of FIG. 20 will be described, and the phase currents Iab, Ibc, and Ica are shown by the formulas (13), (14), and (15), and the relationship with the currents Ia7, Ib7, and Ic7 of the concentrated winding around each stator magnetic pole is shown. Then, it was shown that the copper loss of the full-pitch winding in FIG. 20 can be made smaller than the copper loss of the concentrated winding. However, the voltages Vw1 and Vw2 of the full-pitch winding windings W1 and W2 for exciting one set and two stators shown in FIG. 21 are shown by the formulas (16) and (17), and as a result of the voltage shown in formula (18) acting differentially on formulas (16) and (17), it is shown as an example of a generalized motor model that the voltages Vw1 and Vw2 become excessive voltages due to voltage bias.

Figure 36:
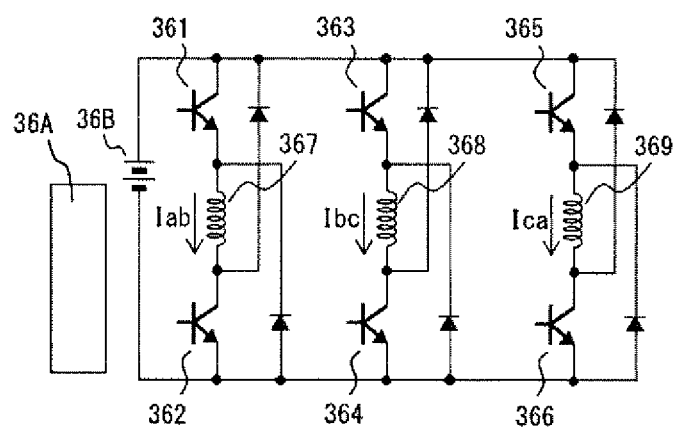
FIG. 36 is a circuit diagram exemplifying a drive circuit for a conventional reluctance motor.

As a specific example of increasing the size of the drive circuit, an example of exciting the reluctance motor of FIG. 20 using the three-phase reluctance motor drive circuit of FIG. 36 will be shown. First, in the drive circuit of FIG. 36, there is a control circuit 36A for all of the drive circuits. A reference sign 36B shows the DC voltage source, reference signs 361, 362, 363, 364, 365, 366 show the drive transistors, and a reference sign 367 shows the AB phase full-pitch winding windings 207 and 208 in FIG. 20, which energize the AB phase current Iab. Also, a reference sign 368 show the BC phase full-pitch windings 209 and 20A in FIG. 20, which energize the BC phase current Ibc, and a reference sign 369 shows the CA phase full-pitch winding windings of 20B and 20C in FIG. 20, which energizes the CA phase current Ica. The remaining 6 diodes are power regeneration diodes.

Now, when energizing ab and Ica to excite the A7 phase stator pole 201 and the A7/ phase stator pole 202, excessive voltages represented by the formulas (16) and (17) are generated in the AB phase full-pitch winding winding 367 and the CA phase full-pitch winding winding 369 in FIG. 36. In order to keep the winding voltage below the voltage of the DC voltage source 36B, for example, if the number of windings is halved, the winding voltage is halved but the winding current is doubled. Therefore, it is necessary to double the current capacity of the transistors 361, 362, 363, 364, 365, 366 of FIG. 36, which causes problems of large size and high cost.

Next, the drive circuit of FIG. 37 and its operation for reducing the problems of the formulas (16), (17), and (18), that is, the problem of increasing the cost and the size of the drive circuit will be described. The reluctance motor to be driven is the reluctance motor of FIG. 22, which is a multi-pole pair of FIG. 20.

First, in order to clarify the voltage and current of the two-pole pair reluctance motor of FIG. 22, the voltage and current of FIG. 20 which is a one-pole pair of reluctance motor will be described. The currents Iab, Ibc, and Ica of the full-pitch winding in FIG. 20 are indicated by the currents Ia, Ib, and Ic of the concentrated winding wound around each stator magnetic pole according to the formulas (13), (14), and (15).

Further, in FIG. 20, as shown in the figure, the A7 phase magnetic flux is φa, the B7 phase magnetic flux is φb, and the C7 phase magnetic flux is φc because of its symmetry. The voltages Vb and Vc in the case of the concentrated winding around each stator magnetic pole in FIG. 1 are expressed by the following formulas based on the relationship between the interlinkage magnetic fluxes φa, φb and φc, as in the formula (4) and Va.

$$Va = Nwa \times d\varphi a/dt$$

$$Vb = Nwa \times d\varphi b/dt \tag{26}$$

$$Vc = Nwa \times d\varphi c/dt \tag{27}$$

As the same as those in FIG. 21 and (16) and (17), the voltage Vab of the AB phase winding 20D, the voltage Vbc of the BC phase winding 20E, and the voltage Vca of the CA phase winding 20F are represented by the following formulas in relation to the interlinkage magnetic flux of each winding in FIG. 20.

$$Vab = Nwx \times d(\varphi a + \varphi b - \varphi c)/dt \tag{28}$$

$$= Va + Vb - Vc \tag{29}$$

$$Vbc = Nwx \times d(-\varphi a + \varphi b + \varphi c)/dt \tag{30}$$

$$= -Va + Vb + Vc \tag{31}$$

$$Vca = Nwx \times d(\varphi a - \varphi b + \varphi c)/dt \tag{32}$$

$$= Va - Vb + Vc \tag{33}$$

Here, formulas (29), (31), and (33) are not only complicated but also have a large peak voltage because a differential voltage is applied by the voltage component of formula (18). Therefore, in the drive circuit of FIG. 37, which will be described later, two windings are connected in series to cancel the component of the differential voltage of the formula (18), simplify the energization. That is, the two voltages of the formulas (29), (31), and (33) are connected in series, the components of the differential voltage of the formula (18) are canceled, and the voltage is simplified and energized as in the following formula.

$$Vab + Vca = 2 \times Va \tag{34}$$

$$Vca + Vbc = 2 \times Vc \tag{35}$$

$$Vbc + Vab = 2 \times Vb \tag{36}$$

As a result, an excessive voltage is not generated at both ends of the two windings connected in series, that is, the problem of voltage bias is eliminated, and the voltage burden on the drive circuit can be eliminated. Since it is not necessary to reduce the number of windings of the winding, the current of the winding does not increase and it is not necessary to increase the current capacity of the transistor.

In addition, the whole section winding shown in FIGS. 20, 21, and 22, and the method of using the toroidal winding in which the winding of each slot shown in FIGS. 23, 24, and 25 is wound to the rear side of the back yoke has its own features, but there are problems of complicated and excessive voltage. To solve these problems, in the method of connecting the drive circuit of FIG. 37 and each winding shown later, energization of the combined currents of formulas (13), (14), and (15) to each winding, and the complicated and excessive voltage of each winding as in the formulas (29), (31) and (33) is converted into a simplified voltage as in the formulas (34), (35) and (36) and driven. The complicated relationship between the current and the voltage of each winding is solved, and the above-mentioned problem is solved.

Since the relationship between the current, interlinkage magnetic flux, voltage, torque, and power of the full-pitch winding is complicated, it becomes easier to understand the excitation method and control method by converting the current, interlinkage magnetic flux, voltage, torque, and power of the concentrated winding wound around each stator pole with the above formula. If a simple model is made by ignoring the winding resistance, the sum of products of the phase currents Ia, Ib, and Ic of the concentrated winding and the phase voltages Va, Vb, and Vc becomes the power [W], so that dividing the power by the rotation speed [rad/sec] gives the torque [Nm].

Figure 38:
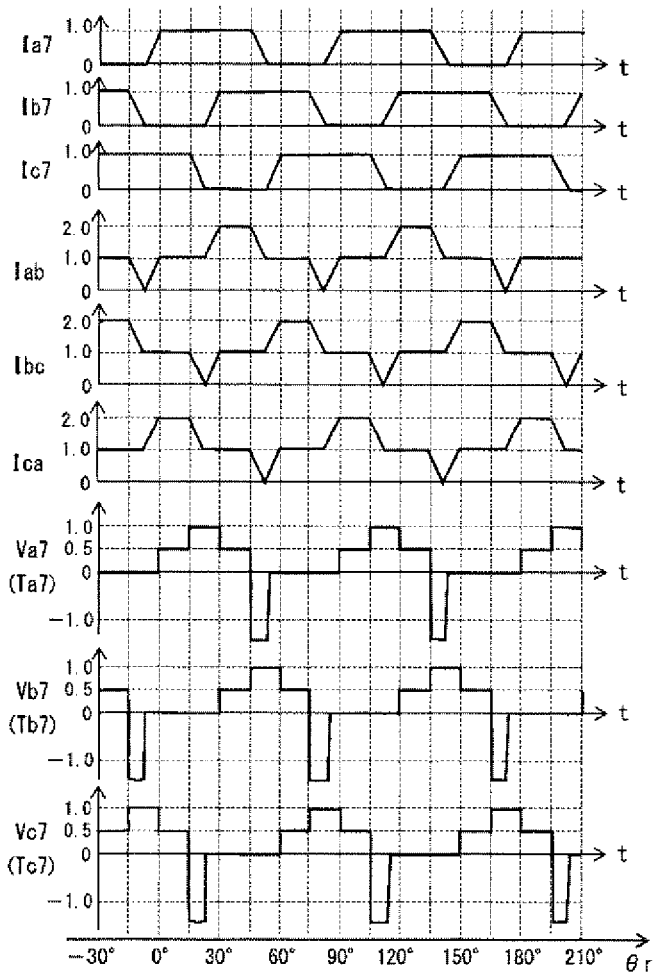
FIG. 38 is a graph exemplifying voltages, currents and torque values in the motor according to the present invention.

Next, as a specific motor, The case where the rotor magnetic poles of FIGS. 20 and 22 have the configurations and characteristics described with reference to FIGS. 6 and 7 is described by showing the current and voltage of the full-pitch winding in FIG. 38. Further, as described above, the cross-sectional view of FIG. 20 shows a configuration in which the concentrated winding of each stator magnetic pole shown in FIG. 1 is converted into a full-pitch winding. FIG. 38 is a characteristic added to FIG. 7 in accordance with each phase voltage and current Ia2F of FIG. 7. The horizontal axis of each current and each voltage in FIG. 38 is time t, and shows a state of rotation at a constant speed Vso. Then, the rotor rotation angle position θr at that time is indicated by the electric angle angle in the bottom column. A reference sign Ia7 in FIG. 38 shows an A7 phase current Ia7 that energizes the concentrated winding windings 17, 18 and 1C and 1D wound around the A7 phase stator magnetic poles 11 and 12 in FIG. 1, and the voltage across the two windings connected in series is Va7 in FIG. 38. A reference sign Ib7 in FIG. 38 shows a B7 phase current Ib7 that energizes the concentrated winding windings 1U, 1V, 1S, and 1T wound around the B7 phase stator magnetic poles 13 and 14 in FIG. 1, and the voltage across the two windings connected in series is Vb7 in FIG. 38. A reference sign Ic7 in FIG. 38 shows an A7 phase current Ic7 that energizes the concentrated winding windings 1Q, 1R, 1P, and 1N wound around the C7 phase stator magnetic poles 15 and 16 in FIG. 1, the voltage across the two windings connected in series is Vc7 in FIG. 38. Iab, Ibc, and Ica in FIG. 38 are currents represented by the formulas (13), (14), and (15).

FIG. 1 of the centralized winding, FIG. 20 of the full-pitch winding, and an example of their voltage and current are shown in FIG. 38. However, in the drive circuit of FIG. 37 described later, two full-pitch windings of each phase are required, for a total of six full-pitch windings, so the motor of FIG. 22 in which the one-pole pair of FIG. 20 is a two-pole pair will be described. FIGS. 20 and 22 are functionally equivalent to each other.

Reference signs 22A and 22D in FIG. 22 show A7 phase stator magnetic poles, and reference signs 22A/ and 22D/ show A7/ phase stator magnetic poles. Reference signs 22B and 22E show B7 phase stator magnetic poles, and Reference signs 22B/ and 22D/ show B7/ phase stator magnetic poles. Reference signs 22C and 22F show C7 phase stator magnetic poles, and reference signs 22C/ and 22F/ show C7/ phase stator magnetic poles. A reference signs 221 shows coil end portions of the AB phase full-pitch winding, so that the AB phase current Iab1 represented by the formula (13) is energized. A reference signs 224 also shows coil end portions of the AB phase full-pitch winding which also energizes the AB phase current Iab2. The currents Iab1 and Iab2 have the same current command in the control device, but they are physically separated due to the convenience of the drive circuit shown in FIG. 37. Similarly, reference sings 222 and 225 show coil end portions of the BC-phase full-pitch windings, and carry BC-phase currents Ibc1 and Ibc2, respectively. Similarly, reference sings 223 and 226 show coil end portions of the CA phase full-pitch winding, and energize the CA phase currents Ica1 and Ica2, respectively.

Next, an example will be described in which the reluctance motor of FIG. 22 is driven by the drive circuit of FIG. 37 to reduce the problem of increasing the size of the drive circuit. If the drive circuit of FIG. 37 is connected in series with the full-pitch windings adjacent to each other in the circumferential direction of FIG. 22, the voltage across the drive circuit can remove the differential voltage shown in Eq. (18), so that it utilizes the fact that it can be simplified as in equations (34), (35), and (36). Further, the six transistors shown in FIG. 37 can energize two sets of current paths to improve utilization efficiency. The configuration is such that mutual interference between the voltage and the current in the two sets of current paths in the drive circuit is reduced.

Figure 37:
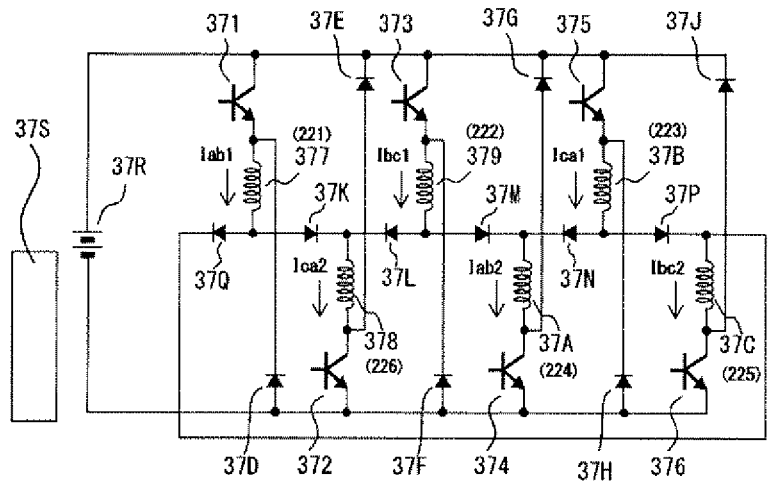
FIG. 37 is a circuit diagram exemplifying a drive circuit for a motor according to the present invention.

A reference symbol 37S in FIG. 37 shows a control circuit for the entire drive circuit, a reference symbol 37R shows a DC voltage source, and reference symbols 371, 372, 373, 374, 375, and 376 show drive transistors. For each winding and energizing current, In FIG. 377, the AB phase current Iab1 is energized by the transistor 371 in the AB phase full-pitch winding 221 of FIG. 22, and In 37A of FIG. 37, the AB phase current Iab2 is energized by the transistor 374 in the AB phase full-pitch winding 224 of FIG. 22. Similarly, in 379, the BC so phase current Ibc1 is energized by the transistor 373 in the BC phase full-pitch winding 222, and the BC phase current Ibc1 is energized by the transistor 373, and in 37C, the BC phase current Ibc2 is energized by the transistor 376 in the BC phase full-pitch winding 225. In 37B, the CA phase current Ica1 is energized by the transistor 375 in the CA phase full-pitch winding 223, and in 378, the CA phase current Ica2 is energized by the transistor 372 in the CA phase full-pitch winding 226.

Here, as for the arrangement method of each winding in FIG. 22, as shown in the figure, a method with less overlap on the winding of the coil end portion is selected, and the name of the winding and the name of the current are defined. However, considering, for example, the AB phase, there are four slots, and the coil end portion can be connected in two ways. For example, in FIG. 22, since the slot of the first pole pair is connected to the slot of the opposite phase of the second pole pair, it can be said that the winding connection is different from that of FIG. 20 of the one pole pair. It is also possible to reverse the two AB phase full-pitch windings on the circuit of FIG. 37. Also, those changes can be made in each phase. Therefore, although functionally equivalent, many different combinations of winding forms can be realized. For example, in FIG. 37, the circuit arrangement of the windings 377 and 37A that carry the in-phase currents Iab1 and Iab2 may be exchanged. Similarly, 378 and 37B may be exchanged, and 379 and 37C may be exchanged. The present invention includes these functionally equivalent modifications. Further, the AB phase currents Iab1 and Iab2 are currents that physically flow to different places, but the current command values that are controlledly targeted are the same. The same applies to the BC phase currents Ibc1 and Ibc2 and the CA phase currents Ica1 and Ica2.

A diode 37Q oriented in the current direction is arranged between the AB phase full-pitch winding 377 and the BC phase full-pitch winding 37C in FIG. 37, and a diode 37K oriented in the current direction is arranged between the AB phase full-pitch winding 377 and the CA phase full-pitch winding 378. A diode 37L oriented in the current direction Is arranged between the BC-phase full-pitch winding 379 and the CA-phase full-pitch winding 378, and a diode 37M oriented in the current direction is arranged between the BC-phase full-pitch winding 379 and the AB-phase full-pitch winding 37A. A diode 37N oriented in the current direction is arranged between the CA-phase full-pitch winding 37B and the AB-phase full-pitch winding 37A, and a diode 37P oriented in the current direction is arranged between the CA-phase full-pitch winding 37B and the BC-phase full-pitch winding 37C. The currents flowing through each winding and each diode have the relationship of equations (13), (14), and (15). The remaining six diodes 37D, 37E, 37F, 37G, 37H and 37J are power regeneration diodes for the DC voltage source 37R.

Next, the voltage of each winding of FIG. 37 will be described. The voltage between the AB-phase full-pitch winding 377, the diode 37K, and the CA-phase full-pitch winding 378 has the relationship of equation (34), and the voltage across these is (2×Va). Similarly, the voltage between the BC-phase full-pitch winding 379, the diode 37L, and the CA-phase full-pitch winding 378 has the relationship of equation (35), and the voltage across these is (2×Vc). The voltage between the BC-phase full-pitch winding 379, the diode 37M, and the AB-phase full-pitch winding 37A has the relationship of equation (36), and the voltage across these is (2×Vb). The voltage between the CA-phase full-pitch winding 37B, the diode 37N, and the AB-phase full-pitch winding 37A has the relationship of equation (34), and the voltage across these is (2×Va). The voltage between the CA-phase full-pitch winding 37B, the diode 37P, and the BC-phase full-pitch winding 37C has the relationship of equation (35), and the voltage across these is (2×Vc). The voltage between the AB phase full-pitch winding 377, the diode 37Q, and the BC phase full-pitch winding 37C has the relationship of equation (36), and the voltage across these is (2×Vb). These voltages across the equations (34), (35) and (36) are relatively simple voltage waveform as compared to the individual voltages of the windings represented by the equations (29), (31) and (33).

Next, an example of a specific waveform of each current applied to each winding of FIG. 37 and each applied voltage is shown. Previously, as an example of a reluctance motor in which a centralized winding is applied to each stator magnetic pole, an example of a cross-sectional view of FIG. 1, a rotor magnetic pole shape of FIG. 6, and each voltage, current, and torque of FIG. 7 is shown. FIG. 20 is a cross-sectional view of a reluctance motor obtained by converting the concentrated winding of FIG. 1 into a full-pitch winding. Each phase current and each phase voltage of FIGS. 1 and 6 and each phase current of FIG. 20 are shown in FIG. 38. FIG. 22 is a cross-sectional view of a reluctance motor obtained by converting FIG. 20 of a 1-pole pair into a 2-pole pair, and theoretically, both motors are electrically equivalent. Therefore, FIG. 38 is an example of the current and voltage of the two-pole pair reluctance motor of FIG. 22, and also shows the specific waveforms of each circuit of FIG. 37, each current energizing each winding, and each voltage to be applied. It should be noted that Va7, Vb7, and Vc7 in FIG. 38 are the same variables as Va, Vb, and Vc in the equations (29), (31), (33), (34), (35), and (36). Further, in the actual current control, PWM control is usually performed on each transistor to obtain an arbitrary equivalent average voltage and current, so that there is a slight difference in a strict sense. Further, in order to perform precise current control by PWM control, although the description is omitted in FIG. 37, a current detecting means for detecting the current value of each phase and feedback control using the current detection signal are required. It is also necessary to detect the rotor rotation angle position by the encoder 325 of FIG. 32.

As the operation of FIG. 37, Iab, Ibc, and Ica of FIG. 38 are energized to each full-pitch winding, and the torque 71 of Tt2 of FIG. 7 can be obtained. Luk 71 is a constant value, and the torque value thereof is a value represented by equations (1) to (12) depending on each shape and current value of the reluctance motor. However, it is a mathematical formula that holds under various simplified conditions. This is the simplification condition described above.

Next, the utilization efficiency of the drive circuit of FIG. 37 will be described. One of the advantages of the reluctance motor with full-pitch winding as shown in FIGS. 20 and 22 is the miniaturization of the drive circuit.

When the three full-pitch windings of FIG. 20 are driven by the conventional drive circuit of FIG. 36, the A7 phase stator magnetic pole 201 and the A7/ phase stator magnetic pole 202 are driven by energizing the AB phase full-pitch winding windings of windings 207 and 208 and the CA full-pitch winding windings of windings 20B and 20C. Since the maximum output Pfmax of the conventional drive circuit of FIG. 36 under this condition is two windings in three phases, the power to be supplied may be as follows.

$$Pfmax = Vdc \times Irat \times 2 \qquad (37)$$

Here, Vdc is the power supply voltage and Irat Is the current capacity of the transistor.

On the other hand, 11 in FIG. 1 is an A1 phase stator magnetic pole, and drives the centralized winding windings 17, 18 and 1C, 1D by energizing the A phase current Ia. Since the maximum output Pcmax of the conventional drive circuit of FIG. 36 under this condition is one winding in three phases, the following equation is obtained.

$$Pcmax = Vdc \times Irat \qquad (38)$$

The maximum output Pfmax of the equation (37) is twice the maximum output Pcmax of the equation (38). However, in the conventional drive circuit of FIG. 36, the winding voltage has characteristics as shown in equations (16), (17), and (18), the voltage becomes complicated, and there was a problem that an excessive voltage is generated when a heavy load of high-speed rotation occurs.

Next, the utilization efficiency when driving by the drive circuit of the present invention of FIG. 37 and the reluctance motor of the full-pitch winding of FIG. 22 will be described. Similar to the example of FIG. 20, A7 phase stator magnetic poles 22A, 22D and A7/ phase stator magnetic poles 22A/, 22D/ in FIG. 22 are AB phase full-pitch winding windings 221 (377), 224 (37A) and CA phase full-pitch winding windings 223 (37B), 226 (378) are energized and driven. Since the maximum output Pnmax of the drive circuit of the present invention in FIG. 37 under this condition is two windings in three phases, there is a possibility that the following equation can be obtained.

$$Pn\max = Vdc \times Irat \times 2 \quad (39)$$

At this time, on the drive circuit of FIG. 37, the current Irat is applied to the windings 377 and 378, and the current Irat is applied to the windings 37B and 37A. As explained earlier, since the sum of the voltages of the two windings connected in series cancels out the voltage components of (18) as shown in equations (34), (35), and (36), the excessive voltage under heavy load of high-speed rotation is reduced in FIG. 37. Although it is a drive circuit of 6 transistors, power is supplied by 2 sets of paths. The maximum output Pnmax of the drive circuit of the present invention is twice the maximum output Pcmax of the conventional drive circuit.

The number of full-pitch winding windings in FIG. 22 which are paired with two poles is 6, and the number of full-pitch winding windings in FIG. 20 is 3, which is twice that number. Then, in the drive circuit of the present invention of FIG. 37, two windings are connected in series and energized. Therefore, the number of windings of each full-pitch winding in FIG. 22 is set to ½ of the number of windings of full-pitch winding windings in FIG. 20, and the number of windings of both motors and the winding thickness are determined to be balanced. The current values of each phase of both motors are the same.

As described above, by driving the reluctance motor of the full-pitch winding of FIG. 22 with the drive circuit of FIG. 37, copper loss of each winding can be reduced, motor efficiency can be improved, and miniaturization and cost reduction can be realized. At the same time, the problem of excessive voltage and voltage complication, indicated by the equations (16), (17), (18), (29), (31), and (33), was solved by making the relationship of the equations (34), (35), and (36).

The first point of the reluctance motor that can be driven by the drive circuit of FIG. 37 is that the salient pole type stator magnetic pole and the salient pole type rotor magnetic pole are used, so that each magnetic pole is separated from the adjacent magnetic pole in the circumferential direction as shown in each figure. The second point is that the windings arranged in the slots can excite the stator magnetic poles on both sides of the winding in the circumferential direction. That is, the winding can be shared. It is the relationship of the equations (13), (14), and (15). For example, a motor with a full-pitch winding shown in FIGS. 20, 21, 22 and a toroidal winding that winds the winding of each slot shown in FIGS. 23, 24, and 25 to the rear side of the back yoke. On the contrary, the reluctance motors of FIGS. 46 and 1 have a dedicated centralized winding wound around each stator magnetic pole and cannot be shared, so that they cannot be driven by the drive circuit of FIG. 37. The third point is that two windings can be connected in series so that the voltage components of Eq. (18) can be offset.

On the other hand, the first main point of the configuration of the drive circuit of FIG. 37 is that, as described above, the two windings corresponding to the relations of the equations (34), (35) and (36) are connected in series and to each other so that the voltage components of the equation (18) cancel each other out. The second point is that the currents of the two paths of the currents related to the equations (13), (14), and (15) can be energized at the same time. Furthermore, all the currents related to the equations (13), (14) and (15) can be energized at the same time. The winding arrangement order in the drive circuit example of FIG. 37 is the arrangement order of the equations (13), (14), and (15). Further, since the winding arrangement order in the drive circuit of FIG. 37 is equivalent even if the windings of the same phase are arranged in reverse, the arrangement on the paper surface can be rewritten and converted as the winding arrangement order of FIG. 22. As a result, the drive circuit of FIG. 37 is configured to effectively drive the winding configuration and the drive circuit by closely integrating the winding configuration and the drive circuit by utilizing the theoretical relationship between the voltage and current of the winding of FIG. 22.

As a result, the drive circuit of the present invention shown in FIG. 37 can efficiently supply electric power, and has a characteristic that may output twice as much electric power as the conventional drive circuit. The utilization efficiency of the drive circuit of the present invention is twice that of the conventional one, and there is a possibility that the drive circuit can be reduced in size and cost by half. It should be noted that the degree to which the motor can be miniaturized and the drive circuit can be miniaturized depends on the characteristics of the motor, so noise reduction, torque ripple reduction, maximum torque, etc. will be optimized according to the motor application. Later, an example of a motor shape advantageous for miniaturization of the drive circuit of the present invention in FIG. 37 and an example of a reluctance motor utilizing a permanent magnet will be described. Further, the 37Q, 37K, 37L, 37M, 37N, and 37P diodes that block the reverse current are not all necessary in motor applications where there are few sudden changes in current and voltage.

The drive circuit of a permanent magnet application synchronous motor with three-phase AC, sine wave voltage, and sine wave current, which is often used as a mainstream motor, controls voltage and current by PWM control with six transistors. Then, the maximum output Psmax is the same as the equation (38), and becomes the following equation.

$$Ps\max = Vdc \times Irat$$

Therefore, the method of connecting the drive circuit of the present Invention and each winding of the full-pitch reluctance motor shown in FIG. 37 may be halved in size and cost as compared with the drive circuit of the current permanent magnet application synchronous motor.

In addition, the brush-equipped DC motor can control the forward and reverse current and torque with four transistors, but the drive circuit of the present invention and the reluctance motor of the full-pitch winding of FIG. 37 have a possibility of outputting power in two paths with six transistors. Therefore, the output is relatively $(\frac{2}{3})/(\frac{1}{2}) = 1.33$ times. This means that the drive circuit of the present invention in FIG. 37 can be downsized to ¾ of the drive circuit of the brushed DC motor. It is important to reduce the cost, size, and weight of the motor and its drive circuit in applications such as the main engine of electric vehicles.

Twenty-Second Embodiment

Next, another embodiment of claim 14 is shown. When the motor of FIG. 20 is applied to the drive circuit of the present invention of FIG. 37, the one-pole pair motor of FIG. 20 has only three full-pitch windings, so it is necessary to convert to a total of six windings. Specifically, each winding is divided into two parallel windings and arranged in the same slot. The AB phase full-pitch winding Wab of the windings 207 and 208 is divided into two parallel windings Wab1 and Wab2. The BC phase full-pitch winding Wbc of windings 209 and 20A is divided into two parallel windings Wbc1 and Wbc2. The CA-phase full-pitch winding Wca of the windings 20B and 20C is divided into two parallel windings Wca1 and Wca2.

The AB phase full-pitch winding 377 of the drive circuit of the present invention in FIG. 37 is referred to as winding Wave1, and the winding 37A is referred to as winding Wave2. The BC phase full-pitch winding 379 is referred to as winding Wbc1, and the winding 37C is referred to as winding Wbc2. The CA phase full-pitch winding 37B Is referred to as winding Wca1, and the winding 378 is referred to as winding Wca2. With such a winding configuration and winding connection, it can be driven in the same manner as in FIG. 22. In order to arrange the drive circuit in FIG. 37 at each position, it is necessary to insulate the two in-phase windings arranged in the same slot from each other.

Twenty-Third Embodiment

Next, as another embodiment of claim 14, a case where the motor of FIG. 23 is applied to the drive circuit of the present invention of FIG. 37 will be described. As described above, there are six windings in FIG. 23, and the winding on the opposite side of 180° on the paper surface of FIG. 23 is a winding that carries a current of the same phase. The AB phase winding 377 of the drive circuit of the present invention of FIG. 37 is the winding 237 of FIG. 23, and the winding 37A is the winding 238. The BC phase winding 379 is the winding 239, and the winding 37C is the winding 23A. The CA phase winding 37B is referred to as winding 23B, and the winding 378 is referred to as winding 23C. With such a winding configuration and winding connection, it can be driven in the same manner as in the case of FIG. 22. Since the reluctance motor of FIG. 23 is point-symmetric with respect to the center of the motor, the interlinkage magnetic fluxes of the AB phase windings 237 and 238 have the same magnitude, and each has a voltage of ½ of the equation (29). Similarly, the voltage of the BC phase windings 239 and 23A is halved of that of the equation (30), respectively. The CA phase windings 23B and 23C each have a voltage of ½ of that of the equation (31).

Twenty-Fourth Embodiment

Next, as another embodiment of claim 14, a case where the motor of FIG. 25 is applied to the drive circuit of the present invention of FIG. 37 will be described. The motor of FIG. 25 has a dual motor configuration in which two motors are incorporated. Compared with the configuration of FIG. 23, the one-pole pair is converted into a two-pole pair, and the winding portion on the outer diameter side of FIG. 23 is utilized as the winding of the motor on the outer diameter side. Since there are four windings in the same phase and the opposite phase and three phases, the total number of windings is 12. There is a degree of freedom in placement in the drive circuit of the present invention in FIG. 37, and an example of placement is shown. The AB phase winding 377 of the drive circuit of the present invention of FIG. 37 is arranged by connecting the AB phase winding 257 of FIG. 25 and the AB/ phase winding 258 in series. Similarly, the AB phase winding 37A is arranged by connecting the AB phase winding 257 and the AB/ phase winding 258 of FIG. 25 in series. The BC phase winding 379 is arranged by connecting the BC phase winding 259 of FIG. 25 and the BC/ phase winding 25A In series. The BC phase winding 37C is arranged by connecting the BC phase winding 25L and the BC/ phase winding 25M of FIG. 25 in series. The CA phase winding 37B is arranged by connecting the CA phase winding 25B and the CA/ phase winding 25C of FIG. 25 in series. The CA phase winding 378 is arranged by connecting the CA phase winding 25N of FIG. 25 and the BC/ phase winding 25P in series. With such a winding configuration and winding connection, it can be driven in the same manner as in the case of FIG. 22.

There is some confusion in the name and expression of the winding. For example, the AB/ phase winding 258 has the winding direction of the AB phase winding 257 reversed, and the AB/ phase winding can be said to be an AB phase winding wound in the opposite direction. When the current control of all phases of the motor is performed in a well-balanced manner, the interlinkage magnetic flux of the AB phase winding becomes the same as the Interlinkage magnetic flux of the AB/ phase winding wound in another place.

Twenty-Fifth Embodiment

Next, an example of driving the reluctance motor RMCON, which is a modification of the conventional reluctance motor of FIG. 46, will be described with the drive circuit of the present invention of FIG. 37. The reluctance motor of FIG. 46 includes six stator magnetic poles, a centralized winding wound around each, and four rotor magnetic poles, and as can be seen from the characteristics of FIG. 47, the stator magnetic pole has a circumferential width of 30° and the rotor magnetic pole has a circumferential width of 30°. The reluctance motor RMCON converts the stator magnetic pole of FIG. 46 into a pair of two poles, and winds each winding with full pitches to form the stator magnetic pole of FIG. 22. The rotor converts the rotor magnetic poles of FIG. 46 into a pair of two poles, and has eight rotor magnetic poles, the circumferential width of which is 30° in electrical angle.

Figure 39:
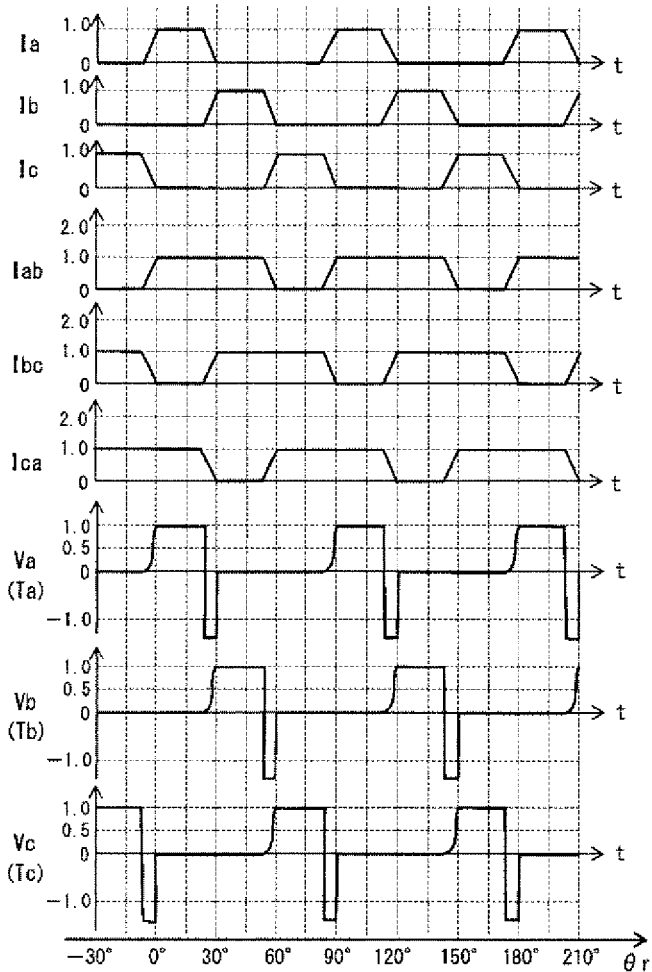
FIG. 39 is a graph exemplifying voltages, currents and torque values in a motor according to the present invention.

An example of driving the reluctance motor RMCON by the drive circuit of the present invention of FIG. 37 is shown in FIG. 39. The shape and magnetic characteristics of the rotor magnetic poles are different from those of the reluctance motor having the characteristics of FIG. 38 described above as the rotor magnetic pole configuration of FIG. 6 in the stator configuration of FIG. 22. The relationship of the winding connection of the reluctance motor RMCON in FIG. 37 is the same as in the case of FIG. 38. The horizontal axis of each current and each voltage in FIG. 39 is time t, and shows a state of rotation at a constant speed Vso. Then, the rotor rotation angle position θr at that time is indicated by the angle of the electric angle in the bottom column. Further, as the magnetic characteristics of the reluctance motor RMCON, the equations (13) to (36) and (39) are satisfied. Currents Ia, Ib, and Ic in FIG. 39 correspond to the currents of the items on the right side of the equations (13), (14), and (15).

The A-phase current Ia of FIG. 39 of the reluctance motor RMCON is energized while the rotor angle θr of the electric angle is between 0° and 30° in the simple model of FIGS. 46 and 47, but in an actual motor, the leakage flux is generated in the vicinity of the stator magnetic pole and the rotor magnetic pole, and the reverse torque, that is, the CW torque is generated between 30° and 60° of θr. In Ia of FIG. 39, θr increases from 0 to 1.0 between −7.5° and 0° and decreases from 1.0 to 0 between 22.5° and 30°. Then, θr increases from 0 to 1.0 between 82.5° and 90° and decreases from 1.0 to 0 between 112.5° and 180°. Similarly, the B-phase current Ib has a current waveform whose phase is 60° behind that of the A-phase current Ia. The C-phase current Ic has a current waveform whose phase is 120° behind the A-phase current Ia.

Since the AB phase current Iab of the AB phase full-pitch winding of FIG. 39 indicating the reluctance motor RMCON has the relationship of the equation (13), it has the current waveform shown in the figure. Similarly, since the BC phase current Ibc and the CA phase current Ica have the relationship of the equations (14) and (15), the current waveform shown in the figure is obtained.

The A-phase voltage Va of FIG. 39 indicating the reluctance motor RMCON is obtained by the magnetic flux corresponding to the A-phase magnetic flux 20G of FIG. 20 excited by the A-phase current Ia and the equation (4). The leakage flux between θr of −7.5° and 0° is small, and the A-phase voltage Va is also small. When θr is between 0° and 22.5°, since the area of the A phase stator magnetic pole and the rotor magnetic pole increases with the rotation of the rotor, the A-phase magnetic flux φa also increases, and the A-phase voltage Va becomes a constant value of 1.0. When θr is between 22.5° and 30°, the A-phase magnetic flux φa decreases sharply and torque Is also generated, but magnetic energy is regenerated to the power supply. Similarly, the B-phase voltage Vb is obtained by the magnetic flux (26) corresponding to the B-phase magnetic flux 20H of FIG. 20 excited by the B-phase current Ib. The C-phase voltage Vc Is obtained by the magnetic flux corresponding to the C-phase magnetic flux 20HJ of FIG. 20 excited by the C-phase current Ic and the equation (27). The voltages Vab, Vbc, and Vca of full-pitch windings of each phase and the Va, Vb, and Vc have the relationship of the equations (34), (35), and (36), and the voltages across the two series windings in FIG. 37 are Va, Vb, and Vc.

The reluctance motor RMCON continuously rotates in the CCW direction as explained by the above operation. In FIG. 39, since the reluctance motor RMCON is not a simple model as described in FIG. 47, a current increase/decrease time of 7.5° is created at a rotor rotation angle θr assuming high-speed rotation. In the time zone in which each phase current in FIG. 39 increases or decreases, the torque decreases slightly, and torque pulsation occurs even in a simple motor model. However, since the current increase/decrease time can be reduced at low speed rotation, the A-phase current Ia in FIG. 39 increases from 0 to 1.0 in the vicinity immediately before 0° of the rotor rotation angle position θr, as in the A-phase current Ia in FIG. 47, and it can be modified and controlled so as to decrease from 1.0 to 0 in the vicinity immediately before 30°. As a result, in principle, the torque decrease and torque pulsation are reduced.

Assuming the use of the motor for the main engine of an electric vehicle, the usage that requires the maximum torque is the uphill operation on a steep slope, the low-speed rotation of the motor, and the operating region of a large torque. Therefore, it is important to control the current increase/decrease time so as to be shortened at low speed rotation. There are often similar needs in industrial motor applications. Further, the torque generation width of each phase can be increased by increasing the circumferential width of the stator magnetic pole and the circumferential width of the rotor magnetic pole.

Next, the drive characteristics of the drive circuit of the present invention and the reluctance motor RMCON of FIG. 37 will be evaluated and described with respect to the supplied electric power. Since the rotor rotation angle position θr is between 0° and 22.5°, the A-phase current Ia in FIG. 39 is 1.0, and the B-phase current Ib and the C-phase current Ic are 0. From the relationship of the equations (13), (14), and (15), The AB phase current Iab of the AB phase full-pitch winding 221 and 224 and the CA phase current Ica of the CA phase full-pitch winding 223 and 226 of FIG. 22 are 1.0, and the BC phase full-pitch winding 222 and the BC phase current Ibc of 225 is 0. This means that the winding 377 in FIG. 37 is energized with a current Iab=1.0 and the winding 378 is energized with a current Ica=1.0. Then, the current Ica=1.0 is applied to the winding 378 and the current Iab=1.0 is applied to the winding 37A. The voltage across the series windings of windings 377 and 378 is (2×Va) according to equation (34). However, since the stator in FIG. 22 is a two-pole pair, the number of windings of each winding is set to ½, and the voltage across the windings 377 and 378 is set to 1.0 of Va. The voltage Va across the windings 37B and 37A is also 1.0. The power Pc01 supplied to the two sets of the reluctance motor RMCON series windings when the rotor rotation angle position θr is between 0° and 22.5° s given by the following equation.

$$Pc00 = Va \times Iax2 = 2 \times Vo \times Io \qquad (40)$$

Here, Vo is the value of Va in which Kra is 1 in Eq. (5), and Io is the current value to be energized. Further, at this time, the two sets of current paths have a circuit configuration that does not interfere with each other by the diodes 37Q, 37K, 37L, 37M, 37N, and 37P that block the opposite directions.

Similarly, when the rotor rotation angle position θr is between 30° and 52.5°, the B-phase current Ib in FIG. 39 is 1.0, and the A-phase current Ia and the C-phase current Ic are 0. Therefore, the current Ibc of the AB phase windings 221 and 224 and the current Ibc of the BC phase windings 222 and 225 are 1.0, and the current Ica of the CA phase windings 223 and 226 is 0. This means that the winding 377 of FIG. 37 is energized with a current Iab=1.0 and the winding 37C is energized with a current Ibc=1.0. Then, the current Ibc=1.0 is applied to the winding 379 and the current Iab=1.0 is applied to the 37A. The voltage across the series winding of windings 377 and 37C is (2×Vb) from equation (36), but the number of windings is set to ½ as described above, and the voltage across the windings is 1.0 of Vb. The voltage across the windings 379 and 37A is also 1.0 of Vb. The power Pc30 supplied to the two sets of the series windings of the reluctance motor RMCON when the rotor rotation angle position θr is between 30° and 52.5° Is given by the following equation.

$$Pc30 = Vb \times Ib \times 2 = 2 \times Vo \times Io \qquad (41)$$

Similarly, when the rotor rotation angle position θr is between 60° and 82.5°, the C-phase current Ic in FIG. 39 is 1.0, and the A-phase current Ia and the B-phase current Ib are 0. Therefore, the current Ibc of the BC phase windings 222 and 225 and the current Ica of the CA phase windings 223 and 226 are 1.0, and the current Iab of the AB phase windings 221 and 224 is 0. This means that the winding 379 of FIG. 37 is energized with a current Ibc=1.0 and the winding 378 is energized with a current Ica=1.0. Then, the current Icc=1.0 is applied to the winding 37B and the current Ibc=1.0 is applied to the 37C. The voltage across the series windings of windings 379 and 378 is (2×Vc) from equation (35), but the number of turns is set to ½ as described above, and the voltage across the windings is 1.0 of Vc. The voltage across the lines 37B and 37C is also 1.0 of Vc. The power Pc60 supplied to the two sets of the series windings of the reluctance motor RMCON when the rotor rotation angle position θr is between 60° and 82.5° is as follows.

$$Pc60 = Vc \times Ic \times 2 = 2 \times Vo \times Io \qquad (42)$$

As described above, an example of driving the reluctance motor RMCON with the drive circuit of the present invention shown in FIG. 37 has been shown. The reluctance motor RMCON has a configuration of a stator magnetic pole of FIG. 22 and a full-pitch winding, and has a rotor configuration of eight rotor magnetic poles by pairing the rotor of FIG. 46 with the characteristics of FIG. 47. As shown in FIG. 39 and (40), (41), and (42), the totals of the currents Iab, Ibc, and Ica of full-pitch windings of each phase are always constant, and the maximum value of the current is the same as the currents Ia, Ib, and Ic when the winding is converted to concentrated winding. Therefore, since the resistance value of the full-pitch winding is ½ that of the concentrated windings, the copper loss can be reduced to ½, and the motor can be downsized and the cost can be reduced.

In the drive circuit of the present invention of FIG. 37, since the voltage sums of the two windings in series shown in FIG. 37 are arranged in the relationships shown in the equations (34), (35), and (36), the voltage across the two windings is not complicated and does not generate an excessive voltage. Then, as shown in the equations (40), (41), and (42), power can be supplied in parallel through two sets of paths. Therefore, a comparison Is made with the case where the motor obtained by converting the reluctance motor RMCON into a centralized winding is driven by the conventional drive circuit shown in FIG. 36, and the drive circuit of the present invention of FIG. 37 can supply twice the power to the reluctance motor RMCON. Therefore, it is possible to reduce the size and cost of the drive circuit. Further, as described above, it is possible to reduce the current capacity to ½ and reduce the cost as compared with the drive circuit of the current mainstream three-phase AC permanent magnet application synchronous motor. Although the region of the current increase/decrease time in FIG. 39 has not been described in detail, as described above, the current increase/decrease time can be shortened at low speed rotation. Further, in the application of the main motor of an electric vehicle, a usage that requires a particularly large torque is a steep slope climbing operation, and since the rotation speed is low, the time for increasing or decreasing the current can be shortened.

Twenty-Sixth Embodiment

Next, as another embodiment of claim 14, an example in which the motor shown in FIG. 9(*b*) is driven by the drive circuit of the present invention of FIG. 40 will be described. The reluctance motor shown in FIG. 9(*b*) is a reluctance motor having 10 stator magnetic poles and 6 rotor magnetic poles, and the winding of each phase is a full-pitch winding. In the drive circuit of the present invention shown in FIGS. 37 and 40, in order to cancel and control the voltage component as in equation (18) Induced in all the nodal windings, two offsetting windings are connected in series and controlled. The two offsetting windings are full-pitch winding windings of the respective slots arranged in the slots on both sides in the circumferential direction of the stator magnetic pole to be excited, and it becomes a voltage as in equations (16) and (17). Further, in the case of the drive circuit shown in FIGS. 37 and 40, two or more windings of each phase are required. Since the reluctance motor shown in FIG. 9(*b*) has a one-pole pair configuration, the full-pitch winding of each phase is divided into two insulated parallel windings, with two coil end symbols for each phase winding. If a two-pole pair full-pitch winding motor Is used, or if a toroidal winding is used as shown in FIG. 23, it is not necessary to divide the winding in the same slot into two windings since two in-phase windings can be created.

The respective currents in FIG. 9(*b*) have the following relationships as in the equations (13), (14), and (15).

$$Iac = Ia4 + Ic4 \quad (43)$$

$$Ice = Ic4 + Ie4 \quad (44)$$

$$Ieb = Ie4 + Ib4 \quad (45)$$

$$Ibd = Ib4 + Id4 \quad (46)$$

$$Ida = Id4 + Ia4 \quad (47)$$

The left side of each equation is the current for full-pitch winding, and the right side is the current for concentrated winding. Further, in the method of dividing the in-phase winding into two, it is decided to make two full-pitch winding windings in which two concentrated winding windings are connected in series and which is ½ of the number of turns Nwa. The relationship between the voltage and the number of turns Nwa is shown by Eq. (5). It is controlled so that the current of the same value flows through these two windings having the same phase.

The respective voltages of FIG. 9(*b*) have the following relationships as in the equations (34), (35), and (36).

$$Vac + Vce = Vc4 \quad (48)$$

$$Vce + Veb = Ve4 \quad (49)$$

$$Veb + Vbd = Vb4 \quad (50)$$

$$Vbd + Vda = Vd4 \quad (51)$$

$$Vda + Vac = Va4 \quad (52)$$

The left side of each equation is the each phase voltage of the full-pitch winding, and the right side is the each phase voltage of the centralized winding of FIG. 9 (*a*). As the number of phases of this 5-phase motor or the like increases, the magnetic flux component and the voltage component of the equation (18) increase, the voltage of the equation (18) becomes more complicated, and the voltage value becomes larger.

Figure 40:
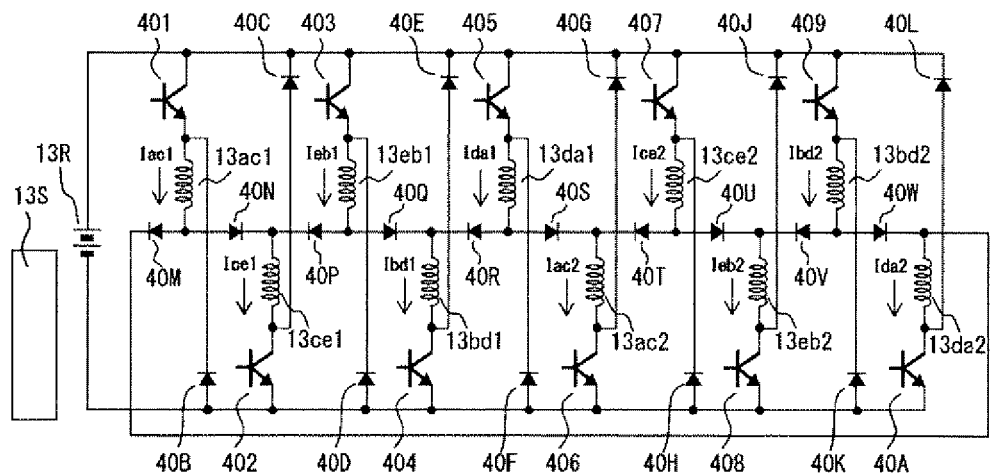
FIG. 40 is a circuit diagram exemplifying a drive circuit provided in the present invention.

FIG. 40 shows the drive circuit of the present invention that drives the reluctance motor shown in FIG. 9 (*b*). It is driven so as to satisfy the current conditions and voltage conditions of the above equations (43) to (52). It is driven so as to satisfy the current conditions and voltage conditions of the above equations (43) to (52). In FIG. 40, a reference symbol 13S shows a control circuit for the entire drive circuit, a reference symbol 13R is a DC voltage source, and 401, 402, 403, 404, 405, 406, 407, 408, 409, and a reference symbol 40A are drive transistors. Regarding each winding and the energizing current, a reference symbol 13*ac*1 in FIG. 40 energizes the AC phase current Iac of the formula (43) by the transistor 401 in the AC phase full-pitch winding 13*ac*1 of FIG. 9 (*b*). Similarly, in 13*ce*1 of FIG. 40, the CE phase current Ice is energized by the transistor 402 in the CE-phase full-pitch winding 13*ce*1 of FIG. 9(*b*). Similarly, a reference symbol 13*eb*1 energizes the EB phase current Ieb by the transistor 403 in the EB phase full-pitch winding. A reference symbol 13*bd*1 is a BD-phase full-pitch winding, and the BD-phase current Ibd Is energized by the transistor 404. A reference symbol 13*da*1 is a DA-phase full-pitch winding, and the DA-phase current Ida is energized by the transistor 405. A reference symbol 13*ac*2 is an AC-phase full-pitch winding, and the AC-phase current Iac is energized by the transistor 406. A reference symbol 13*ce*2 is a CE-phase full-pitch winding, and the CE-phase current Ice is energized by a transistor 407. 13*eb*2 is an EB-phase full-pitch winding, and an EB-phase current Ieb is energized by a transistor 408. A reference symbol 13bd2 is a BD-phase full-pitch winding, and the BD-phase current Ibd is energized by the transistor 409. A reference symbol 13da2 is a DA-phase full-pitch winding, and the DA-phase current Ida is energized by the transistor 40A.

As described above, in the drive circuit of the present invention of FIG. 40, a current is applied to each winding as in equations (43) to (47). In addition, each winding has two windings connected in series at the top and bottom on the paper of FIG. 40, and each winding is alternately connected to two electromagnetically related windings. The electromagnetic relationship means that in FIG. 9(b), the two windings excite one of the stator magnetic poles, and two windings arranged in two slots on both sides of one of the stator magnetic poles in the circumferential direction. Then, the voltages of the two windings have a relationship corresponding to any of the equations (48) to (52).

Further, each individual winding has a magnetic flux component and a voltage component of the equation (18), and generates an excessive voltage different from the voltage on the right side of the equations (48) to (52). Alternatively, when the current is PWM-controlled to increase or decrease the current, an excessive voltage is generated in each winding. The diodes 40M, 40N, 40P, 40Q, 40R, 40S, 40T, 40U, 40V, and 40W reduce the influence of the excessive voltage so as not to affect the other windings arranged on the left and right sides of the paper in FIG. 40.

Figure 41:
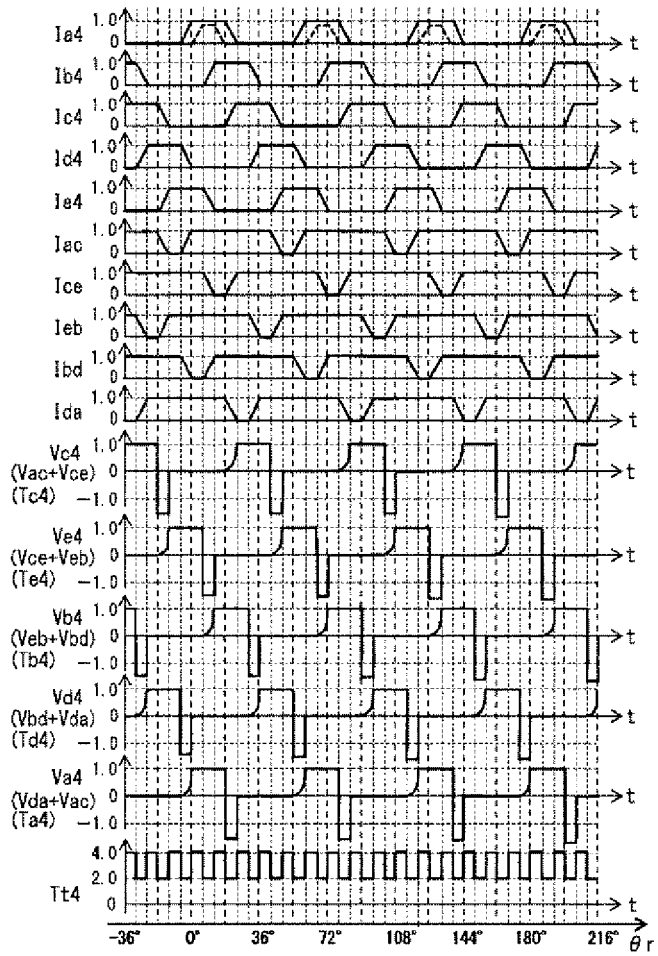
FIG. 41 is a graph exemplifying voltages, currents, and torque values of a motor according to the present invention.

Next, the current and voltage when the motor shown in FIG. 9(b) is driven to rotate in the CCW direction by the drive circuit of the present invention of FIG. 40 will be shown and described in FIG. 41. The circumferential width of the stator magnetic pole is 18°, and the circumferential width θBr of the rotor magnetic pole is 24°. In FIGS. 9(a) and 9(b), the rotor rotation angle position where the rotor magnetic pole approaches the A-phase stator magnetic pole 121 during the CCW rotation is defined as θr=0°, and is shown at the bottom of FIG. 41.

The phase currents of FIG. 9(b) are Iac, Ice, Ieb, Ibd, and Ida on the left side of equations (43) to (47), and their current waveforms are shown in FIG. 41. Ia4, Ib4, Ic4, Id4, and Ie4 of FIG. 41 do not exist on the motor of FIG. 9(b), and the current components of the full-pitch winding as shown on the right side of equations (43) to (47). Since it is not easy to consider Iac, Ice, Ieb, Ibd, and Ida on the left side of equations (43) to (47), which are the currents of full-pitch windings, the current components are shown in FIG. 41. Then, these current components Ia4, Ib4, Ic4, Id4, and Ie4 are the phase currents of the concentrated winding wound around the stator magnetic poles of each phase of FIG. 9(a).

When the rotor magnetic pole in FIG. 9(b) approaches a point before 6 degrees to the A phase stator magnetic pole 121, that is, when the rotor magnetic pole has θr=−6°, the A phase current component Ia4 starts to increase from θr=−6°, and the A phase current Ia4 is set to a predetermined value at θr=0°. During this period, the rotor magnetic pole does not face the A-phase stator magnetic pole 121, and torque is not generated in a simple model. However, since it is a close distance, leakage flux is actually generated, and torque corresponding to the leakage flux is generated. During the period from θr=0° to 18°, the facing area between the A phase stator magnetic pole 121 and the rotor magnetic pole increases, and CCW torque is generated. Ia4 is reduced from θr=18°, and Ia4 is set to 0 at θr=24°. During this period, the entire surface of the A phase stator magnetic pole 121 faces the rotor magnetic pole, so no torque is generated. Similarly, during the period from θr=54° to 84°, the A phase current component Ia4 Increases and decreases, and the process is repeated at a cycle of 60°.

As shown in the figure, the other current components Ib4, Ic4, Id4, and Ie4 are each delayed in phase by 12°. Each current period is 60°. The currents Iac, Ice, Ieb, Ibd, and Ida of the full-pitch winding winding of FIG. 9 (b) have the relation of the equations (43) to (47) and have the waveform shown in FIG. 41.

Although FIG. 41 shows an example in which the angle width at which the current increases/decreases is 6°, the current increase/decrease time can be shortened at low speed rotation, and conversely, it may be necessary to increase the current increase/decrease time at high speed rotation. Further, since the angle width and time of this current increase/decrease depend on the magnitude of the current, so they can be changed according to the operating conditions. Further, in order to shorten the time for increasing or decreasing the current, it is also possible to wind an exciting winding around each stator magnetic pole and connect it in series, energize a field current component, and circulate magnetic energy in the motor with rotation. As shown in FIG. 30 and the like, it is also possible to use a permanent magnet to excite and shorten the time for Increasing or decreasing the current.

The AC phase voltage Vac, CE phase voltage Vce, EB phase voltage Veb, BD phase voltage Vbd, and DA phase voltage Vda of the full-pitch winding winding of FIG. 9 (b) are related to the equations (16), (17), and (18), and in particular, Eq. (18) has a complicated voltage. Therefore, in the drive circuit of the present invention of FIG. 40, as in equations (48) to (52), two specific windings are connected in series, configured and controlled to have a relatively simple voltage on the right side of equations (48) to (52). These voltages Vc4, Ve4, Vb4, Vd4, and Va4 are shown in FIG. 41, and the values on the left side of the equations (48) to (52) are added in parentheses.

For example, Va4 in FIG. 41 is represented by the equation (52), and it corresponds to the A-phase voltage in which the concentrated winding winding 91 wound around the A-phase stator magnetic pole 121 of FIG. 9A and the concentrated winding winding 92 wound around the A/phase stator magnetic pole 122 are connected in series. Va4 in FIG. 41 begins to Increase the A-phase current component Ia4 from θr=−6° as described above. However, the A-phase stator magnetic pole 121 and the rotor magnetic pole are not yet opposed to each other, and since the interlinkage magnetic flux is a leakage flux, the generated voltage Is small, and the leakage flux increases as θr=0°, and Ia4 increases to a predetermined value, so the A-phase voltage increases sharply. Then, from θr=0° to 18°, the facing area between the A stator magnetic pole and the rotor magnetic pole increases in synchronization with the rotation of the rotor, so that the voltage becomes constant.

Since the current component Ia4 is reduced from θr=18° to 24°, the magnetic energy related to the A-phase stator magnetic pole 121 and the A/ phase stator magnetic pole 122 is regenerated to the power source, and the A-phase voltage Va4 during this period becomes a large negative voltage. During this period, no torque is generated because the entire surface of the A stator magnetic pole faces the rotor magnetic pole. Such voltage and operation are repeated at a cycle of 60°. Further, the voltages of the other phases also differ in the phase of the rotor rotation angle position by 12°, but have the same voltage waveform as shown in the figure.

The torque Tt4 in the operation of FIG. 41 is a torque waveform that repeats 2.0 and 4.0 in a normalized torque value with a 12° cycle. Its average value is 3.0. The reluctance motor of the centralized winding of FIG. 9(a) can be driven by a drive circuit in which the half bridge of FIG. 36, which is a conventional drive circuit, is increased from 3 sets to 5 sets. Examples of the characteristics are shown in FIGS. 12 and 13 described above, and the normalized torque thereof is 1.5. In the winding configuration and winding connection of the drive circuit of the present invention of FIG. 40 and the reluctance motor of the full-pitch winding of FIG. 9 (b), it is possible to output twice as much torque and power as before, under the same conditions for the number of transistors.

The torque Tt4 in FIG. 41 is not preferable because the torque has a large torque ripple. This is also because the standard model of the reluctance motor with 10 stator magnetic poles and 6 rotor magnetic poles was used as an evaluation example. However, there are several ways to reduce this torque ripple. The first torque ripple reduction method is to modify the current waveform. For example, if the current waveforms of all phases are modified to the current waveforms shown by the broken line of Ia4 in FIG. 41, the torque is halved in the region where the torques of the other phases overlap. As a result, the total torque Tt4 is 2.0, which is a uniform torque. Alternatively, the current value may be increased in the region where the torque of Tt4 decreases. These may be combined. The second torque ripple reduction method is a method of correcting the circumferential widths of the stator magnetic pole and the rotor magnetic pole. For example, the stator magnetic pole width is set to 18°, but if it is corrected to 24°, the dent of the torque Tt4 disappears, and the torque becomes uniform at 4.0. However, it should be noted that the current waveform of each phase also changes. The third torque ripple reduction method is a method of correcting the rotor axial widths of the stator magnetic pole and the rotor magnetic pole. For example, the torque ripple can be set to 0 by adopting the rotor magnetic pole shape as shown in FIGS. 12 and 13. At this time, the rotor magnetic pole may be processed by processing the electromagnetic steel sheet as shown in FIG. 17. In the rotor, this is a method of freely changing and setting the circumferential distribution of the magnetic resistance value per unit angle width in the radial direction over the entire rotor axial direction. Further, the first, second, and third torque ripple reduction methods may be combined.

Next, the drive circuit of the present invention of FIG. 40, the winding configuration of the reluctance motor of the full-pitch winding of FIG. 9(b), and the effect on the winding connection will be summarized. Regarding the copper loss of the motor, the copper loss can be reduced by a maximum of ½ as compared with the reluctance motor of the concentrated winding. As described above, the main motor of an electric vehicle is a steep uphill operation, and a large torque at a low speed rotation is the most severe operation mode. The size of the motor is determined by the characteristics of this mode of operation, and most of the loss is copper loss. Therefore, by reducing the copper loss, it is possible to reduce the size, weight, and cost of the motor.

In addition, the problem of full-pitch winding and toroidal winding was that that it is difficult for the conventional drive circuit in which the half bridge as shown in FIG. 36 is combined due to the influence of the complicated voltage and the excessive voltage as shown in the formulas (16), (17) and (18). The drive circuit and motor configuration of the present invention can solve this problem and output up to twice as much torque and power. Therefore, it is possible to reduce the size, weight, and cost of the drive circuit. As a comparison condition of the drive circuit, the total current capacity obtained by multiplying the current capacity of the transistors by the number of transistors is the same condition.

Twenty-Seventh Embodiment

Next, as another embodiment of claim 14, an example in which the motor shown in FIG. 8(b) is driven by the drive circuit of the present invention of FIG. 42 will be described. The reluctance motor shown in FIG. 8(b) is a reluctance motor having eight stator magnetic poles and six rotor magnetic poles, and the winding of each phase is a full-pitch winding. In the drive circuit of the present invention of FIGS. 37, 40, and 42, two offsetting windings are connected in series for control in order to cancel and control the voltage component as in the formula (18) induced in all the nodal windings. Therefore, two or more windings for each phase are required. The two offsetting windings are full-pitch windings of the respective slots arranged in the slots on both sides in the circumferential direction of the stator magnetic pole to be excited, and the voltage is as shown in formulas (16) and (17). Since the reluctance motor shown in FIG. 8(b) has a one-pole pair configuration, the full-pitch winding of each phase is divided Into two insulated parallel windings, with two coil end symbols for each phase winding. Full-pitch winding windings 11ad1 and 11ad2 are AD phase windings that carry the AD phase current Iad, 11dc1 and 11dc2 energize the DC phase current Idc with the DC phase winding, 11dc2 energizes the DC phase current Idc with the DC phase winding, 11ccb1 and 11ccb2 energize the CB phase current Icb with the CB phase winding, and 11ba1 and 11ba2 energize the BA phase current Iba with the BA phase winding.

The respective currents in FIG. 8(b) have the following relationships which are based on the formulas (13), (14), (15), or (43), in the same way as (47).

$$Iad = Ia3 - Id3 \quad (53)$$

$$Idc = Id3 + Ic3 \quad (54)$$

$$Icb = Ic3 + Ib3 \quad (55)$$

$$Iba = Ib3 + Ia3 \quad (56)$$

The left-hand side of each formula is the current for full-pitch winding, and the right-hand side is the current for concentrated winding. Only formula (53) has a different sign than the other formulas. In addition, the method of dividing the in-phase winding into two is to make two full-pitch windings that are ½ of the number of windings Nwa in which two concentrated winding windings are connected in series. The relationship between the voltage and the number of turns Nwa is shown by the formula (5).

Each voltage of FIG. 8(b) has the following relationship as in the formulas (34), (35), (36), or (48) to (52).

$$Vad + Vdc = Vd3 \quad (57)$$

$$Vdc + Vcb = Vc3 \quad (58)$$

$$Vcb + Vba = Vb3 \quad (59)$$

$$Vba + Vad = Va3 \quad (60)$$

The left-hand side of each formula is each phase voltage of the full-pitch winding, and the right-hand side is each phase voltage in the case of the concentrated winding of FIG. 8(a).

Figure 42:
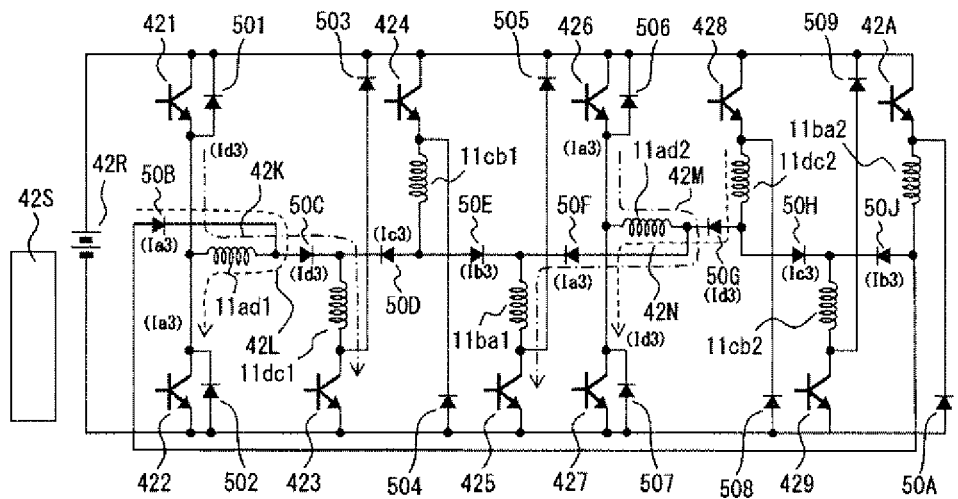
FIG. 42 is a circuit diagram exemplifying a drive circuit for the present invention.

FIG. 42 shows the drive circuit of the present invention that drives the reluctance motor shown in FIG. 8 (*b*). It is driven so as to satisfy the current conditions and voltage conditions of the above formulas (53) to (60). Here, the difference between the motor of FIG. 8 and the motor of FIGS. 20 and 9 is that a positive current and a negative current having different positive and negative signs flow through the slot between the stator magnetic poles 101 and 108 and the slot between 102 and 107 in FIG. 8(*a*). Therefore, the value of the AD phase current Iad in the formula (53) is both a positive value and a negative value. The drive circuit shown in FIG. 42 also needs to allow the Iad to carry both positive and negative currents.

A reference sign 42S in FIG. 42 shows a control circuit for the entire drive circuit, a reference sign 42R shows a DC voltage source, and reference signs 421, 422, 423, 424, 425, 426, 427, 428, 428, and 42A show drive transistors. The diodes 40M, 40N, 40P, 40Q, 40R, 40S, 40T, 40U, 40V, and 40W reduce affection of the other windings arranged on the left and right sides of the drawing paper of FIG. 42 from the influence of the excessive voltage, and also limit the direction so of the current. The currents passing through these diodes are the phase electrical components on the right-hand side of formulas (53) to (56), and are indicated by the symbols in parentheses. The orientation of each winding in FIG. 42 is aligned with the energizing direction of each current.

The relationship between the energizing current of each winding and the drive circuit of FIG. 42 will be described. The winding 11*ad*1 of FIG. 42 is indicated by the same symbol as the AD phase full-pitch winding 11*ad*1 of FIG. 8 (*b*). The windings of the slot portions of 11*ad*1 and 11*ad*2 are the windings 113 and 114 of FIG. 8(*b*), and in FIG. 8(*a*), the directions of the two currents in the slots are different. This winding 113 is the sum of the concentrated winding windings 81 and 88 of FIG. 8(*a*), and is expressed by the formula (53). Since it has a positive value and a negative value, its drive circuit becomes a little complicated. Of the AD phase current Iad that energizes winding 11*ad*1, the current component Ia3 passes through the winding 11*ba*2 and the diode 50B to the winding 11*ad*1 by the transistor 42A, and is driven by the transistor 422. The current component Id3 of the AD phase current Iad is driven by the transistor 423 through the winding 11*ad*1 by the transistor 421, through the diode 50C and the winding 11*dc*1. As the current passing through the winding 11*ad*1, the total current of the positive Ia3 and the negative Id3 is energized as shown in the formula (53). The current components Ia3 and Id3 may be superimposed.

The current of formula (54) is driven by the transistor 423 to be supplied to the winding 11*dc*1 of FIG. 42. The current of the formula (55) is driven by the transistor 424 to be supplied to the winding 11*cb*1. The current of formula (56) is driven by the transistor 425 to be supplied to the line 11*ba*1. The energization of the windings 11*ad*2, 11*dc*2, 11*cab*2, and 11*ba*2 shown in FIG. 42 is the same as the energization of the windings 11*ad*1, 11*dc*1, 11*cb*1, and 11*ba*1, because both of the energization paths are symmetrical to each other in the upper and lower parts of the drawing paper of FIG. 42.

In this way, the drive circuit of the present invention can be realized even with positive and negative currents. However, as described above, 10 transistors are required for the 4-phase current control, and 2 transistors are required more than in the case of FIGS. 37 and 40 in which the number of transistors is twice the number of phases. The current capacity of the transistors 421, 422, 426, and 427 may be halved as compared with other transistors.

The drive circuit of the present invention of FIG. 42, the reluctance motor of the full-pitch winding of FIG. 8(*b*), and the drive characteristics due to the unique winding configuration and connection are the same as those of the concentrated winding reluctance motor of FIG. 8(*a*), except for the difference in copper loss, the complexity of the winding voltage and the high voltage. In the case of the configuration of the stator magnetic pole and the rotor magnetic pole shown in FIG. 10, the torque characteristics are as shown in FIG. 11. It should be noted that various stator magnetic pole shapes, rotor magnetic pole shapes, and various current controls are possible, and the torque characteristics can be changed.

The drive circuit of the present invention of FIG. 42, the reluctance motor of the full-pitch winding of FIG. 8(*b*), and the characteristics of driving by the unique winding configuration and connection are that the copper loss of the motor can be reduced to, at most, ½ of the copper loss caused in the conventional case, as in the case of FIGS. 37 and 40. Then, under the same conditions of the total current capacity of the transistors of the drive circuit, it is possible to output up to twice the torque and power. As a result, it is possible to reduce the size, weight, and cost of the motor and drive circuit.

Twenty-Eighth Embodiment

Figure 43:
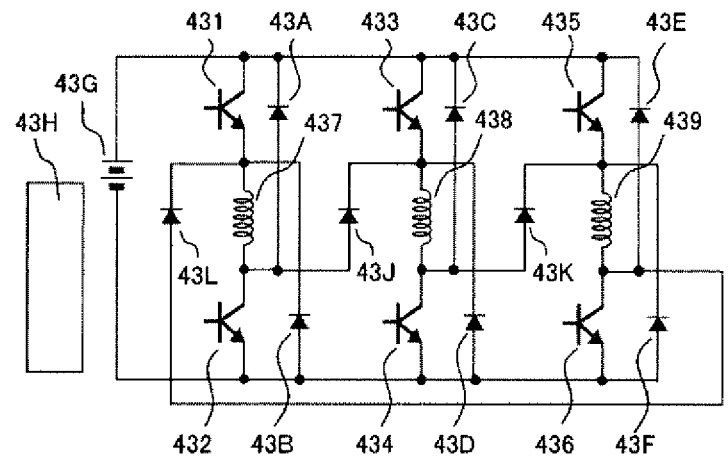
FIG. 43 is a circuit diagram exemplifying a drive circuit for the present invention.
Figure 44:
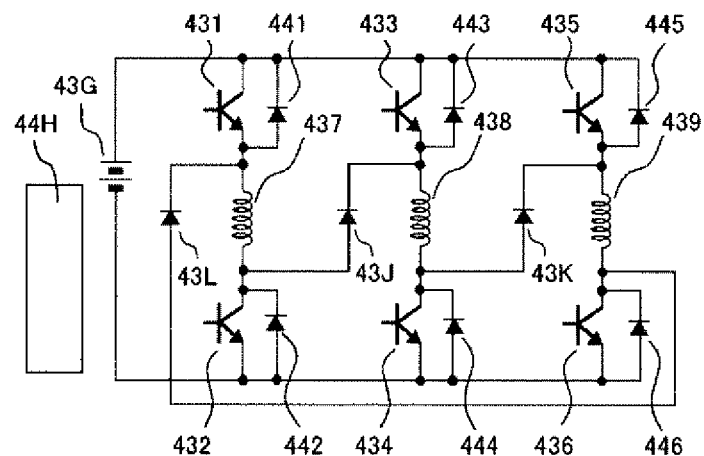
FIG. 44 is a circuit diagram exemplifying a drive circuit for the present invention.

Next, an embodiment of claim 15 will be shown and described with reference to FIGS. 43 and 44. Each winding shown in FIGS. 43 and 44 is a reluctance motor of the full-pitch winding shown in FIG. 20. Three full-pitch windings and three diodes are connected in series in a delta shape in a ring shape to energize and control the current. The purpose of this configuration is to reduce motor copper loss in the so operating region LSHT where the torque is large at low speed rotation, to increase the output of the drive circuit in this operating region LSHT, to reduce the influence of the complicated voltage and the excessive voltage shown by the formulas (16), (17) and (18) in the operating region MSMT in which the torque is medium from the low speed rotation to the medium speed rotation. The drive circuit is simpler than that of the drive circuits of FIGS. 37, 40, and 42. However, it is relatively inferior in terms of torque and power output from medium to high speed rotation. Further, the number of phases of the drive circuit of FIGS. 43 and 44 can be extended and applied to the reluctance motor having a large number of phases such as the part (b) of FIG. 8 and the part (b) of FIG. 9.

A reference sign 43H in FIG. 43 shows a control circuit for the entire drive circuit, A reference sign 43G shows a DC voltage source, and reference signs 431, 432, 433, 434, 435, and 436 show drive transistors. A reference sign 437 show the AB phase full-pitch winding 20D of FIG. 20, the AB phase current Iab is energized. 438 is the BC phase full-pitch winding 20E of FIG. 20, and carries the BC phase current Ibc. A reference sign 439 shows the CA-phase full-pitch winding 20F of FIG. 20, which carries the CA-phase current Ica. Each current has a relationship of formulas (13), (14), and (15). A reference signs 431, 43K, and 43L show diodes that interconnect the three-phase full-pitch windings 437, 438, and 439 to form a delta-shaped annular winding. Reference sign 43A, 43B, 43C, 43D, 43E, and 43F show diodes that are connected from both ends of the three-phase full-pitch winding windings 437, 438 and 439 to both ends of the power supply to regenerate power.

When the reluctance motor of FIG. 20 rotates at a low speed, there is a margin in the power supply voltage, and the three-phase currents Iac, Ibc, and Ica can be individually controlled. That is, the transistors 431 and 432 supply electric power to the AB phase full-pitch winding winding 437 to energize the current Iab. In the next flywheel period, only the transistor 431 is turned on, and the current Iab is circulated and held by the transistor 431, the winding 437, and the diode 43A. In this flywheel, only the transistor 432 may be turned on. Similarly, the transistors 433 and 434 supply electric power to the BC phase full-pitch winding 438 to energize the current Ibc. Transistors 435 and 436 supply power to the CA-phase full-pitch winding 439 to energize the current Ica.

At low speed rotation, the influence of other phases on the current control is smaller even with a large current and a large torque generated. That is, the same operation as the conventional drive circuit shown in FIG. 36 is possible. As a result, it is possible to reduce the motor copper loss in the operating region LSHT where the torque is large at low speed rotation, when compared with the concentrated winding reluctance motor of FIG. 1. Further, in this operating region LSHT, it Is possible to increase the output of the drive circuit because the power can be supplied by two paths out of the three phases.

However, when the rotation speed of the reluctance motor shown in FIG. 20 increases and the current also increases, the voltage component of the formula (18) increases, the voltage difference of the formulas (16) and (17) increases, and the current control becomes difficult. For example, when the rotor approaches the rotation angle position of FIG. 20 and outputs the CCW torque, the AB phase current Iab is applied to the AB phase winding 20D and the CA phase current Ica is applied to the CA phase winding 20F. At this time, both windings have the voltages according to the formulas (16) and (17), and the voltage according to the formula (18) is generated in a differential manner. That is, the voltages caused by the B-phase magnetic flux φb and the C-phase magnetic flux φc is generated differentially.

In FIG. 43, as a countermeasure against the differential voltage generation, the voltage and current are controlled so that the CA phase winding 20F and the AB phase winding 20D compose a serial path. That is, a voltage can be applied to a series circuit of the transistor 435, the CA phase winding 439, the diode 43L, the AB phase winding 437, and the transistor 432. At this time, the complexity of the voltage between the transistor 435 and the transistor 432 is eliminated, and the voltage according to the formula (34) is obtained. Similarly, as the rotor rotates, the current control can be performed by eliminating the complexity of the voltage by sequentially connecting the two windings in series and performing the current control.

However, at the timing of performing current control by connecting two windings in series, the remaining one-phase winding often does not carry current. Therefore, when driving the region of high-speed rotation in the drive circuit of FIG. 43, it becomes impossible to supply electric power through two paths. In terms of power output performance, this is inferior to the winding and drive circuit configurations shown in FIG. 37.

As explained above, in the configuration of FIG. 43, it is possible to reduce motor copper loss in the operating region LSHT where the torque is large at low speed rotation, to increase the output of the drive circuit in this operating region LSHT, and to reduce the influence of the complicated voltage and the excessive voltage shown by the formulas (16), (17) and (18) in the operating region MSMT in which the torque is medium from the low speed rotation to the medium speed rotation.

Twenty-Ninth Embodiment

Next, in the configuration of the drive circuit of FIG. 44, compared to FIG. 43, the power regeneration diodes 43A, 43B, 43C, 43D, 43E and 43F have been replaced by the diodes 441, 442, 443, 444, 445 and 446 of FIG. 44. The circuit operation is similar to that shown in FIG. 43. The advantage is that the transistors and diodes are arranged in an inverse-parallel arrangement, so that a commercially available transistor module can be used. Functionally, there is a problem that the diode loss at the time of regeneration is doubled and the diode loss at the time of the flywheel is doubled, when being compared with those in FIG. 43. In addition, it is necessary to consider the fact that the voltage of the other phases is affected during regeneration and flywheel, which is a problem.

Thirtieth Embodiment

Furthermore, FIG. 44 can be modified. The winding 437 and the diode 43L are arranged in series at the position of the diode 43L, and the emitter of the transistor 431 and the collector of the transistor 432 are connected. Then, the two phases of windings 438 and 439 are also replaced in the same manner. As a result of this replacement, a commercially available and mass-produced 6-piece transistor module can be used. There is a cost advantage. It should be noted that the modified drive circuit shown in FIGS. 37, 40, 42, 43, 44, 44 is not only for driving the full-pitch winding, but also for the reluctance motor of the concentrated winding as shown in FIGS. 1, 46, and others can be driven.

Thirty-First Embodiment

Next, an embodiment of claim 16 will be shown and described with reference to FIG. 45. In the reluctance motors shown in FIGS. 1, 8, 9, etc., if the current of each phase is set to 0, the torque of the motor becomes 0, and the force acting between the stator magnetic poles of each phase and the rotor magnetic poles inside the motor is also 0. Even in the cases shown in FIGS. 29, 30, and 31 in which a permanent magnet is used, if the current of each phase is set to 0, the torque of the motor becomes 0 except for the torque ripple component. However, a large force is applied between the stator magnetic poles of each phase and the rotor magnetic poles inside the motor by the permanent magnets. The relationship is such that the torque Tccw in the CCW direction and the torque Tcw in the CW direction cancel each other out. Since these torque values Tccw and Tcw depend on the strength of the permanent magnet, when the permanent magnet is strengthened, the force may be equal to or higher than the rated torque. Therefore, when the CCW torque is generated, if the stator magnetic pole that can generate CCW torque can be excited and at the same time the torque Tcw force can be weakened in parallel, CCW torque can be generated more effectively.

For example, in the reluctance motor of FIG. 29, when the rotor rotation angle position is shown, considering the state where the current of each phase is 0, magnetic flux is generated by the permanent magnets 29A and 29B, and the torques Tccw and Tcw are generated so as to cancel each other out. Specifically, when the A8 phase stator magnetic pole 291 passes through the rotor magnetic pole, the magnetic flux φaccw passes through the A8/ phase stator magnetic pole 292, so that the CCW direction torque Tccw is generated. On the other hand, when the B8 phase stator magnetic pole 293 passes through the rotor magnetic pole, the magnetic flux φbcw passes through the B8/ phase stator magnetic pole 294, so that a torque Tcw in the CW direction is generated. The total torque is offset by (Tccw−Tcw)=0.

Next, in order to generate the torque of CCW, the A8 phase current Ia8 can be applied to the A8 phase stator pole 291 and the A8/ phase stator pole 292 to generate the torque Ta8. At this time, as another method of generating the torque in the CCW direction, there is a method of energizing the B8 phase stator magnetic pole 293 and the B8/ phase stator magnetic pole 296 with a negative value B8 phase current Ib8. For example, when Ib8 Is −5 [A], assuming that the CW direction torque Tcw Is reduced to ½, when the A8 phase current Ia8 and the B8 phase current Ib8=−5 [A] are energized, the total torque becomes (Ta8+(Tccw−Tcw/2))=(Ta8+Tcw/2). That is, a negative current −5 [A] is applied to the B8 phase current Ib8 to obtain a torque of Tcw/2 in the CCW direction.

In this way, in order to increase the total torque Tt8, by setting the B8 phase current Ib8 to a negative current value, the magnetic flux φbcw can be reduced, the torque Tcw in the CW direction can be reduced, and the torque Tt8 generated by the motor can be increased. By controlling the respective phase currents in this way with the rotation of the rotor, the torque component Tcw in the CW direction can be continuously reduced.

Figure 45:
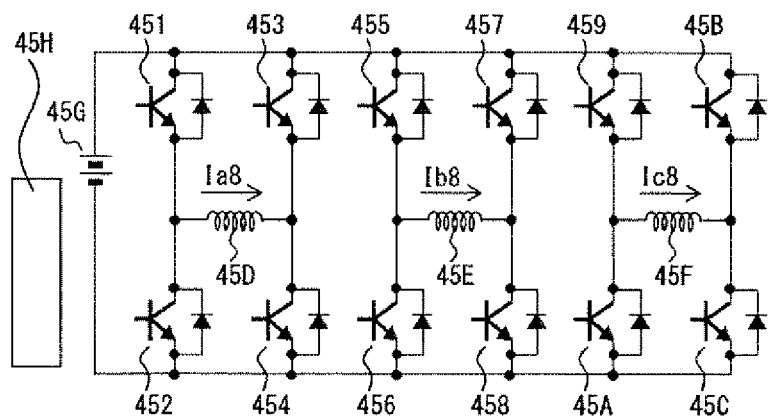
FIG. 45 is a circuit diagram exemplifying a drive circuit for the present invention.

FIG. 45 is an example of a drive circuit capable of controlling the phase currents Ia8, Ib8, and Ic8 of FIG. 29 to positive and negative values. A reference sign 45H in FIG. 45 shows a control circuit for the entire drive circuit, and a reference sign 45G shows a DC voltage source. A reference sign 45D shows an A8 phase winding, a reference sign 45E shows a B8 phase winding, and a reference sign 45F shows a C8 phase winding. The positive current of the A8 phase current Ia8 is driven by the transistors 451 and 454, and the negative current is driven by the transistors 453 and 452. The positive current of the B8 phase current Ib8 is driven by the transistors 455 and 458, and the negative current is driven by 457 and 456. The positive current of the C8 phase current Ic8 is driven by the transistors 459 and 45C, and the negative current is driven by 45B and 45A.

With the drive circuit of FIG. 45, not only the positive value of each phase current but also the negative current is applied in the section that has not been energized until now to generate the CCW torque, so that the positive current value can be reduced. Also, since the usage rate of each phase winding is improved, the total copper loss of the motor can be reduced. Further, the drive circuit of FIG. 45 has more elements than the conventional drive circuit of FIG. 36. However, as a countermeasure, the maximum value of the negative current of each phase is smaller than the positive current value, so it is also possible to reduce the current capacity of the transistors 453, 452, 457, 456, 45B, and 45A to reduce the burden of increasing the drive circuit. In each figure shown as the reluctance motor of the present invention, the direction of the energized current is indicated by a current symbol, and the N polarity and the S polarity of the stator magnetic poles are added, but a current in the direction opposite to the current symbol is also energized in claim 16. Further, the drive circuit of FIG. 45 is converted by the formulas (13), (14) and (15), and can be applied to a motor with a full-pitch winding.

Although the present invention has been described above, it is possible to combine the techniques according to the claims, various modifications, and applications. For example, not only the noise is reduced, but also the copper loss is reduced as a full-pitch winding, and the reluctance motor of the full-pitch winding shown in FIG. 20. Also, the rotor configuration of FIG. 6 is composed of electrical steel sheets as shown in FIG. 17(*b*) to improve productivity and magnetic characteristics, and a permanent magnet between the teeth shown in FIG. 26 is applied to reduce iron loss and increase the slot cross-sectional area to reduce copper loss. Further, the torque characteristics are improved by locally utilizing permendur with high magnetic flux density as shown in FIG. 27, the permanent magnet can be used for excitation as shown in FIG. 30 or 31, and the drive circuit of FIG. 37 can also reduce the size of the inverter. These technologies are interrelated and can be used together to make a highly competitive reluctance motor. As a result, it is possible to reduce noise, reduce torque ripples, increase a peak torque, and utilize the high-speed rotation range. Further, by reducing the copper loss of the reluctance motor and driving circuit with high utilization efficiency, it is possible to realize miniaturization, weight reduction, and manufacturing cost reduction.

The individual techniques can also be applied to the conventional reluctance motor shown in FIG. 46. The number of phases of the motor can be expanded not only to the three-phase, four-phase, and five-phase shown in the figure, but also to seven-phase, eleven-phase, etc., and can be combined with the number of rotor magnetic poles, multi-polarized, and the like. The motor type can also be transformed into an outer rotor type motor, an axial gap type motor, a linear motor, or the like, and can be combined with other types of motors. It is also possible to change the permanent magnet with the current for the motor, or to change the permanent magnet with a dedicated device. It is also possible to utilize sensor-less position detection technology that utilizes the fact that the induced voltage and magnetic characteristics of each winding change with the rotation of the rotor.

INDUSTRIAL USABILITY

According to the present invention, it is possible to reduce noise, reduce torque ripples, increase a peak torque, and utilize a high-speed rotation range. Further, by reducing the copper loss of the reluctance motor and driving circuit with high utilization efficiency, it is possible to realize miniaturization, weight reduction, and manufacturing cost reduction. The reluctance motor of the present invention has a configuration and characteristics that prioritize the torque of one-way rotation, but there are many applications in which one-way rotation characteristics are particularly important in motors for main engines of electric vehicles, industrial motors, motors for home appliances, and the like.

REFERENCE SIGNS LIST

11 A1 phase stator magnetic pole
12 A1/ phase stator magnetic pole
13 B1 phase stator magnetic pole
14 B1/ phase stator magnetic pole
15 C1 phase stator magnetic pole
16 C1/ phase stator magnetic pole
17, 18 A1 phase winding
1C, 1D A1/ phase winding
1U, 1V B1 phase winding
1S, 1T B1/ phase winding
1Q, 1R C1 phase winding 1P, 1N C1/ phase winding
19 stator
1B rotor shaft
1J, 1K, 1L, 1M example of lateral section of rotor magnetic pole
4J, 4K, 4L, 4M linearly developed shape along air-gap surface of rotor magnetic poles
θr rotation angle position of rotor
θBr circumferential angular width of rotor magnetic pole

The invention claimed is:

1. A reluctance motor characterized in that the reluctance motor comprises:

"SN×MN"-piece or more stator magnetic poles SP arranged in a circumferential direction of a stator, wherein the number SN is a positive integer of 6 or more and the number MN is a positive integer of 1 or more;

stator windings SW wound to excite the stator magnetic poles, respectively;

a first rotor magnetic pole portion RPB1 located at one end in a circumferential direction of a rotor, the first rotor magnetic pole portion being a part of "RN×MN"-piece or more rotor magnetic poles RP arranged magnetically separately in the circumferential direction of the rotor, wherein the number RN is a positive integer of 4 or more;

a second rotor magnetic pole portion RPB2 arranged adjacently to the rotor magnetic pole portion RPB1 in the circumferential direction, wherein the first rotor magnetic pole portion RPB1 has a magnetic resistance value MRPB1 and the second rotor magnetic pole portion RPB2 has a magnetic resistance value MRPB2, the magnetic resistance value MRPB1 being larger than the magnetic resistance value MRPB2 by 20% or more, when the magnetic resistance value MRPB1 is given per a unit angular width in a radial direction along an all range of the first rotor magnetic pole portion RPB1 in a rotor axial direction thereof, and the magnetic resistance value MRPB2 is given per a unit angular width in the radial direction along an all range of the second rotor magnetic pole portion RPB2 in the rotor axial direction thereof.

2. The reluctance motor of claim 1, characterized in that the reluctance motor comprises a third rotor magnetic pole portion RPB3 arranged adjacently to the second rotor magnetic pole portion RPB2 in the circumferential direction,
the second magnetic pole portion RPB2 has a magnetic resistance value which is larger than a magnetic resistance value MRPB3 by 20%, when the magnetic resistance value MRPB3 is given per a unit angular width in the radial direction along an all range of the third rotor magnetic pole portion RPB3 in the rotor axial direction thereof.

3. The reluctance motor of claim 1, characterized in that the reluctance motor comprises a rotor made of magnetic steel sheets laminated in the rotor axial direction so as to have a desired ratio of the respective magnetic resistance values, wherein the radial magnetic resistance value MRPB1 of the first rotor magnetic portion RPB1, the radial magnetic resistance value MRPB2 of the second rotor magnetic portion RPB2, the radial magnetic resistance value MRPB3 of the third rotor magnetic portion RPB3, and a radial gap between the respective rotor magnetic pole RP are applied to the magnetic steel sheets such that the sheet have a plurality of thin and long holes, various shapes of holes, such as regular and/or round holes, recesses, and/or thinner-made portion of the sheets.

4. The reluctance motor of claim 1, characterized in that the rotor comprises a plurality of rotor magnetic poles RPX arranged at circumferential positions whose phase differences are 180 degrees or 360 degrees in an electrical angle and whose magnetic characteristics are mutually different from other, and the plurality of rotor magnetic poles RPX have, at each the phases, radial magnetic resistance values have an average value at positions which are integer multiples of an electrical angle 180 degrees, the average value being equal to the magnetic resistance value MRPB1, MRPB2, or MRPB3.

5. The reluctance motor of claim 1, characterized in that the motor comprises a slot SSTY1;
a stator magnetic pole PRY1 located adjacently to the slot SSTY1 in the circumferential direction;
a stator magnetic pole PRY2 located adjacently to the slot SSTY1 in the circumferential direction and oppositely to the stator magnetic pole PRY1; and
a winding WPRY3 wound at the slot SSTY1 so as to aggregate a concentrated winding WPRY1 and a concentrated winding WPRY2 which are assumed, the concentrated winding WPRY1 passing therethrough an excitation current IPRY1 for the stator magnetic pole PRY1, the concentrated winding WPRY2 passing therethrough an excitation current IPRY2 for the stator magnetic pole PRY2,
wherein the winding WPRY3 is wound at both the slot SSTY1 and other slots SSTY2 in the circumferential direction, and
a current IPRY3 is supplied to the winding WPRY3, the current IPRY3 being equal to a sum of the excitation currents IPRY1 and IPRY2.

6. The reluctance motor of claim 1, characterized in that the motor comprises a slot SSTY1;
a stator magnetic pole PRY1 located adjacently to the slot SSTY1 in the circumferential direction;
a stator magnetic pole PRY2 located adjacently to the slot SSTY1 in the circumferential direction and oppositely to the stator magnetic pole PRY1; and
a winding WPRY4 wound at the slot SSTY1 so as to aggregate a concentrated winding WPRY1 and a concentrated winding WPRY2 which are assumed, the concentrated winding WPRY1 passing therethrough an excitation current IPRY1 for the stator magnetic pole PRY1, the concentrated winding WPRY2 passing therethrough an excitation current IPRY2 for the stator magnetic pole PRY2,
wherein the winding WPRY4 is wound at the slot SSTY1 and outside a back yoke thereof, and
a current IPRY3 is supplied to the winding WPRY4, the current IPRY3 being equal to a sum of the excitation currents IPRY1 and IPRY2.

7. The reluctance motor of claim 1, characterized in that the motor comprises an N-pole stator magnetic pole and an S-pole stator magnetic pole which are arranged parallel with in the circumferential direction; and
a permanent magnet PM1 arranged between a portion close to a distal portion of a tooth the N-pole stator magnetic pole and a portion close to a distal portion of a tooth of the S-pole stator magnetic pole, wherein a relationship of Lts is equal to or less than "0.9×Ltf", wherein Ltf is a maximum value of a circumferential width between the portions close to the teeth of the N-pole and S-pole stator magnetic poles and Lts is a circumferential width of a tooth of a middle portion located between a tooth end of the stator and a back yoke thereof.

8. The reluctance motor of claim 1, characterized in that the motor comprises
   a soft magnetic member MM1 through which magnetic fluxes pass in the motor, and
   a soft magnetic member MM2 whose saturation magnetic flux density is larger than a saturation magnetic flux density of the soft magnetic member MM1,
   wherein the soft magnetic member MM2 composes a ½ or less portion of the stator tooth provided as the stator magnetic pole, and
   the soft magnetic member MM2 composes a ½ or less portion of the rotor tooth provided as the rotor magnetic pole.

9. The reluctance motor of claim 1, characterized in that the motor comprises
   two or more N-pole stator magnetic poles arranged adjacently in the circumferential direction of the stator;
   two or more S-pole stator magnetic poles arranged adjacently in the circumferential direction of the stator;
   permanent magnets PM2 arranged in a back yoke located between the N-pole stator magnetic pole and the S-pole stator magnetic pole in accordance with magnetisms of the stator magnetic poles; and
   by-path magnetic paths made of soft-magnetic materials which allow magnetic fluxes to pass therethrough between the N-pole and S-pole stator magnetic poles, the soft-magnetic members being arranged magnetically in parallel with the permanent magnets PM2.

10. The reluctance motor of claim 1, characterized in that the motor comprises
    N-pole stator magnetic poles and S-pole stator magnetic poles are arranged alternately in and on a periphery of the stator;
    a back yoke BY1 magnetically connected to the N-pole stator magnetic poles;
    a back yoke BY2 magnetically connected to the S-pole stator magnetic poles; and
    a permanent magnet PM3 arranged between the back yoke BY1 and the back yoke BY2 in accordance with magnetisms of the stator magnetic poles.

11. The reluctance motor of claim 1, characterized in that each of the rotor magnetic poles RP has the magnetic resistance value MRPB1 which is two or more times larger than the magnetic resistance value MRPB2, and the motor is configured to be controlled in a higher speed rotation range higher than a base rotation speed of the motor, such that the respective stator magnetic poles SP are excited, by the control, to generate torque when a first rotor magnetic pole portion RPB1 of each of the rotor magnetic poles approaches to each of the stator rotor magnetic poles.

12. The reluctance motor of claim 1, characterized in that control is performed such that, in regenerative control in a range where two sets of stator magnetic poles are allowed to generate regenerative toque when the rotor rotates, wherein one stator magnetic pole which generates the regenerative torque in advance of the other stator magnetic pole is subjected to a gradual reduction in an excitation current thereto, and, concurrently, the other magnetic pole which generates the regenerative toque after the preceding stator magnetic pole is subjected to a gradual increase in an excitation current thereto, whereby the motor generate, as a whole, lesser ripples in the generative torque.

13. The reluctance motor of claim 1, characterized in that the stator magnetic poles have shapes each facing an air gap and the rotor magnetic poles have shapes each facing the air gap, the shapes of both the stator and rotor magnetic poles being reversed therebetween, or,
    the stator has teeth and the rotor has teeth, the teeth of both the stator and rotor being changed,
    such that magnetic statistics which are relatively equivalent to each other are provided.

14. The reluctance motor of claim 1, characterized in that the stator magnetic poles SP1, the stator magnetic poles SP2, and the stator magnetic poles SP3 are arranged parallelly in the circumferential direction,
    a winding SW1 and a winding SW2 wound in slots located adjacently to each of the stator magnetic pole SP1 on both sides in the circumferential direction,
    the winding SW2 and a winding SW3 wound in slots located adjacently to each of the stator magnetic pole SP2 on both sides in the circumferential direction,
    the winding SW3 and a winding SW4 wound in slots located adjacently to each of the stator magnetic pole SP3 on both sides in the circumferential direction,
    a power element PE1 electrically connected in series to the winding SW1,
    a power element PE2 electrically connected in series to the winding SW2,
    a power element PE3 electrically connected in series to the winding SW3,
    a power element PE4 electrically connected in series to the winding SW4, and
    a DC power supply having a positive terminal and a negative terminal and outputting DC power,
    wherein the power element PE1, the winding SW1, the winding SW2 and the power element PE2 are electrically connected in series to each other,
    the power element PE2, the winding SW2, the winding SW3 and the power element PE3 are electrically connected in series to each other, and
    the power element PE3, the winding SW3, the winding SW4 and the power element PE4 are electrically connected in series to each other, the excitation current being supplied to the respective windings to magnetically excite the respective stator magnetic poles.

15. The reluctance motor of claim 1, characterized in that the motor comprises:
    a stator magnetic pole SP11, a stator magnetic pole SP12, a stator magnetic pole SP13, a stator magnetic pole SP14, a stator magnetic pole SP15, and a stator magnetic pole SP16;
    a winding SW11 arranged between the stator magnetic pole SP11 and the stator magnetic pole SP12;
    a winding SW12 arranged between the stator magnetic pole SP12 and the stator magnetic pole SP13;
    a winding SW13 arranged between the stator magnetic pole SP13 and the stator magnetic pole SP14;
    a DC power supply having a positive terminal and a negative terminal and outputting DC power,
    a power element PE11, a power element PE12, and a power element PE13 which are electrically connected to the positive terminal;
    a power element PE14 and a power element PE15 which are electrically connected to the negative terminal; and
    a diode DD11, a diode DD12, and a diode DD13, wherein the winding SW11, the diode DD11, the winding SW12, the diode DD12, the winding SW13, and the diode SS13 are electrically connected in series to each other, and the respective power elements are driven to apply in series a voltage to two windings among the windings SW11, SW12, and SW13 so as to control respective currents through the two windings.

16. The reluctance motor of claim 9, characterized in that the motor comprises:
- a stator magnetic pole SP21;
- a winding SW21 configured to apply a current IS21 to the stator winding SP21 for excitation thereof;
- a stator magnetic pole SP22; and
- a winding SW22 configured to apply a current IS22 to the stator magnetic pole SP22 for excitation thereof,
- wherein, at a rotation angle position of the rotor, a negative current IS22 is supplied to the winding SW22 to generate in a designated direction, provided that a positive current IS21 is supplied to the winding SW21 to generate the torque in the designated direction while a positive current IS22 is supplied to the other winding SW22 to generate torque in a direction opposite to the designated direction.

* * * * *